(12) United States Patent
Hoffman et al.

(10) Patent No.: US 10,631,539 B2
(45) Date of Patent: *Apr. 28, 2020

(54) FUNGICIDAL COMPOSITIONS

(71) Applicant: SYNGENTA PARTICIPATIONS AG, Basel (CH)

(72) Inventors: Thomas James Hoffman, Stein (CH); Sarah Sulzer-Mosse, Stein (CH); Kurt Nebel, Stein (CH); Fredrik Emil Malcolm Cederbaum, Stein (CH); Mathias Blum, Stein (CH)

(73) Assignee: Syngenta Participations AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/767,555

(22) PCT Filed: Oct. 10, 2016

(86) PCT No.: PCT/EP2016/074137
§ 371 (c)(1),
(2) Date: Apr. 11, 2018

(87) PCT Pub. No.: WO2017/063973
PCT Pub. Date: Apr. 20, 2017

(65) Prior Publication Data
US 2018/0289005 A1    Oct. 11, 2018

(30) Foreign Application Priority Data

Oct. 14, 2015  (EP) ................................... 15189809

(51) Int. Cl.
| | | |
|---|---|---|
| A01N 43/40 | (2006.01) |
| A01N 43/56 | (2006.01) |
| A01N 37/50 | (2006.01) |
| A01N 37/34 | (2006.01) |
| A01N 43/44 | (2006.01) |
| A01N 43/54 | (2006.01) |
| A01N 43/653 | (2006.01) |
| A01N 45/02 | (2006.01) |
| A01N 47/14 | (2006.01) |

(52) U.S. Cl.
CPC ............. *A01N 43/40* (2013.01); *A01N 37/34* (2013.01); *A01N 37/50* (2013.01); *A01N 43/44* (2013.01); *A01N 43/54* (2013.01); *A01N 43/56* (2013.01); *A01N 43/653* (2013.01); *A01N 45/02* (2013.01); *A01N 47/14* (2013.01)

(58) Field of Classification Search
CPC ........ A01N 43/40; A01N 47/14; A01N 45/02; A01N 43/653; A01N 43/56; A01N 43/54; A01N 37/50; A01N 37/34; A01N 43/44
See application file for complete search history.

(56) References Cited

FOREIGN PATENT DOCUMENTS

| | | |
|---|---|---|
| WO | 2008/101682 A2 | 8/2008 |
| WO | 2012/146125 A1 | 11/2012 |
| WO | 2015/155075 A1 | 10/2015 |

OTHER PUBLICATIONS

International Search Report and Written Opinion from International Application No. PCT/EP2016/074137, dated Dec. 6, 2016 (8 pages).

*Primary Examiner* — Sarah Pihonak
*Assistant Examiner* — Jason Deck
(74) *Attorney, Agent, or Firm* — Baker & Hostetler, LLP; Toni-Junell Herbert

(57) ABSTRACT

A fungicidal composition comprising a mixture of components (A) and (B), wherein components (A) and (B) are as defined in claim 1, and use of the compositions in agriculture or horticulture for controlling or preventing infestation of plants by phytopathogenic microorganisms, preferably fungi.

12 Claims, No Drawings

FUNGICIDAL COMPOSITIONS

CROSS-REFERENCE TO RELATED APPLICATIONS

This application is a 371 National Stage application International Application No. PCT/EP2016/074137, filed Oct. 10, 2016, which claims priority to European Application No. 15189809.5, filed Oct. 14, 2016, the entire contents of which are hereby incorporated by reference.

The present invention relates to novel fungicidal compositions, to their use in agriculture or horticulture for controlling diseases caused by phytopathogens, especially phytopathogenic fungi, and to methods of controlling diseases on useful plants, especially fruits and vegetables.

Certain pyridylamidines derivatives have been proposed in the literature as microbiocidal active ingredients in pesticides. For example, WO 00/46184 and WO 03/093224 disclose pyridylamidines which are described to be useful as fungicides. WO 2008/101682 and WO 2012/146125 also disclose pyridylamidines and mixture compositions comprising them as having biological activity against certain phytopathogenic fungi. However, the biological properties of these known compounds and their compositions are not entirely satisfactory for controlling or preventing infestation of plants by phytopathogenic fungi. Further, whilst many fungicidal compounds and compositions, belonging to various different chemical classes, have been/are being developed for use as fungicides in crops of useful plants, crop tolerance and activity against particular phytopathogenic fungi do not always satisfy the needs of agricultural practice in many respects.

There is therefore a continuing need to find new compounds and new compositions having superior biological properties for use in controlling or preventing infestation of plants by phytopathogenic fungi; for example, compounds possessing a greater biological activity, an advantageous spectrum of activity, an increased safety profile, improved physico-chemical properties, increased biodegradability, or compositions possessing a broader of spectrum of activity, improved crop tolerance, synergistic interactions or potentiating properties, or compositions which display a more rapid onset of action or which have longer lasting residual activity or which enable a reduction in the number of applications and/or a reduction in the application rate of the compounds and compositions required for effective control of a phytopathogen, thereby enabling beneficial resistance-management practices, reduced environmental impact and reduced operator exposure.

The use of compositions comprising mixtures of different fungicidal compounds can address some of these needs (e.g. by combining fungicides with differing spectrums of activity). However, it is especially advantageous if, in such mixture compositions, one or more of the fungicidal compounds themselves possess superior biological properties over known and closely related fungicidal compounds.

The present invention therefore provides novel fungicidal compositions comprising as active ingredients a mixture of component (A) and component (B), wherein component (A) is a compound of formula (I)

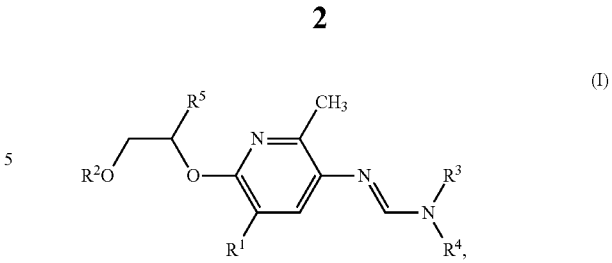

wherein $R^1$ represents hydrogen, chloro, bromo, cyano, $C_1$-$C_2$ alkyl, $CO_2(C_1$-$C_2$ alkyl), $CO_2H$, $CONH_2$, $CONH(C_1$-$C_4$ alkyl), $CON(C_1$-$C_4$ alkyl)$_2$, $C_1$-$C_4$ haloalkyl, or $C_1$-$C_4$ haloalkoxy;

$R^2$ represents $C_3$-$C_6$alkyl, $C_3$-$C_6$alkenyl, or $R^6$;

$R^3$ and $R^4$ independently of each other represent hydrogen, methyl, ethyl, isopropyl or cyclopropyl; or $R^3$ and $R^4$ together with the nitrogen atom to which they are attached form a 3-, 4- or 5-membered saturated cyclic group;

$R^5$ represents $C_1$-$C_3$ alkyl, or $C_1$-$C_2$ alkoxy$C_1$-$C_2$ alkyl;

$R^6$ represents phenyl, which can be substituted by chloro or $C_1$-fluoroalkyl; or a salt, enantiomer, tautomer or N-oxide thereof;

and component (B) is a compound selected from the group consisting of (B1) a strobilurin fungicide selected from the group consisting of azoxystrobin, picoxystrobin, enoxastrobin, pyraoxystrobin, mandestrobin, flufenoxystrobin, coumoxystrobin, orysastrobin, dimoxystrobin, metominostrobin, fenaminostrobin, pyrametostrobin, triclopyricarb, kresoxim-methyl, fluoxastrobin, pyribencarb, pyraclostrobin and trifloxystrobin;

(B2) an azole fungicide selected from the group consisting of azaconazole, etaconazole, ipconazole, tebuconazole, bitertanol, fenbucoanzole, metconazole, tetraconazole, bromucoanzole, fluquinconazole, myclobutanil, triadimefon, flusilazole, penconazole, triadimenol, triticonazole, simeconazole, imibenconazole, hexaconazole, flutriafol, diniconazole, cyproconazole, difenoconazole, epoxiconazole, propiconazole, prothioconazole, pyrifenox, nuarimol, fenarimol, imizalil, triflumizole, prochloraz, pefurazoate, oxpoconazole, Mefentrifluconazole, 2-[[3-(2-chlorophenyl)-2-(2,4-difluorophenyl)oxiran-2-yl]methyl]-4H-1,2,4-triazole-3-thione and 2-[2-chloro-4-(4-chlorophenoxy)phenyl]-1-(1,2,4-triazol-1-yl)propan-2-ol;

(B3) a morpholine fungicide selected from aldimorph, dodemorph, fenpropimorph and tridemorph;

(B4) a carboxamide fungicide selected from bixafen, fluopyram, fluxapyroxad, isopyrazam, sedaxane, furametpyr, penflufen, penthiopyrad, benzovindiflupyr, thifluzamide, isofetamid, boscalid, carboxin, oxycarboxin, fenfuram, flutolanil, pyraziflumid, pydiflumetofen, mepronil, benodanil, N-[(5-chloro-2-isopropyl-phenyl)methyl]-N-cyclopropyl-3-(difluoromethyl)-5-fluoro-1-methyl-pyrazole-4-carboxamide, 3-(difluoromethyl)-N-(7-fluoro-1,1,3-trimethyl-indan-4-yl)-1-methyl-pyrazole-4-carboxamide, 3-(difluoromethyl)-1-methyl-N-(1,1,3-trimethylindan-4-yl)pyrazole-4-carboxamide and (R)-3-(difluoromethyl)-1-methyl-N-(1,1,3-trimethylindan-4-yl)pyrazole-4-carboxamide;

(B5) an anilinopyrimidine fungicide selected from cyprodinil, mepanipyrim and pyrimethanil;

(B6) an phenylpyrrole fungicide selected from fludioxonil and fenpiclonil;

(B7) a phenylamide fungicide selected from benalaxyl, benalaxyl-M, furalaxyl, mefenoxam (metalaxyl-M) and metalaxyl, ofurace and oxadixyl;

(B8) a fungicide selected from the group consisting of ametoctradin, amisulbrom, anilazine, aureofungin, benomyl, benthiavalicarb, benthiazole, bethoxazin, BLAD, blasticidin-S, Bordeaux mixture, bupirimate, calcium polysulfide, captafol, captan, carbaryl, carbendazim, carpropamid, chinomethionate, chitosan, chlobenthiazone, chlorfenazole, chloroneb, chlorothalonil, chlozolinate, climbazole, copper acetate, copper carbonate, copper hydroxide, copper naphthenate, copper oleate, copper oxychloride, copper oxyquinolate, copper silicate, copper sulphate, copper tallate, cuprous oxide, cyazofamid, cyclafuramid, cyflufenamid, cymoxanil, dazomet, dichlofluanid, dichlorprop, diclocymet, diclomezine, dicloran, diethofencarb, diflumetorim, dimetachlone, dimethipin, dimethirimol, dimethomorph, dinocap, dinocton, dinobuton, dinopenton, dipymetitrone, ditalimfos, dithianon, dodicin, dodine, doguadine, edifenphos, etem, ethaboxam, ethirimol, ethoxyquin, etridiazole, famoxadone, fenamidone, fenarimol, fenhexamid, fenoxanil, fenpropidine, fenpyrazamine, fentin acetate, fentin hydroxide, ferbam, ferimzone, fluazinam, flumorph, fluopicolide, fluoroimide, flusulfamide, flutianil, folpet, fosetyl-Al, fuberidazole, gibberellic acid, guazatine, hymexazole, iminoctadine, iodocarb, iprobenfos, iprodione, iprovalicarb, isoprothiolane, kasugamycin, mancozeb, mandipropamid, maneb, metam, meptyldinocap, metiram, metrafenone, nabam, oxathiapiprolin, paclobutrazol, pencycuron, phenamacril, phosdiphen, phthalide, picarbutrazox, polyoxin D, probenazole, procymidone, prohexadione, propamocarb, propineb, proquinazid, pyrazophos, pyrifenox, pyrimorph, pyriofenone, pyroquilon, quinoxyfen, quintozene, silthiofam, spiroxamine, streptomycin, sulphur, tebufloquin, tecloftalam, tecnazene, thiabendazole, thidiazuron, thicyofen, thiophanate-methyl, thiram, tioxymid, tolclofos-methyl, tolprocarb, tolylfluanid, triazoxide, tribufos, tricyclazole, triforine, validamycin, valifenalate, vapam, vinclozolin, zineb, ziram, zoxamide, [2-[3-[2-[1-[2-[3,5-bis(difluoromethyl)pyrazol-1-yl]acetyl]-4-piperidyl]thiazol-4-yl]-4,5-dihyd roisoxazol-5-yl]-3-chloro-phenyl] methanesulfonate, but-3-ynyl N-[6-[[[(Z)-[(1-methyltetrazol-5-yl)-phenyl-methylene]amino]oxymethyl]-2-pyridyl]carbamate, N'-[4-(4,5-dichlorothiazol-2-yl)oxy-2,5-dimethyl-phenyl]-N-ethyl-N-methyl-formamidine, 4-(2-bromo-4-fluoro-phenyl)-N-(2-chloro-6-fluoro-phenyl)-2,5-dimethyl-pyrazol-3-amine, 2-[2-fluoro-6-[(8-fluoro-2-methyl-3-quinolyl)oxy]phenyl]propan-2-ol, 4,4,5-trifluoro-3,3-dimethyl-1-(3-quinolyl)isoquinoline, 3-chloro-6-methyl-5-phenyl-4-(2,4,6-trifluorophenyl)pyridazine, 3-chloro-4-(2,6-difluorophenyl)-6-methyl-5-phenyl-pyridazine, 2-(difluoromethyl)-N-(1,1,3-trimethylindan-4-yl)pyridine-3-carboxamide, 2-(difluoromethyl)-N-(3-ethyl-1,1-dimethyl-indan-4-yl)pyridine-3-carboxamide, 2-(difluoromethyl)-N-(1,1-dimethyl-3-propyl-indan-4-yl)pyridine-3-carboxamide, 2-(difluoromethyl)-N-(3-isobutyl-1,1-dimethyl-indan-4-yl)pyridine-3-carboxamide, 2-(difluoromethyl)-N-[(3R)-1,1,3-trimethylindan-4-yl]pyridine-3-carboxamide, 2-(difluoromethyl)-N-[(3R)-3-ethyl-1,1-dimethyl-indan-4-yl]pyridine-3-carboxamide, 2-(difluoromethyl)-N-[(3R)-1,1-dimethyl-3-propyl-indan-4-yl]pyridine-3-carboxamide, a compound of the formula

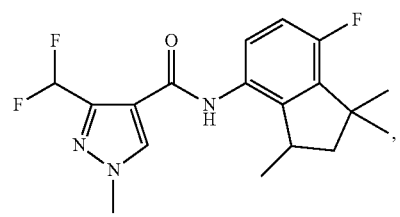 [SMILES: CC1CC(C)(C)c2c(F)ccc(NC(=O)c3cn(C)nc3C(F)F)c21]

a compound of the formula

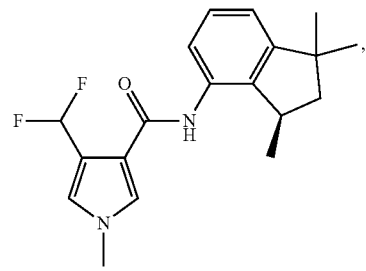 [SMILES: C[C@@H]1CC(C)(C)c2cccc(NC(=O)c3cn(C)cc3C(F)F)c21]

and a compound of the formula:

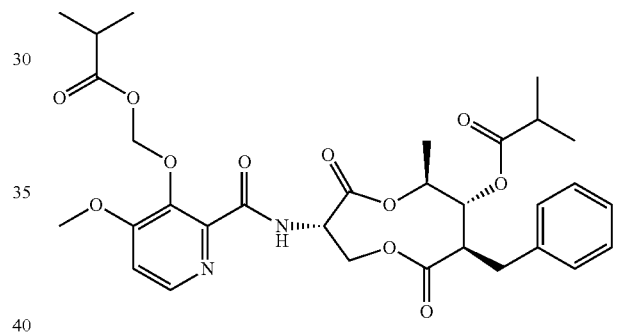

(B9) a plant-bioregulator selected from the group consisting of acibenzolar-S-methyl, chlormequat chloride, ethephon, isotianil, mepiquat chloride, tiadinil and trinexapac-ethyl;

(B10) an insecticide selected from the group consisting of abamectin, acequinocyl, acetamiprid, acrinathrin, afidopyropen, alanycarb, allethrin, alpha-cypermethrin, alphamethrin, amidoflumet, azadirachtin, azocyclotin, *bacillus firmus, bacillus thuringiensis*, bensultap, benzoximate, betacyfluthrin, bifenazate, binapacryl, bioallethrin, bioresmethrin, biphenthrin, broflanilide, brofluthrinate, bromophos-ethyl, buprofezine, cadusafos, carbaryl, carbosulfan, cartap, chlorantraniliprole, chlorfenapyr, chromafenozide, cloethocarb, clothianidin, cyantraniliprole, cyclaniliprole, cycloprothrin, cycloxaprid, cyenopyrafen, cyflumetofen, cyfluthrin, cyhalothrin, cypermethrin, cyphenothrin, cyromazine, deltamethrin, demeton-s-methyl, diafenthiuron, dialifos, dichloromezotiaz, diflovidazine, diflubenzuron, dinactin, dinocap, dinotefuran, d-limonene, emamectin, empenthrin, esfenvalerate, ethion, ethiprole, etofenprox, etoxazole, famphur, fenazaquin, fenfluthrin, fenobucarb, fenoxycarb, fenpropathrin, fenpyroximate, fenvalerate, fipronil, flometoquin, flonicamid, fluacrypyrim, fluazuron, flubendiamide, flucythrinate, fluensulfone, flufenerim, flufenprox, flufiprole, fluhexafon, flumethrin, flupyradifuron, fluvalinate, fosthiazate, gamma-cyhalothrin, gossyplure, guadipyr, halofenozide, halofenprox, harpin, hexythiazox, hydramethylnon, imicyafos, imidacloprid, imiprothrin, indoxacarb, iodomethane, isothioate, ivermectin, lambda-cyhalothrin, lepimectin, lufenuron, metaflumizone, metaldehyde, methomyl, methoxyfenozide, metofluthrin, milbemectin, niclosamide, nitenpyram, oxamyl, parathion-ethyl, pasteuria nishizawae, p-cymene, permethrin, phenothrin, phosphocarb, piperonylbutoxide, pirimicarb, pirimiphos-ethyl, polyhedrosis virus, prallethrin, profenofos, profenofos, propargite, propetamphos, protrifenbute, pyflubumide, pymetrozine, pyraclofos, pyrafluprole, pyrethrum, pyridaben, pyridalyl, pyrifluquinazon, pyrimidifen, pyriprole, pyriproxyfen, selamectin, silafluofen, spinetoram, spinosad, spirodiclofen, spiromesifen, spirotetramat, sulfoxaflor, tebufenozide, tebufenpyrad, tefluthrin, terpenoid blends, terpenoids, tetradiphon, tetramethrin, tetranactin, tetraniliprole, theta-cypermethrin, thiacloprid, thiamethoxam, thiodicarb, tioxazafen, tolfenpyrad, transfluthrin, trichlorfon, triflumezopyrim, zeta-cypermethrin and α-terpinene; and (B11) glyphosate.

In general, the weight ratio of component (A) to component (B) is from 1000:1 to 1:1000, especially from 50:1 to 1:50, more especially in a ratio from 40:1 to 1:40, even more especially in a ratio of from 20:1 to 1:20, even more especially still from 10:1 to 1:10, and very especially from 5:1 and 1:5. Special preference is given to a ratio of from 2:1 to 1:2, and a ratio of from 4:1 to 2:1 is also especially preferred. Specific individual ratios that are preferred include the ratio of 1:1, 5:1, 5:2, 5:3, 5:4, 4:1, 4:2, 4:3, 3:1, 3:2, 2:1, 1:5, 2:5, 3:5, 4:5, 1:4, 2:4, 3:4, 1:3, 2:3, 1:2, 1:600, 1:300, 1:150, 1:100, 1:50, 1:40, 1:35, 1:20, 2:35, 4:35, 1:10 1:75, 2:75, 4:75, 1:6000, 1:3000, 1:1500, 1:350, 2:350, 4:350, 1:750, 2:750, and 4:750.

Compounds of formula (I) possess superior biological properties over known and closely related fungicidal compounds. Such benefits may include, inter alia, advantageous levels of biological activity for protecting plants against diseases that are caused by fungi or superior properties for use as agrochemical active ingredients (for example, greater biological activity, an advantageous spectrum of activity, an increased safety profile, improved physico-chemical properties, or increased biodegradability).

The presence of one or more possible asymmetric carbon atoms in a compound of formula (I) means that the compounds may occur in optically isomeric forms, i.e. enantiomeric or diastereomeric forms. The specific substitution pattern at the carbon atom to which $R^2$ is attached means that the compounds of formula (I) occur in (at least) two enantiomeric forms. Also atropisomers may occur as a result of restricted rotation about a single bond. The present invention includes all those possible isomeric forms (e.g. geometric isomers) and mixtures thereof for a compound of formula (I). Likewise, formula (I) is intended to include all possible tautomers. The present invention includes all possible tautomeric forms for a compound of formula (I), and also a racemic compound, i.e. a mixture of at least two enantiomers in a ratio of substantially 50:50.

In each case, the compounds of formula (I) according to the invention are in free form, in oxidized form as a N-oxide or in salt form, e.g. an agronomically usable salt form.

N-oxides are oxidized forms of tertiary amines or oxidized forms of nitrogen containing heteroaromatic compounds. They are described for instance in the book "Heterocyclic N-oxides" by A. Albini and S. Pietra, CRC Press, Boca Raton 1991.

Preferred groups and values for the substituents $R^1$, $R^2$, $R^3$, $R^4$ and $R^5$ in the compounds of formula (I) are, in any combination thereof, as set out below.

Preferably $R^1$ is chloro, bromo, cyano, methyl or $C_1$ fluoroalkyl.

Preferably $R^2$ is n-propyl, iso-propyl or allyl.

Preferably $R^3$ is methyl.

Preferably $R^4$ is ethyl or iso-propyl.

Preferably $R^5$ is methyl.

Preferably component (A) is a compound of formula (I') which are compounds of formula (I) wherein $R^1$ is chloro, bromo, cyano, methyl or $C_1$ fluoroalkyl; $R^2$ is n-propyl, iso-propyl or allyl; $R^3$ is methyl; $R^4$ is ethyl or iso-propyl; and $R^5$ is methyl; or a salt, enantiomer, tautomer or N-oxide thereof.

Most preferably component (A) is a compound selected from compound no. 67.002, 67.003, 67.007, 67.009, 67.011, 67.013, 67.014, 67.015 and 67.018, as defined in the Table X below:

TABLE X

| Compound No. | Structural formula |
|---|---|
| 67.002 | 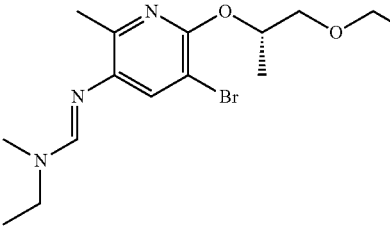<br>N'-[5-bromo-2-methyl-6-[(1S)-1-methyl-2-propoxy-ethoxy]-3-pyridyl]-N-ethyl-N-methyl-formamidine |
| 67.003 | 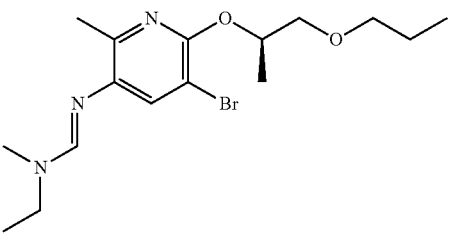<br>N'-[5-bromo-2-methyl-6-[(1R)-1-methyl-2-propoxy-ethoxy]-3-pyridyl]-N-ethyl-N-methyl-formamidine |
| 67.007 | 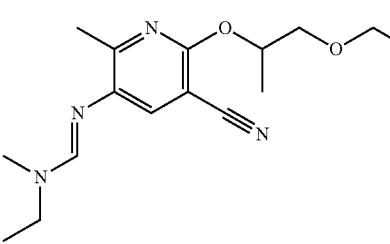<br>N'-[5-cyano-2-methyl-6-(1-methyl-2-propoxy-ethoxy)-3-pyridyl]-N-ethyl-N-methyl-formamidine |

TABLE X-continued

| Compound No. | Structural formula |
|---|---|
| 67.009 | 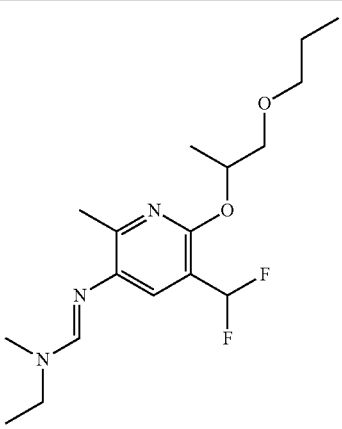
N'-[5-(difluoromethyl)-2-methyl-6-(1-methyl-2-propoxy-ethoxy)-3-pyridyl]-N-ethyl-N-methyl-formamidine |
| 67.011 | 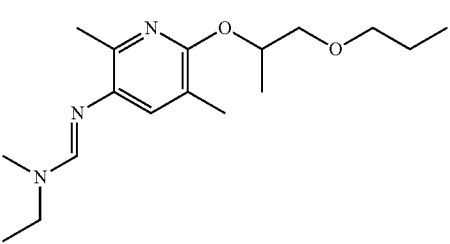
N'-[2,5-dimethyl-6-(1-methyl-2-propoxy-ethoxy)-3-pyridyl]-N-ethyl-N-methyl-formamidine |
| 67.013 | 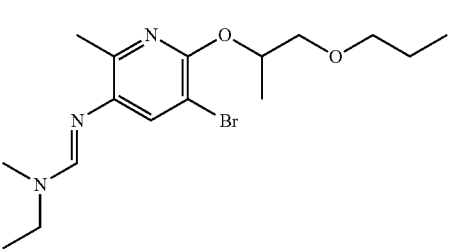
N'-[5-bromo-2-methyl-6-(1-methyl-2-propoxy-ethoxy)-3-pyridyl]-N-ethyl-N-methyl-formamidine |
| 67.014 | 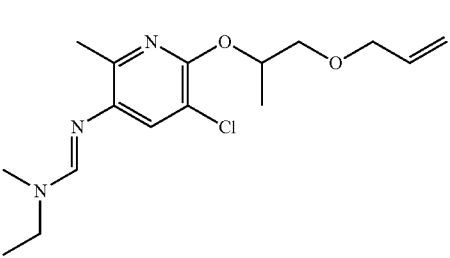
N'-[6-(2-allyloxy-1-methyl-ethoxy)-5-chloro-2-methyl-3-pyridyl]-N-ethyl-N-methyl-formamidine |
| 67.015 | 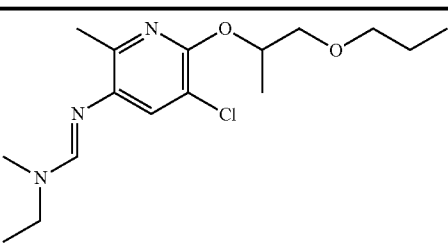
N'-[5-chloro-2-methyl-6-(1-methyl-2-propoxy-ethoxy)-3-pyridyl]-N-ethyl-N-methyl-formamidine |
| 67.018 | 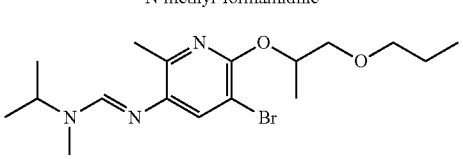
N'-[5-bromo-2-methyl-6-(1-methyl-2-propoxy-ethoxy)-3-pyridyl]-N-isopropyl-N-methyl-formamidine |

Preferably component (B) is a compound selected from the group consisting of azoxystrobin, picoxystrobin, pyraclostrobin, and trifloxystrobin, cyproconazole, difenoconazole, epoxiconazole, metconazole, propiconazole, Mefentrifluconazole, prothioconazole, bixafen, fluopyram, fluxapyroxad, isopyrazam, sedaxane, benzovindiflupyr and pydiflumetofen, acibenzolar-S-methyl, chlorothalonil, mancozeb and dithianon.

Most of the component (B) compounds are referred to herein above by a so-called "ISO common name" or another "common name" being used in individual cases or a trademark name. The component (B) compounds are known and are commercially available and/or can be prepared using procedures known in the art and/or procedures reported in the literature.

For example:

[2-[3-[2-[1-[2-[3,5-bis(difluoromethyl)pyrazol-1-yl]acetyl]-4-piperidyl]thiazol-4-yl]-4,5-dihydroisoxazol-5-yl]-3-chloro-phenyl] methanesulfonate can be prepared according to the the procedures described in WO 2012/025557.

But-3-ynyl N-[6-[[(Z)-[(1-methyltetrazol-5-yl)-phenyl-methylene]amino]oxymethyl]-2-pyridyl]carbamate can be prepared according to the procedures described in WO 2010/000841.

N-[(5-chloro-2-isopropyl-phenyl)methyl]-N-cyclopropyl-3-(difluoromethyl)-5-fluoro-1-methyl-pyrazole-4-carboxamide can be prepared according to the procedures described in WO 2010/130767.

N'-[4-(4,5-dichlorothiazol-2-yl)oxy-2,5-dimethyl-phenyl]-N-ethyl-N-methyl-formamidine can be prepared according to the procedures described in WO 2007/031513.

2-[[3-(2-chlorophenyl)-2-(2,4-difluorophenyl)oxiran-2-yl]methyl]-4H-1,2,4-triazole-3-thione can be prepared according to the procedures described in WO 2010/146031.

2-[2-chloro-4-(4-chlorophenoxy)phenyl]-1-(1,2,4-triazol-1-yl)propan-2-ol can be prepared according to the procedures described in WO 2013/024082.

4-(2-bromo-4-fluoro-phenyl)-N-(2-chloro-6-fluoro-phenyl)-2,5-dimethyl-pyrazol-3-amine can be prepared according to the procedures described in WO 2012/031061.

2-[2-fluoro-6-[(8-fluoro-2-methyl-3-quinolyl)oxy]phenyl]propan-2-ol can be prepared according to the procedures described in WO 2011/081174.

4,4,5-trifluoro-3,3-dimethyl-1-(3-quinolyl)isoquinoline can be prepared according to the procedures described in WO 2005/070917.

3-(difluoromethyl)-N-(7-fluoro-1,1,3-trimethyl-indan-4-yl)-1-methyl-pyrazole-4-carboxamide can be prepared according to the procedures described in WO 2012/084812.

3-(difluoromethyl)-1-methyl-N-(1,1,3-trimethylindan-4-yl)pyrazole-4-carboxamide can be prepared according to the procedures described in WO 2014/013842.

3-chloro-6-methyl-5-phenyl-4-(2,4,6-trifluorophenyl)pyridazine can be prepared according to the procedures described in WO 2005/121104.

3-chloro-4-(2,6-difluorophenyl)-6-methyl-5-phenyl-pyridazine can be prepared according to the procedures described in WO 2012/020774.

2-(difluoromethyl)-N-(1,1,3-trimethylindan-4-yl)pyridine-3-carboxamide, 2-(difluoromethyl)-N-(3-ethyl-, 1-dimethyl-indan-4-yl)pyridine-3-carboxamide, 2-(difluoromethyl)-N-(1,1-dimethyl-3-propyl-indan-4-yl)pyridine-3-carboxamide, 2-(difluoromethyl)-N-(3-isobutyl-, 1-dimethyl-indan-4-yl)pyridine-3-carboxamide, 2-(difluoromethyl)-N-[(3R)-1,1,3-trimethylindan-4-yl]pyridine-3-carboxamide, 2-(difluoromethyl)-N-[(3R)-3-ethyl-1,1-dimethyl-indan-4-yl]pyridine-3-carboxamide, and 2-(difluoromethyl)-N-[(3R)-1,1-dimethyl-3-propyl-indan-4-yl]pyridine-3-carboxamide can be prepared according to the procedures described in WO 2014/095675 and/or WO 2016/139189.

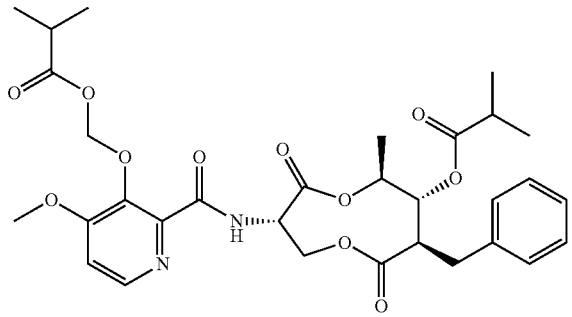 [SMILES: COc1ccnc(C(=O)N[C@H]2COC(=O)[C@H](Cc3ccccc3)[C@@H](OC(=O)C(C)C)[C@H](C)OC2=O)c1OCOC(=O)C(C)C]

can be prepared according to the procedures described in WO 2003/035617.

In a preferred embodiment composition IA comprises as active ingredients a mixture of component (A) and component (B), wherein component (A) is a compound of formula (I)

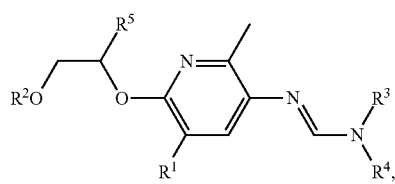

wherein
$R^1$ represents hydrogen, chloro, bromo, cyano, $C_1$-$C_2$ alkyl, $CO_2(C_1$-$C_2$ alkyl), $CO_2H$, $CONH_2$, $CONH(C_1$-$C_4$ alkyl), $CON(C_1$-$C_4$ alkyl)$_2$, $C_1$-$C_4$ haloalkyl, or $C_1$-$C_4$ haloalkoxy;

$R^2$ represents $C_3$-$C_6$alkyl, $C_3$-$C_6$alkenyl, or $R^6$;
$R^3$ and $R^4$ independently of each other represent hydrogen, methyl, ethyl, isopropyl or cyclopropyl; or $R^3$ and $R^4$ together with the nitrogen atom to which they are attached form a 3-, 4- or 5-membered saturated cyclic group;
$R^5$ represents $C_1$-$C_3$ alkyl, or $C_1$-$C_2$ alkoxy$C_1$-$C_2$ alkyl;
$R^6$ represents phenyl, which can be substituted by chloro or $C_1$-fluoroalkyl; or a salt, enantiomer, tautomer or N-oxide thereof; and component (B) is a compound selected from the group consisting of azoxystrobin, picoxystrobin, pyraclostrobin, and trifloxystrobin, cyproconazole, difenoconazole, epoxiconazole, metconazole, propiconazole, Mefentrifluconazole, prothioconazole, bixafen, fluopyram, fluxapyroxad, isopyrazam, sedaxane, benzovindiflupyr and pydiflumetofen, acibenzolar-S-methyl, chlorothalonil, mancozeb and dithianon.

In composition IA it is preferred that component (A) is a compound of formula (I') which are compounds of formula (I) wherein $R^1$ is chloro, bromo, cyano, methyl or $C_1$ fluoroalkyl; $R^2$ is n-propyl, iso-propyl or allyl; $R^3$ is methyl; $R^4$ is ethyl or iso-propyl; and $R^5$ is methyl; or a salt, enantiomer, tautomer or N-oxide thereof.

In composition IA it is most preferred that component (A) is a compound selected from N'-[5-bromo-2-methyl-6-[(1S)-1-methyl-2-propoxy-ethoxy]-3-pyridyl]-N-ethyl-N-methyl-formamidine (compound 67.002), N'-[5-bromo-2-methyl-6-[(1R)-1-methyl-2-propoxy-ethoxy]-3-pyridyl]-N-ethyl-N-methyl-formamidine (compound 67.003), N'-[5-cyano-2-methyl-6-(1-methyl-2-propoxy-ethoxy)-3-pyridyl]-N-ethyl-N-methyl-formamidine (compound 67.007), N'-[5-(difluoromethyl)-2-methyl-6-(1-methyl-2-propoxy-ethoxy)-3-pyridyl]-N-ethyl-N-methyl-formamidine (compound 67.009), N'-[2,5-dimethyl-6-(1-methyl-2-propoxy-ethoxy)-3-pyridyl]-N-ethyl-N-methyl-formamidine (compound 67.011), N'-[5-bromo-2-methyl-6-(1-methyl-2-propoxy-ethoxy)-3-pyridyl]-N-ethyl-N-methyl-formamidine (compound 67.013), N'-[6-(2-allyloxy-1-methyl-ethoxy)-5-chloro-2-methyl-3-pyridyl]-N-ethyl-N-methyl-formamidine (compound 67.014), N'-[5-chloro-2-methyl-6-(1-methyl-2-propoxy-ethoxy)-3-pyridyl]-N-ethyl-N-methyl-formamidine (compound 67.015), and N'-[5-bromo-2-methyl-6-(1-methyl-2-propoxy-ethoxy)-3-pyridyl]-N-isopropyl-N-methyl-formamidine (compound 67.018); or a salt, enantiomer, tautomer or N-oxide thereof.

In a preferred composition of the embodiment of composition IA component (A) is N'-[5-bromo-2-methyl-6-[(1S)-1-methyl-2-propoxy-ethoxy]-3-pyridyl]-N-ethyl-N-methyl-formamidine (compound 67.002); or a salt, enantiomer, tautomer or N-oxide thereof.

In another preferred composition of the embodiment of composition IA component (A) is N'-[5-bromo-2-methyl-6-[(1R)-1-methyl-2-propoxy-ethoxy]-3-pyridyl]-N-ethyl-N-methyl-formamidine (compound 67.003); or a salt, enantiomer, tautomer or N-oxide thereof.

In another preferred composition of the embodiment of composition IA component (A) is N'-[5-cyano-2-methyl-6-(1-methyl-2-propoxy-ethoxy)-3-pyridyl]-N-ethyl-N-methyl-formamidine (compound 67.007); or a salt, enantiomer, tautomer or N-oxide thereof.

In another preferred composition of the embodiment of composition IA component (A) is N'-[5-(difluoromethyl)-2-methyl-6-(1-methyl-2-propoxy-ethoxy)-3-pyridyl]-N-ethyl-N-methyl-formamidine (compound 67.009); or a salt, enantiomer, tautomer or N-oxide thereof.

In another preferred composition of the embodiment of composition IA component (A) is N'-[2,5-dimethyl-6-(1- methyl-2-propoxy-ethoxy)-3-pyridyl]-N-ethyl-N-methyl-formamidine (compound 67.011); or a salt, enantiomer, tautomer or N-oxide thereof.

In another preferred composition of the embodiment of composition IA component (A) is N'-[5-bromo-2-methyl-6-(1-methyl-2-propoxy-ethoxy)-3-pyridyl]-N-ethyl-N-methyl-formamidine (compound 67.013); or a salt, enantiomer, tautomer or N-oxide thereof.

In another preferred composition of the embodiment of composition IA component (A) is N'-[6-(2-allyloxy-1-methyl-ethoxy)-5-chloro-2-methyl-3-pyridyl]-N-ethyl-N-methyl-formamidine (compound 67.014); or a salt, enantiomer, tautomer or N-oxide thereof.

In another preferred composition of the embodiment of composition IA component (A) is N'-[5-chloro-2-methyl-6-(1-methyl-2-propoxy-ethoxy)-3-pyridyl]-N-ethyl-N-methyl-formamidine (compound 67.015); or a salt, enantiomer, tautomer or N-oxide thereof.

In another preferred composition of the embodiment of composition IA component (A) is N'-[5-bromo-2-methyl-6-(1-methyl-2-propoxy-ethoxy)-3-pyridyl]-N-isopropyl-N-methyl-formamidine (compound 67.018); or a salt, enantiomer, tautomer or N-oxide thereof.

In a further preferred embodiment composition IB comprises as active ingredients a mixture of component (A) and component (B), wherein component (A) is a compound of formula (I') which are compounds of formula (I) wherein $R^1$ is chloro, bromo, cyano, methyl or $C_1$ fluoroalkyl; $R^2$ is n-propyl, iso-propyl or allyl; $R^3$ is methyl; $R^4$ is ethyl or iso-propyl; and $R^5$ is methyl; or a salt, enantiomer, tautomer or N-oxide thereof; and component (B) is a compound selected from the group consisting of (B1) a strobilurin fungicide selected from the group consisting of azoxystrobin, picoxystrobin, enoxastrobin, pyraoxystrobin, mandestrobin, flufenoxystrobin, coumoxystrobin, orysastrobin, dimoxystrobin, metominostrobin, fenaminostrobin, pyrametostrobin, triclopyricarb, kresoxim-methyl, fluoxastrobin, pyribencarb, pyraclostrobin and trifloxystrobin;

(B2) an azole fungicide selected from the group consisting of azaconazole, etaconazole, ipconazole, tebuconazole, bitertanol, fenbucoanzole, metconazole, tetraconazole, bromuconazole, fluquinconazole, myclobutanil, triadimefon, flusilazole, penconazole, triadimenol, triticonazole, simeconazole, imibenconazole, hexaconazole, flutriafol, diniconazole, cyproconazole, difenoconazole, epoxiconazole, propiconazole, prothioconazole, pyrifenox, nuarimol, fenarimol, imizalil, triflumizole, prochloraz, pefurazoate, oxpoconazole, Mefentrifluconazole, 2-[[3-(2-chlorophenyl)-2-(2,4-difluorophenyl)oxiran-2-yl]methyl]-4H-1,2,4-triazole-3-thione and 2-[2-chloro-4-(4-chlorophenoxy)phenyl]-1-(1,2,4-triazol-1-yl)propan-2-ol;

(B3) a morpholine fungicide selected from aldimorph, dodemorph, fenpropimorph and tridemorph;

(B4) a carboxamide fungicide selected from bixafen, fluopyram, fluxapyroxad, isopyrazam, sedaxane, furametpyr, penflufen, penthiopyrad, benzovindiflupyr, thifluzamide, isofetamid, boscalid, carboxin, oxycarboxin, fenfuram, flutolanil, pyraziflumid, pydiflumetofen, mepronil, benodanil, N-[(5-chloro-2-isopropyl-phenyl)methyl]-N-cyclopropyl-3-(difluoromethyl)-5-fluoro-1-methyl-pyrazole-4-carboxamide, 3-(difluoromethyl)-N-(7-fluoro-1,1,3-trimethyl-indan-4-yl)-1-methyl-pyrazole-4-carboxamide, 3-(difluoromethyl)-1-methyl-N-(1,1,3-trimethylindan-4-yl) pyrazole-4-carboxamide and (R)-3-(difluoromethyl)-1-methyl-N-(1,1,3-trimethylindan-4-yl)pyrazole-4-carboxamide;

(B5) an anilinopyrimidine fungicide selected from cyprodinil, mepanipyrim and pyrimethanil;

(B6) an phenylpyrrole fungicide selected from fludioxonil and fenpiclonil;

(B7) a phenylamide fungicide selected from benalaxyl, benalaxyl-M, furalaxyl, mefenoxam (metalaxyl-M) and metalaxyl, ofurace and oxadixyl;

(B8) a fungicide selected from the group consisting of ametoctradin, amisulbrom, anilazine, aureofungin, benomyl, benthiavalicarb, benthiazole, bethoxazin, BLAD, blasticidin-S, Bordeaux mixture, bupirimate, calcium polysulfide, captafol, captan, carbaryl, carbendazim, carpropamid, chinomethionate, chitosan, chlobenthiazone, chlorfenazole, chloroneb, chlorothalonil, chlozolinate, climbazole, copper acetate, copper carbonate, copper hydroxide, copper naphthenate, copper oleate, copper oxychloride, copper oxyquinolate, copper silicate, copper sulphate, copper tallate, cuprous oxide, cyazofamid, cyclafuramid, cyflufenamid, cymoxanil, dazomet, dichlofluanid, dichlorprop, diclocymet, diclomezine, dicloran, diethofencarb, diflumetorim, dimetachlone, dimethipin, dimethirimol, dimethomorph, dinocap, dinocton, dinobuton, dinopenton, dipymetitrone, ditalimfos, dithianon, dodicin, dodine, doguadine, edifenphos, etem, ethaboxam, ethirimol, ethoxyquin, etridiazole, famoxadone, fenamidone, fenarimol, fenhexamid, fenoxanil, fenpropidine, fenpyrazamine, fentin acetate, fentin hydroxide, ferbam, ferimzone, fluazinam, flumorph, fluopicolide, fluoroimide, flusulfamide, flutianil, folpet, fosetyl-Al, fuberidazole, gibberellic acid, guazatine, hymexazole, iminoctadine, iodocarb, iprobenfos, iprodione, iprovalicarb, isoprothiolane, kasugamycin, mancozeb, mandipropamid, maneb, metam, meptyldinocap, metiram, metrafenone, nabam, oxathiapiprolin, paclobutrazol, pencycuron, phenamacril, phosdiphen, phthalide, picarbutrazox, polyoxin D, probenazole, procymidone, prohexadione, propamocarb, propineb, proquinazid, pyrazophos, pyrifenox, pyrimorph, pyriofenone, pyroquilon, quinoxyfen, quintozene, silthiofam, spiroxamine, streptomycin, sulphur, tebufloquin, tecloftalam, tecnazene, thiabendazole, thidiazuron, thicyofen, thiophanate-methyl, thiram, tioxymid, tolclofos-methyl, tolprocarb, tolylfluanid, triazoxide, tribufos, triclazole, triforine, validamycin, valifenalate, vapam, vinclozolin, zineb, ziram, zoxamide, [2-[3-[2-[1-[2-[3,5-bis (difluoromethyl)pyrazol-1-yl]acetyl]-4-piperidyl]thiazol-4-yl]-4,5-dihyd roisoxazol-5-yl]-3-chloro-phenyl] methanesulfonate, but-3-ynyl N-[6-[[(Z)-[(1-methyltetrazol-5-yl)-phenyl-methylene]amino]oxymethyl]-2-pyridyl]carbamate, N'-[4-(4,5-dichlorothiazol-2-yl)oxy-2,5-dimethyl-phenyl]-N-ethyl-N-methyl-formamidine, 4-(2-bromo-4-fluoro-phenyl)-N-(2-chloro-6-fluoro-phenyl)-2,5-dimethyl-pyrazol-3-amine, 2-[2-fluoro-6-[(8-fluoro-2-methyl-3-quinolyl)oxy] phenyl]propan-2-ol, 4,4,5-trifluoro-3,3-dimethyl-1-(3-quinolyl)isoquinoline, 3-chloro-6-methyl-5-phenyl-4-(2,4,6-trifluorophenyl)pyridazine, 3-chloro-4-(2,6-difluorophenyl)-6-methyl-5-phenyl-pyridazine, 2-(difluoromethyl)-N-(1,1,3-trimethylindan-4-yl)pyridine-3-carboxamide, 2-(difluoromethyl)-N-(3-ethyl-1,1-dimethyl-indan-4-yl)pyridine-3-carboxamide, 2-(difluoromethyl)-N-(1,1-dimethyl-3-propyl-indan-4-yl)pyridine-3-carboxamide, 2-(difluoromethyl)-N-(3-isobutyl-1,1-dimethyl-indan-4-yl)pyridine-3-carboxamide, 2-(difluoromethyl)-N-[(3R)-1,1,3-trimethylindan-4-yl]pyridine-3-carboxamide, 2-(difluoromethyl)-N-[(3R)-3-ethyl-1,1-dimethyl-indan-4-yl]pyridine-3-carboxamide, 2-(difluoromethyl)-N-[(3R)-1,1-dimethyl-3-propyl-indan-4-yl] pyridine-3-carboxamide, a compound of the formula a compound of the formula

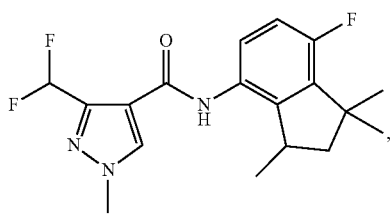 [SMILES: CC1CC(C)(C)c2c(F)ccc(NC(=O)c3cn(C)nc3C(F)F)c21]

and a compound of the formula:

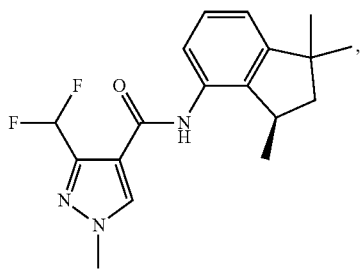 [SMILES: C[C@@H]1CC(C)(C)c2cccc(NC(=O)c3cn(C)nc3C(F)F)c21]

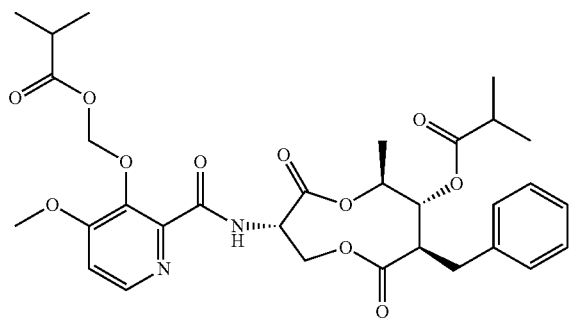 [SMILES: COc1ccnc(C(=O)N[C@H]2COC(=O)[C@H](Cc3ccccc3)[C@@H](OC(=O)C(C)C)[C@H](C)OC2=O)c1OCOC(=O)C(C)C]

(B9) a plant-bioregulator selected from the group consisting of acibenzolar-S-methyl, chlormequat chloride, ethephon, isotianil, mepiquat chloride, tiadinil and trinexapac-ethyl;

(B10) an insecticide selected from the group consisting of abamectin, acequinocyl, acetamiprid, acrinathrin, afidopyropen, alanycarb, allethrin, alpha-cypermethrin, alphamethrin, amidoflumet, azadirachtin, azocyclotin, *bacillus firmus, bacillus thuringiensis*, bensultap, benzoximate, betacyfluthrin, bifenazate, binapacryl, bioallethrin, bioresmethrin, biphenthrin, broflanilide, brofluthrinate, bromophos-ethyl, buprofezine, cadusafos, carbaryl, carbosulfan, cartap, chlorantraniliprole, chlorfenapyr, chromafenozide, cloethocarb, clothianidin, cyantraniliprole, cyclaniliprole, cycloprothrin, cycloxaprid, cyenopyrafen, cyflumetofen, cyfluthrin, cyhalothrin, cypermethrin, cyphenothrin, cyromazine, deltamethrin, demeton-s-methyl, diafenthiuron, dialifos, dichloromezotiaz, diflovidazine, diflubenzuron, dinactin, dinocap, dinotefuran, d-limonene, emamectin, empenthrin, esfenvalerate, ethion, ethiprole, etofenprox, etoxazole, famphur, fenazaquin, fenfluthrin, fenobucarb, fenoxycarb, fenpropathrin, fenpyroximate, fenvalerate, fipronil, flometoquin, flonicamid, fluacrypyrim, fluazuron, flubendiamide, flucythrinate, fluensulfone, flufenerim, flufenprox, flufiprole, fluhexafon, flumethrin, flupyradifuron, fluvalinate, fosthiazate, gamma-cyhalothrin, gossyplure, guadipyr, halofenozide, halofenprox, harpin, hexythiazox, hydramethylnon, imicyafos, imidacloprid, imiprothrin, indoxacarb, iodomethane, isothioate, ivermectin, lambda-cyhalothrin, lepimectin, lufenuron, metaflumizone, metaldehyde, methomyl, methoxyfenozide, metofluthrin, milbemectin, niclosamide, nitenpyram, oxamyl, parathion-ethyl, pasteuria nishizawae, p-cymene, permethrin, phenothrin, phosphocarb, piperonylbutoxide, pirimicarb, pirimiphos-ethyl, polyhedrosis virus, prallethrin, profenofos, profenofos, propargite, propetamphos, protrifenbute, pyflubumide, pymetrozine, pyraclofos, pyrafluprole, pyrethrum, pyridaben, pyridalyl, pyrifluquinazon, pyrimidifen, pyriprole, pyriproxyfen, selamectin, silafluofen, spinetoram, spinosad, spirodiclofen, spiromesifen, spirotetramat, sulfoxaflor, tebufenozide, tebufenpyrad, tefluthrin, terpenoid blends, terpenoids, tetradiphon, tetramethrin, tetranactin, tetraniliprole, theta-cypermethrin, thiacloprid, thiamethoxam, thiodicarb, tioxazafen, tolfenpyrad, transfluthrin, trichlorfon, triflumezopyrim, zeta-cypermethrin and α-terpinene; and (B11) glyphosate.

In composition IB it is most preferred that component (A) is a compound selected from N'-[5-bromo-2-methyl-6-[(1S)-1-methyl-2-propoxy-ethoxy]-3-pyridyl]-N-ethyl-N-methyl-formamidine (compound 67.002), N'-[5-bromo-2-methyl-6-[(1R)-1-methyl-2-propoxy-ethoxy]-3-pyridyl]-N-ethyl-N-methyl-formamidine (compound 67.003), N'-[5-cyano-2-methyl-6-(1-methyl-2-propoxy-ethoxy)-3-pyridyl]-N-ethyl-N-methyl-formamidine (compound 67.007), N'-[5-(difluoromethyl)-2-methyl-6-(1-methyl-2-propoxy-ethoxy)-3-pyridyl]-N-ethyl-N-methyl-formamidine (compound 67.009), N'-[2,5-dimethyl-6-(1-methyl-2-propoxy-ethoxy)-3-pyridyl]-N-ethyl-N-methyl-formamidine (compound 67.011), N'-[5-bromo-2-methyl-6-(1-methyl-2-propoxy-ethoxy)-3-pyridyl]-N-ethyl-N-methyl-formamidine (compound 67.013), N'-[6-(2-allyloxy-1-methyl-ethoxy)-5-chloro-2-methyl-3-pyridyl]-N-ethyl-N-methyl-formamidine (compound 67.014), N'-[5-chloro-2-methyl-6-(1-methyl-2-propoxy-ethoxy)-3-pyridyl]-N-ethyl-N-methyl-formamidine (compound 67.015), and N'-[5-bromo-2-methyl-6-(1-methyl-2-propoxy-ethoxy)-3-pyridyl]-N-isopropyl-N-methyl-formamidine (compound 67.018); or a salt, enantiomer, tautomer or N-oxide thereof.

In a preferred composition of the embodiment of composition IB component (A) is N'-[5-bromo-2-methyl-6-[(1S)-1-methyl-2-propoxy-ethoxy]-3-pyridyl]-N-ethyl-N-methyl-formamidine (compound 67.002); or a salt, enantiomer, tautomer or N-oxide thereof.

In another preferred composition of the embodiment of composition IB component (A) is N'-[5-bromo-2-methyl-6-[(1R)-1-methyl-2-propoxy-ethoxy]-3-pyridyl]-N-ethyl-N-methyl-formamidine (compound 67.003); or a salt, enantiomer, tautomer or N-oxide thereof.

In another preferred composition of the embodiment of composition IB component (A) is N'-[5-cyano-2-methyl-6-(1-methyl-2-propoxy-ethoxy)-3-pyridyl]-N-ethyl-N-methyl-formamidine (compound 67.007); or a salt, enantiomer, tautomer or N-oxide thereof.

In another preferred composition of the embodiment of composition IB component (A) is N'-[5-(difluoromethyl)-2-methyl-6-(1-methyl-2-propoxy-ethoxy)-3-pyridyl]-N-ethyl-N-methyl-formamidine (compound 67.009); or a salt, enantiomer, tautomer or N-oxide thereof.

In another preferred composition of the embodiment of composition IB component (A) is N'-[2,5-dimethyl-6-(1- methyl-2-propoxy-ethoxy)-3-pyridyl]-N-ethyl-N-methyl-formamidine (compound 67.011); or a salt, enantiomer, tautomer or N-oxide thereof.

In another preferred composition of the embodiment of composition IB component (A) is N'-[5-bromo-2-methyl-6-(1-methyl-2-propoxy-ethoxy)-3-pyridyl]-N-ethyl-N-methyl-formamidine (compound 67.013); or a salt, enantiomer, tautomer or N-oxide thereof.

In another preferred composition of the embodiment of composition IB component (A) is N'-[6-(2-allyloxy-1-methyl-ethoxy)-5-chloro-2-methyl-3-pyridyl]-N-ethyl-N-methyl-formamidine (compound 67.014); or a salt, enantiomer, tautomer or N-oxide thereof.

In another preferred composition of the embodiment of composition IB component (A) is N'-[5-chloro-2-methyl-6-(1-methyl-2-propoxy-ethoxy)-3-pyridyl]-N-ethyl-N-methyl-formamidine (compound 67.015); or a salt, enantiomer, tautomer or N-oxide thereof.

In another preferred composition of the embodiment of composition IB component (A) is N'-[5-bromo-2-methyl-6-(1-methyl-2-propoxy-ethoxy)-3-pyridyl]-N-isopropyl-N-methyl-formamidine (compound 67.018); or a salt, enantiomer, tautomer or N-oxide thereof.

The term "fungicide" as used herein means a compound that controls, modifies, or prevents the growth of fungi. The term "fungicidally effective amount" means the quantity of such a compound or combination of such compounds that is capable of producing an effect on the growth of fungi. Controlling or modifying effects include all deviation from natural development, such as killing, retardation and the like, and prevention includes barrier or other defensive formation in or on a plant to prevent fungal infection.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

The term "locus" as used herein means fields in or on which plants are growing, or where seeds of cultivated plants are sown, or where seed will be placed into the soil. It includes soil, seeds, and seedlings, as well as established vegetation.

Throughout this document the expression "composition" stands for the various mixtures or combinations of components (A) and (B) (including the above-defined embodiments), for example in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the components (A) and (B) is not essential for working the present invention.

The composition according to the invention is effective against harmful microorganisms, such as microorganisms, that cause phytopathogenic diseases, in particular against phytopathogenic fungi and bacteria.

The composition of the invention may be used to control plant diseases caused by a broad spectrum of fungal plant pathogens in the Basidiomycete, Ascomycete, Oomycete and/or Deuteromycete, Blasocladiomycete, Chrytidiomycete, Glomeromycete and/or Mucoromycete classes.

The composition is effective in controlling a broad spectrum of plant diseases, such as foliar pathogens of ornamental, turf, vegetable, field, cereal, and fruit crops.

These pathogens may include:

Oomycetes, including *Phytophthora* diseases such as those caused by *Phytophthora capsici, Phytophthora infestans, Phytophthora sojae, Phytophthora fragariae, Phytophthora nicotianae, Phytophthora cinnamomi, Phytophthora citricola, Phytophthora citrophthora* and *Phytophthora erythroseptica*; *Pythium* diseases such as those caused by *Pythium aphanidermatum, Pythium arrhenomanes, Pythium graminicola, Pythium irregulare* and *Pythium ultimum*; diseases caused by Peronosporales such as *Peronospora destructor, Peronospora parasitica, Plasmopara viticola, Plasmopara halstedii, Pseudoperonospora cubensis, Albugo candida, Sclerophthora macrospora* and *Bremia lactucae*; and others such as *Aphanomyces cochlioides, Labyrinthula zosterae, Peronosclerospora sorghi* and *Sclerospora graminicola*;

Ascomycetes, including blotch, spot, blast or blight diseases and/or rots for example those caused by Pleosporales such as *Stemphylium solani, Stagonospora tainanensis, Spilocaea oleaginea, Setosphaeria turcica, Pyrenochaeta lycoperisici, Pleospora herbarum, Phoma destructiva, Phaeosphaeria herpotrichoides, Phaeocryptocus gaeumannii, Ophiosphaerella graminicola, Ophiobolus graminis, Leptosphaeria maculans, Hendersonia creberrima, Helminthosporium triticirepentis, Setosphaeria turcica, Drechslera glycines, Didymella bryoniae, Cycloconium oleagineum, Corynespora cassiicola, Cochliobolus sativus, Bipolaris cactivora, Venturia inaequalis, Pyrenophora teres, Pyrenophora tritici-repentis, Alternaria alternata, Alternaria brassicicola, Alternaria solani* and *Alternaria tomatophila*, Capnodiales such as *Septoria tritici, Septoria nodorum, Septoria glycines, Cercospora arachidicola, Cercospora sojina, Cercospora zeae-maydis, Cercosporella capsellae* and *Cercosporella herpotrichoides, Cladosporium carpophilum, Cladosporium effusum, Passalora fulva, Cladosporium oxysporum, Dothistroma septosporum, Isariopsis clavispora, Mycosphaerella fijiensis, Mycosphaerella graminicola, Mycovellosiella koepkeii, Phaeoisariopsis bataticola, Pseudocercospora vitis, Pseudocercosporella herpotrichoides, Ramularia beticola, Ramularia collo-cygni*, Magnaporthales such as *Gaeumannomyces graminis, Magnaporthe grisea, Pyricularia oryzae*, Diaporthales such as *Anisogramma anomala, Apiognomonia errabunda, Cytospora platani, Diaporthe phaseolorum, Discula destructiva, Gnomonia fructicola, Greeneria uvicola, Melanconium juglandinum, Phomopsis viticola, Sirococcus clavigignenti-juglandacearum, Tubakia dryina, Dicarpella* spp., *Valsa ceratosperma*, and others such as *Actinothyrium graminis, Ascochyta pisi, Aspergillus flavus, Aspergillus fumigatus, Aspergillus nidulans, Asperisporium caricae, Blumeriella jaapii, Candida* spp., *Capnodium ramosum, Cephaloascus* spp., *Cephalosporium gramineum, Ceratocystis paradoxa, Chaetomium* spp., *Hymenoscyphus pseudoalbidus, Coccidioides* spp., *Cylindrosporium padi, Diplocarpon malae, Drepanopeziza campestris, Elsinoe ampelina, Epicoccum nigrum, Epidermophyton* spp., *Eutypa lata, Geotrichum candidum, Gibellina cerealis, Gloeocercospora sorghi, Gloeodes pomigena, Gloeosporium perennans; Gloeotinia temulenta, Griphospaeria corticola, Kabatiella lini, Leptographium microsporum, Leptosphaerulinia crassiasca, Lophodermium seditiosum, Marssonina graminicola, Microdochium nivale, Monilinia fructicola, Monographella albescens, Monosporascus cannonballus, Naemacyclus* spp., *Ophiostoma novo-ulmi, Paracoccid-*

*ioides brasiliensis, Penicillium expansum, Pestalotia rhododendri, Petriellidium* spp., *Pezicula* spp., *Phialophora gregata, Phyllachora pomigena, Phymatotrichum omnivora, Physalospora abdita, Plectosporium tabacinum, Polyscytalum pustulans, Pseudopeziza medicaginis, Pyrenopeziza brassicae, Ramulispora sorghi, Rhabdocline pseudotsugae, Rhynchosporium secalis, Sacrocladium oryzae, Scedosporium* spp., *Schizothyrium pomi, Sclerotinia sclerotiorum, Sclerotinia minor; Sclerotium* spp., *Typhula ishikariensis, Seimatosporium mariae, Lepteutypa cupressi, Septocyta ruborum, Sphaceloma perseae, Sporonema phacidioides, Stigmina palmivora, Tapesia yallundae, Taphrina bullata, Thielviopsis basicola, Trichoseptoria fructigena, Zygophiala jamaicensis*; powdery mildew diseases for example those caused by Erysiphales such as *Blumeria graminis, Erysiphe polygoni, Uncinula necator, Sphaerotheca fuligena, Podosphaera leucotricha, Podospaera macularis Golovinomyces cichoracearum, Leveillula taurica, Microsphaera diffusa, Oidiopsis gossypii, Phyllactinia guttata* and *Oidium arachidis*; molds for example those caused by Botryosphaeriales such as *Dothiorella aromatica, Diplodia seriata, Guignardia bidwellii, Botrytis cinerea, Botryotinia allii, Botryotinia fabae, Fusicoccum amygdali, Lasiodiplodia theobromae, Macrophoma theicola, Macrophomina phaseolina, Phyllosticta cucurbitacearum*; anthracnoses for example those caused by Glommerelales such as *Colletotrichum gloeosporioides, Colletotrichum lagenarium, Colletotrichum gossypii, Glomerella cingulata,* and *Colletotrichum graminicola*; and wilts or blights for example those caused by Hypocreales such as *Acremonium strictum, Claviceps purpurea, Fusarium culmorum, Fusarium graminearum, Fusarium virguliforme, Fusarium oxysporum, Fusarium subglutinans, Fusarium oxysporum* f.sp. *cubense, Gerlachia nivale, Gibberella fujikuroi, Gibberella zeae, Gliocladium* spp., *Myrothecium verrucaria, Nectria ramulariae, Trichoderma viride, Trichothecium roseum,* and *Verticillium theobromae;*

Basidiomycetes, including smuts for example those caused by Ustilaginales such as Ustilaginoidea *virens, Ustilago nuda, Ustilago tritici, Ustilago zeae,* rusts for example those caused by Pucciniales such as *Cerotelium fici, Chrysomyxa arctostaphyli, Coleosporium ipomoeae, Hemileia vastatrix, Puccinia arachidis, Puccinia cacabata, Puccinia graminis, Puccinia recondita, Puccinia sorghi, Puccinia hordei, Puccinia striiformis* f.sp. *Hordei, Puccinia striiformis* f.sp. *Secalis, Pucciniastrum coryli,* or Uredinales such as *Cronartium ribicola, Gymnosporangium juniperi-viginianae, Melampsora medusae, Phakopsora pachyrhizi, Phragmidium mucronatum, Physopella ampelosidis, Tranzschelia* discolor and *Uromyces viciae-fabae*; and other rots and diseases such as those caused by *Cryptococcus* spp., *Exobasidium vexans, Marasmiellus inoderma, Mycena* spp., *Sphacelotheca reiliana, Typhula ishikariensis, Urocystis agropyri, Itersonilia perplexans, Corticium invisum, Laetisaria fuciformis, Waitea circinata, Rhizoctonia solani, Thanetephorus cucurmeris, Entyloma dahliae, Entylomella microspora, Neovossia moliniae* and *Tilletia caries;*

Blastocladiomycetes, such as *Physoderma maydis;*

Mucoromycetes, such as *Choanephora cucurbitarum.; Mucor* spp.; *Rhizopus arrhizus*; as well as diseases caused by other species and genera closely related to those listed above.

In addition to their fungicidal activity, the compositions may also have activity against bacteria such as *Erwinia amylovora, Erwinia caratovora, Xanthomonas campestris, Pseudomonas syringae, Strptomyces* scabies and other related species as well as certain protozoa.

The composition according to the invention is particularly effective against phytopathogenic fungi belonging to the following classes: Ascomycetes (e.g. *Venturia, Podosphaera, Erysiphe, Monilinia, Mycosphaerella, Uncinula*); Basidiomycetes (e.g. the genus *Hemileia, Rhizoctonia, Phakopsora, Puccinia, Ustilago, Tilletia*); Fungi imperfecti (also known as Deuteromycetes; e.g. *Botrytis, Helminthosporium, Rhynchosporium, Fusarium, Septoria, Cercospora, Alternaria, Pyricularia* and *Pseudocercosporella*); Oomycetes (e.g. *Phytophthora, Peronospora, Pseudoperonospora, Albugo, Bremia, Pythium, Pseudosclerospora, Plasmopara*).

Crops of useful plants in which the composition according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and *Zoysia* grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides like bromoxynil or classes of herbicides such as ALS-, EPSPS-, GS-, HPPD- and PPO-inhibitors. An example of a crop that has been rendered tolerant to imidazolinones, e.g. imazamox, by conventional methods of breeding is Clearfield® summer canola. Examples of crops that have been rendered tolerant to herbicides by genetic engineering methods include e.g. glyphosate- and glufosinate-resistant maize varieties commercially available under the trade names RoundupReady®, Herculex I® and LibertyLink®.

Crops are also to be understood as being those which naturally are or have been rendered resistant to harmful insects. This includes plants transformed by the use of recombinant DNA techniques, for example, to be capable of synthesising one or more selectively acting toxins, such as are known, for example, from toxin-producing bacteria.

Examples of toxins which can be expressed include δ-endotoxins, vegetative insecticidal proteins (Vip), insecticidal proteins of bacteria colonising nematodes, and toxins produced by scorpions, arachnids, wasps and fungi.

An example of a crop that has been modified to express the *Bacillus thuringiensis* toxin is the Bt maize KnockOut® (Syngenta Seeds). An example of a crop comprising more than one gene that codes for insecticidal resistance and thus expresses more than one toxin is VipCot® (Syngenta Seeds). Crops or seed material thereof can also be resistant to multiple types of pests (so-called stacked transgenic events when created by genetic modification). For example, a plant can have the ability to express an insecticidal protein while at the same time being herbicide tolerant, for example Herculex I® (Dow AgroSciences, Pioneer Hi-Bred International).

Further preferred examples of compositions according to the invention are as follows (wherein the term "TX1" means: "a compound selected from compound no. 67.002, 67.003, 67.007, 67.009, 67.011, 67.013, 67.014, 67.015 and 67.018, as defined in the Table X above"):

TX1+azoxystrobin, TX1+picoxystrobin, TX1+pyraclostrobin, TX1+trifloxystrobin, TX1+cyproconazole, TX1+difenoconazole, TX1+epoxiconazole, TX1+metconazole, TX1+propiconazole, TX1+Mefentrifluconazole, TX1+prothioconazole, TX1+bixafen, TX1+fluopyram, TX1+fluxapyroxad, TX1+isopyrazam, TX1+sedaxane, TX1+benzovindiflupyr, TX1+pydiflumetofen, TX1+acibenzolar-S-methyl, TX1+chlorothalonil, TX1+mancozeb and TX1+dithianon.

Compositions of this invention, including all of the above disclosed embodiments and preferred examples thereof, can be mixed with one or more further pesticides including further fungicides, insecticides, nematocides, bactericides, acaricides, growth regulators, chemosterilants, semiochemicals, repellents, attractants, pheromones, feeding stimulants or other biologically active compounds to form a multi-component pesticide giving an even broader spectrum of agricultural protection.

Examples of such agricultural protectants with which the composition of this invention can be formulated are:

Fungicides such as etridiazole, fluazinam, benalaxyl, benalaxyl-M (kiralaxyl), furalaxyl, metalaxyl, metalaxyl-M (mefenoxam), dodicin, N'-(2,5-Dimethyl-4-phenoxy-phenyl)-N-ethyl-N-methyl-formamidine, N'-[4-(4,5-Dichloro-thiazol-2-yloxy)-2,5-dimethyl-phenyl]-N-ethyl-N-methyl-formamidine, N'-[4-[[3-[(4-chlorophenyl)methyl]-1,2,4-thiadiazol-5-yl]oxy]-2,5-dimethyl-phenyl]-N-ethyl-N-methyl-formamidine, ethirimol, 3'-chloro-2-methoxy-N-[(3RS)-tetrahydro-2-oxofuran-3-yl]acet-2',6'-xylidide (clozylacon), cyprodinil, mepanipyrim, pyrimethanil, dithianon, aureofungin, blasticidin-S, biphenyl, chloroneb, dicloran, hexachlorobenzene, quintozene, tecnazene, (TCNB), tolclofos-methyl, metrafenone, 2,6-dichloro-N-(4-trifluoromethylbenzyl)-benzamide, fluopicolide (flupicolide), tioxymid, flusulfamide, benomyl, carbendazim, carbendazim chlorhydrate, chlorfenazole, fuberidazole, thiabendazole, thiophanate-methyl, benthiavalicarb, chlobenthiazone, probenazole, acibenzolar, bethoxazin, pyriofenone (IKF-309), acibenzolar-S-methyl, pyribencarb (KIF-7767), butylamine, 3-iodo-2-propinyl n-butylcarbamate (IPBC), iodocarb (isopropanyl butylcarbamate), isopropanyl butylcarbamate (iodocarb), picarbutrazox, polycarbamate, propamocarb, tolprocarb, 3-(difluoromethyl)-N-(7-fluoro-1,1,3,3-tetramethyl-indan-4-yl)-1-methyl-pyrazole-4-carboxamide diclocymet, N-[(5-chloro-2-isopropyl-phenyl)methyl]-N-cyclopropyl-3-(d ifluoromethyl)-5-fluoro-1-methyl-pyrazole-4-carboxamide N-cyclopropyl-3-(difluoromethyl)-5-fluoro-N-[(2-isopropylphenyl)methyl]-1-methyl-pyrazole-4-carboxamide carpropamid, chlorothalonil, flumorph, oxine-copper, cymoxanil, phenamacril, cyazofamid, flutianil, thicyofen, chlozolinate, iprodione, procymidone, vinclozolin, bupirimate, dinocton, dinopenton, dinobuton, dinocap, meptyldinocap, diphenylamine, phosdiphen, 2,6-dimethyl-[1,4]dithiino[2,3-c:5,6-c']dipyrrole-1,3,5,7(2H,6H)-tetraone, azithiram, etem, ferbam, mancozeb, maneb, metam, metiram (polyram), metiram-zinc, nabam, propineb, thiram, vapam (metam sodium), zineb, ziram, dithioether, isoprothiolane, ethaboxam, fosetyl, phosetyl-Al (fosetyl-al), methyl bromide, methyl iodide, methyl isothiocyanate, cyclafuramid, fenfuram, validamycin, streptomycin, (2RS)-2-bromo-2-(bromomethyl)glutaronitrile (bromothalonil), dodine, doguadine, guazatine, iminoctadine, iminoctadine triacetate, 2,4-D, 2,4-DB, kasugamycin, dimethirimol, fenhexamid, hymexazole, hydroxyisoxazole imazalil, imazalil sulphate, oxpoconazole, pefurazoate, prochloraz, triflumizole, fenamidone, Bordeaux mixture, calcium polysulfide, copper acetate, copper carbonate, copper hydroxide, copper naphthenate, copper oleate, copper oxychloride, copper oxyquinolate, copper silicate, copper sulphate, copper tallate, cuprous oxide, sulphur, carbaryl, phthalide (fthalide), dingjunezuo (Jun Si Qi), oxathiapiprolin, fluoroimide, mandipropamid, KSF-1002, benzamorf, dimethomorph, fenpropimorph, tridemorph, dodemorph, diethofencarb, fentin acetate, fentin hydroxide, carboxin, oxycarboxin, drazoxolon, famoxadone, m-phenylphenol, p-phenylphenol, tribromophenol (TBP), 2-[2-[(7,8-difluoro-2-methyl-3-quinolyl)oxy]-6-fluoro-phenyl]propan-2-ol 2-[2-fluoro-6-[(8-fluoro-2-methyl-3-quinolyl)oxy]phenyl]propan-2-ol cyflufenamid, ofurace, oxadixyl, flutolanil, mepronil, isofetamid, fenpiclonil, fludioxonil, pencycuron, edifenphos, iprobenfos, pyrazophos, phosphorus acids, tecloftalam, captafol, captan, ditalimfos, triforine, fenpropidin, piperalin, osthol, 1-methylcyclopropene, 4-CPA, chlormequat, clofencet, dichlorprop, dimethipin, endothal, ethephon, flumetralin, forchlorfenuron, gibberellic acid, gibberellins, hymexazol, maleic hydrazide, mepiquat, naphthalene acetamide, paclobutrazol, prohexadione, prohexadione-calcium, thidiazuron, tribufos (tributyl phosphorotrithioate), trinexapac, uniconazole, α-naphthalene acetic acid, polyoxin D (polyoxrim), BLAD, chitosan, fenoxanil, folpet, 3-(difluoromethyl)-N-methoxy-1-methyl-N-[1-methyl-2-(2,4,6-trichlorophenyl)ethyl]pyrazole-4-carboxamide, bixafen, fluxapyroxad, furametpyr, isopyrazam, penflufen, penthiopyrad, sedaxane, fenpyrazamine, diclomezine, pyrifenox, boscalid, fluopyram, diflumetorim, fenarimol, 5-fluoro-2-(p-tolylmethoxy)pyrimidin-4-amine ferimzone, dimetachlone (dimethaclone), pyroquilon, proquinazid, ethoxyquin, quinoxyfen, 4,4,5-trifluoro-3,3-dimethyl-1-(3-quinolyl)isoquinoline 4,4-difluoro-3,3-dimethyl-1-(3-quinolyl)isoquinoline 5-fluoro-3,3,4,4-tetramethyl-1-(3-quinolyl)isoquinoline 9-fluoro-2,2-dimethyl-5-(3-quinolyl)-3H-1,4-benzoxazepine, tebufloquin, oxolinic acid, chinomethionate (oxythioquinox, quinoxymethionate), spiroxamine, (E)-N-methyl-2-[2-(2,5-dimethylphenoxymethyl) phenyl]-2-methoxy-iminoacetamide, (mandestrobin), azoxystrobin, coumoxystrobin, dimoxystrobin, enestroburin, enoxastrobin fenamistrobin, flufenoxystrobin, fluoxastrobin, kresoxim-methyl, mandestrobin, metaminostrobin, metominostrobin, orysastrobin, picoxystrobin, pyraclostrobin, pyrametostrobin, pyraoxystrobin, triclopyricarb, trifloxystrobin, amisulbrom, dichlofluanid, tolylfluanid, but-3-ynyl N-[6-[[(Z)-[(1-methyltetrazol-5-yl)-phenyl-methylene]amino]oxymethyl]-2-pyridyl]carbamate, dazomet, isotianil, tiadinil, thifluzamide, benthiazole (TCMTB), silthiofam, zoxamide, anilazine, tricyclazole, (.+-.)-cis-1-(4-chlorophenyl)-2-(1H-1,2,4-triazol-1-yl)-cycloheptanol (huanjunzuo), 1-(5-bromo-2-pyridyl)-2-(2,4-difluorophenyl)-1,1-difluoro-3-(1,2,4-triazol-1-yl)propan-2-ol 2-(1-tert-butyl)-1-(2-chlorophenyl)-3-(1,2,4-triazol-1-yl)-propan-2-ol (TCDP), azaconazole, bitertanol (biloxazol), bromuconazole, climbazole, cyproconazole, difenoconazole, dimetconazole, diniconazole, diniconazole-M, epoxiconazole, etaconazole, fenbuconazole, fluquinconazole, flusilazole, flutriafol, hexaconazole, imibenconazole, ipconazole, metconazole, myclobutanil, penconazole, propiconazole, prothioconazole, simeconazole, tebuconazole, tetraconazole, triadimefon, triadimenol, triazoxide, triticonazole, Mefentrifluconazole, 2-[[(1R,5S)-5-[(4-fluorophenyl)methyl]-1-hydroxy-2,2-dimethyl-cyclopentyl]methyl]-4H-1,2,4-triazole-3-thione 2-[[3-(2-chlorophenyl)-2-(2,4-difluorophenyl)oxiran-2-yl]methyl]-4H-1,2,4-triazole-3-thione, ametoctradin (imidium), iprovalicarb, valifenalate, 2-benzyl-4-chlorophenol (Chlorophene), allyl alcohol, azafenidin, benzalkonium chloride, chloropicrin, cresol, daracide, dichlorophen (dichlorophene), difenzoquat, dipyrithione, N-(2-p-chlorobenzoylethyl)-hexaminium chloride, NNF-0721, octhilinone, oxasulfuron, propamidine and propionic acid.

Insecticides such as abamectin, acephate, acetamiprid, amidoflumet (S-1955), avermectin, azadirachtin, azinphos-methyl, bifenthrin, bifenazate, buprofezin, carbofuran, cartap, chlorantraniliprole (DPX-E2Y45), chlorfenapyr, chlorfluazuron, chlorpyrifos, chlorpyrifos-methyl, chromafenozide, clothianidin, cyflumetofen, cyfluthrin, beta-cyfluthrin, cyhalothrin, lambda-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim (UR-50701), flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, nitenpyram, nithiazine, novaluron, noviflumuron (XDE-007), oxamyl, parathion, parathion-methyl, permethrin, phorate, phosalone, phosmet, phosphamidon, pirimicarb, profenofos, profluthrin, pymetrozine, pyrafluprole, pyrethrin, pyridalyl, pyrifluquinazon, pyriprole, pyriproxyfen, rotenone, ryanodine, spinetoram, spinosad, spirodiclofen, spiromesifen (BSN 2060), spirotetramat, sulprofos, tebufenozide, teflubenzuron, tefluthrin, terbufos, tetrachlorvinphos, thiacloprid, thiamethoxam, thiodicarb, thiosultap-sodium, tralomethrin, triazamate, trichlorfon and triflumuron;

Bactericides such as streptomycin;

Acaricides such as amitraz, chinomethionat, chlorobenzilate, cyenopyrafen, cyhexatin, dicofol, dienochlor, etoxazole, fenazaquin, fenbutatin oxide, fenpropathrin, fenpyroximate, hexythiazox, propargite, pyridaben and tebufenpyrad; and Biological agents such as *Bacillus thuringiensis, Bacillus thuringiensis* delta endotoxin, baculovirus, and entomopathogenic bacteria, virus and fungi.

Other examples of mixture compositions are as follows (wherein the term "TX" means: "a compound selected from compound no. 67.002, 67.003, 67.007, 67.009, 67.011, 67.013, 67.014, 67.015 and 67.018, as defined in the Table X above"):

an adjuvant selected from the group of substances consisting of petroleum oils (alternative name) (628)+TX, an acaricide selected from the group of substances consisting of 1,1-bis(4-chloro-phenyl)-2-ethoxyethanol (IUPAC name) (910)+TX, 2,4-dichlorophenyl benzenesulfonate (IUPAC/Chemical Abstracts name) (1059)+TX, 2-fluoro-N-methyl-N-1-naphthylacetamide (IUPAC name) (1295)+TX, 4-chlorophenyl phenyl sulfone (IUPAC name) (981)+TX, abamectin (1)+TX, acequinocyl (3)+TX, acetoprole [CCN]+TX, acrinathrin (9)+TX, aldicarb (16)+TX, aldoxycarb (863)+TX, alpha-cypermethrin (202)+TX, amidithion (870)+TX, amidoflumet [CCN]+TX, amidothioate (872)+TX, amiton (875)+TX, amiton hydrogen oxalate (875)+TX, amitraz (24)+TX, aramite (881)+TX, arsenous oxide (882)+TX, AVI 382 (compound code)+TX, AZ 60541 (compound code)+TX, azinphos-ethyl (44)+TX, azinphos-methyl (45)+TX, azobenzene (IUPAC name) (888)+TX, azocyclotin (46)+TX, azothoate (889)+TX, benomyl (62)+TX, benoxafos (alternative name) [CCN]+TX, benzoximate (71)+TX, benzyl benzoate (IUPAC name) [CCN]+TX, bifenazate (74)+TX, bifenthrin (76)+TX, binapacryl (907)+TX, brofenvalerate (alternative name)+TX, bromocyclen (918)+TX, bromophos (920)+TX, bromophos-ethyl (921)+TX, bromopropylate (94)+TX, buprofezin (99)+TX, butocarboxim (103)+TX, butoxycarboxim (104)+TX, butylpyridaben (alternative name)+TX, calcium polysulfide (IUPAC name) (111)+TX, camphechlor (941)+TX, carbanolate (943)+TX, carbaryl (115)+TX, carbofuran (118)+TX, carbophenothion (947)+TX, CGA 50'439 (development code) (125)+TX, chinomethionat (126)+TX, chlorbenside (959)+TX, chlordimeform (964)+TX, chlordimeform hydrochloride (964)+TX, chlorfenapyr (130)+TX, chlorfenethol (968)+TX, chlorfenson (970)+TX, chlorfensulfide (971)+TX, chlorfenvinphos (131)+TX, chlorobenzilate (975)+TX, chloromebuform (977)+TX, chloromethiuron (978)+TX, chloropropylate (983)+TX, chlorpyrifos (145)+TX, chlorpyrifos-methyl (146)+TX, chlorthiophos (994)+TX, cinerin I (696)+TX, cinerin II (696)+TX, cinerins (696)+TX, clofentezine (158)+TX, closantel (alternative name) [CCN]+TX, coumaphos (174)+TX, crotamiton (alternative name) [CCN]+TX, crotoxyphos (1010)+TX, cufraneb (1013)+TX, cyanthoate (1020)+TX, cyflumetofen (CAS Reg. No.: 400882-07-7)+TX, cyhalothrin (196)+TX, cyhexatin (199)+TX, cypermethrin (201)+TX, DCPM (1032)+TX, DDT (219)+TX, demephion (1037)+TX, demephion-O (1037)+TX, demephion-S (1037)+TX, demeton (1038)+TX, demeton-methyl (224)+TX, demeton-O (1038)+TX, demeton-O-methyl (224)+TX, demeton-S (1038)+TX, demeton-S-methyl (224)+TX, demeton-S-methylsulfon (1039)+TX, diafenthiuron (226)+TX, dialifos (1042)+TX, diazinon (227)+TX, dichlofluanid (230)+TX, dichlorvos (236)+TX, dicliphos (alternative name)+TX, dicofol (242)+TX, dicrotophos (243)+TX, dienochlor (1071)+TX, dimefox (1081)+TX, dimethoate (262)+TX, dinactin (alternative name) (653)+TX, dinex (1089)+TX, dinex-diclexine (1089)+TX, dinobuton (269)+TX, dinocap (270)+TX, dinocap-4 [CCN]+TX, dinocap-6 [CCN]+TX, dinocton (1090)+TX, dinopenton (1092)+TX, dinosulfon (1097)+TX, dinoterbon (1098)+TX, dioxathion (1102)+TX, diphenyl sulfone (IUPAC name) (1103)+TX, disulfiram (alternative name) [CCN]+TX, disulfoton (278)+TX, DNOC (282)+TX, dofenapyn (1113)+TX, doramectin (alternative name) [CCN]+TX, endosulfan (294)+TX, endothion (1121)+TX, EPN (297)+TX, eprinomectin (alternative name) [CCN]+TX, ethion (309)+TX, ethoate-methyl (1134)+TX, etoxazole (320)+TX, etrimfos (1142)+TX, fenazaflor (1147)+TX, fenazaquin (328)+TX, fenbutatin oxide (330)+TX, fenothiocarb (337)+TX, fenpropathrin (342)+TX, fenpyrad (alternative name)+TX, fenpyroximate (345)+TX, fenson (1157)+TX, fentrifanil (1161)+TX, fenvalerate (349)+TX, fipronil (354)+TX, fluacrypyrim (360)+TX, fluazuron (1166)+TX, flubenzimine (1167)+TX, flucycloxuron (366)+TX, flucythrinate (367)+TX, fluenetil (1169)+TX, flufenoxuron (370)+TX, flumethrin (372)+TX, fluorbenside (1174)+TX, fluvalinate (1184)+TX, FMC 1137

(development code) (1185)+TX, formetanate (405)+TX, formetanate hydrochloride (405)+TX, formothion (1192)+TX, formparanate (1193)+TX, gamma-HCH (430)+TX, glyodin (1205)+TX, halfenprox (424)+TX, heptenophos (432)+TX, hexadecyl cyclopropanecarboxylate (IUPAC/Chemical Abstracts name) (1216)+TX, hexythiazox (441)+TX, iodomethane (IUPAC name) (542)+TX, isocarbophos (alternative name) (473)+TX, isopropyl O-(methoxyaminothiophosphoryl)salicylate (IUPAC name) (473)+TX, ivermectin (alternative name) [CCN]+TX, jasmolin I (696)+TX, jasmolin II (696)+TX, jodfenphos (1248)+TX, lindane (430)+TX, lufenuron (490)+TX, malathion (492)+TX, malonoben (1254)+TX, mecarbam (502)+TX, mephosfolan (1261)+TX, mesulfen (alternative name) [CCN]+TX, methacrifos (1266)+TX, methamidophos (527)+TX, methidathion (529)+TX, methiocarb (530)+TX, methomyl (531)+TX, methyl bromide (537)+TX, metolcarb (550)+TX, mevinphos (556)+TX, mexacarbate (1290)+TX, milbemectin (557)+TX, milbemycin oxime (alternative name) [CCN]+TX, mipafox (1293)+TX, monocrotophos (561)+TX, morphothion (1300)+TX, moxidectin (alternative name) [CCN]+TX, naled (567)+TX, NC-184 (compound code)+TX, NC-512 (compound code)+TX, nifluridide (1309)+TX, nikkomycins (alternative name) [CCN]+TX, nitrilacarb (1313)+TX, nitrilacarb 1:1 zinc chloride complex (1313)+TX, NNI-0101 (compound code)+TX, NNI-0250 (compound code)+TX, omethoate (594)+TX, oxamyl (602)+TX, oxydeprofos (1324)+TX, oxydisulfoton (1325)+TX, pp'-DDT (219)+TX, parathion (615)+TX, permethrin (626)+TX, petroleum oils (alternative name) (628)+TX, phenkapton (1330)+TX, phenthoate (631)+TX, phorate (636)+TX, phosalone (637)+TX, phosfolan (1338)+TX, phosmet (638)+TX, phosphamidon (639)+TX, phoxim (642)+TX, pirimiphos-methyl (652)+TX, polychloroterpenes (traditional name) (1347)+TX, polynactins (alternative name) (653)+TX, proclonol (1350)+TX, profenofos (662)+TX, promacyl (1354)+TX, propargite (671)+TX, propetamphos (673)+TX, propoxur (678)+TX, prothidathion (1360)+TX, prothoate (1362)+TX, pyrethrin 1 (696)+TX, pyrethrin 11 (696)+TX, pyrethrins (696)+TX, pyridaben (699)+TX, pyridaphenthion (701)+TX, pyrimidifen (706)+TX, pyrimitate (1370)+TX, quinalphos (711)+TX, quintiofos (1381)+TX, R-1492 (development code) (1382)+TX, RA-17 (development code) (1383)+TX, rotenone (722)+TX, schradan (1389)+TX, sebufos (alternative name)+TX, selamectin (alternative name) [CCN]+TX, SI-0009 (compound code)+TX, sophamide (1402)+TX, spirodiclofen (738)+TX, spiromesifen (739)+TX, SSI-121 (development code) (1404)+TX, sulfiram (alternative name) [CCN]+TX, sulfluramid (750)+TX, sulfotep (753)+TX, sulfur (754)+TX, SZI-121 (development code) (757)+TX, tau-fluvalinate (398)+TX, tebufenpyrad (763)+TX, TEPP (1417)+TX, terbam (alternative name)+TX, tetrachlorvinphos (777)+TX, tetradifon (786)+TX, tetranactin (alternative name) (653)+TX, tetrasul (1425)+TX, thiafenox (alternative name)+TX, thiocarboxime (1431)+TX, thiofanox (800)+TX, thiometon (801)+TX, thioquinox (1436)+TX, thuringiensin (alternative name) [CCN]+TX, triamiphos (1441)+TX, triarathene (1443)+TX, triazophos (820)+TX, triazuron (alternative name)+TX, trichlorfon (824)+TX, trifenofos (1455)+TX, trinactin (alternative name) (653)+TX, vamidothion (847)+TX, vaniliprole [CCN] and YI-5302 (compound code)+TX, an algicide selected from the group of substances consisting of bethoxazin [CCN]+TX, copper dioctanoate (IUPAC name) (170)+TX, copper sulfate (172)+TX, cybutryne [CCN]+TX, dichlone (1052)+TX, dichlorophen (232)+TX, endothal (295)+TX, fentin (347)+TX, hydrated lime [CCN]+TX, nabam (566)+TX, quinoclamine (714)+TX, quinonamid (1379)+TX, simazine (730)+TX, triphenyltin acetate (IUPAC name) (347) and triphenyltin hydroxide (IUPAC name) (347)+TX, an anthelmintic selected from the group of substances consisting of abamectin (1)+TX, crufomate (1011)+TX, doramectin (alternative name) [CCN]+TX, emamectin (291)+TX, emamectin benzoate (291)+TX, eprinomectin (alternative name) [CCN]+TX, ivermectin (alternative name) [CCN]+TX, milbemycin oxime (alternative name) [CCN]+TX, moxidectin (alternative name) [CCN]+TX, piperazine [CCN]+TX, selamectin (alternative name) [CCN]+TX, spinosad (737) and thiophanate (1435)+TX, an avicide selected from the group of substances consisting of chloralose (127)+TX, endrin (1122)+TX, fenthion (346)+TX, pyridin-4-amine (IUPAC name) (23) and strychnine (745)+TX, a bactericide selected from the group of substances consisting of 1-hydroxy-1H-pyridine-2-thione (IUPAC name) (1222)+TX, 4-(quinoxalin-2-ylamino)benzenesulfonamide (IUPAC name) (748)+TX, 8-hydroxyquinoline sulfate (446)+TX, bronopol (97)+TX, copper dioctanoate (IUPAC name) (170)+TX, copper hydroxide (IUPAC name) (169)+TX, cresol [CCN]+TX, dichlorophen (232)+TX, dipyrithione (1105)+TX, dodicin (1112)+TX, fenaminosulf (1144)+TX, formaldehyde (404)+TX, hydrargaphen (alternative name) [CCN]+TX, kasugamycin (483)+TX, kasugamycin hydrochloride hydrate (483)+TX, nickel bis(dimethyldithiocarbamate) (IUPAC name) (1308)+TX, nitrapyrin (580)+TX, octhilinone (590)+TX, oxolinic acid (606)+TX, oxytetracycline (611)+TX, potassium hydroxyquinoline sulfate (446)+TX, probenazole (658)+TX, streptomycin (744)+TX, streptomycin sesquisulfate (744)+TX, tecloftalam (766)+TX, and thiomersal (alternative name) [CCN]+TX, a biological agent selected from the group of substances consisting of *Adoxophyes orana* GV (alternative name) (12)+TX, *Agrobacterium radiobacter* (alternative name) (13)+TX, *Amblyseius* spp. (alternative name) (19)+TX, *Anagrapha falcifera* NPV (alternative name) (28)+TX, *Anagrus atomus* (alternative name) (29)+TX, *Aphelinus abdominalis* (alternative name) (33)+TX, *Aphidius colemani* (alternative name) (34)+TX, *Aphidoletes aphidimyza* (alternative name) (35)+TX, *Autographa californica* NPV (alternative name) (38)+TX, *Bacillus firmus* (alternative name) (48)+TX, *Bacillus sphaericus* Neide (scientific name) (49)+TX, *Bacillus thuringiensis* Berliner (scientific name) (51)+TX, *Bacillus thuringiensis* subsp. *aizawai* (scientific name) (51)+TX, *Bacillus thuringiensis* subsp. *israelensis* (scientific name) (51)+TX, *Bacillus thuringiensis* subsp. *japonensis* (scientific name) (51)+TX, *Bacillus thuringiensis* subsp. *kurstaki* (scientific name) (51)+TX, *Bacillus thuringiensis* subsp. *tenebrionis* (scientific name) (51)+TX, *Beauveria bassiana* (alternative name) (53)+TX, *Beauveria brongniartii* (alternative name) (54)+TX, *Chrysoperla carnea* (alternative name) (151)+TX, *Cryptolaemus montrouzieri* (alternative name) (178)+TX, *Cydia pomonella* GV (alternative name) (191)+TX, *Dacnusa sibirica* (alternative name) (212)+TX, *Diglyphus isaea* (alternative name) (254)+TX, *Encarsia formosa* (scientific name) (293)+TX, *Eretmocerus eremicus* (alternative name) (300)+TX, *Helicoverpa zea* NPV (alternative name) (431)+TX, Heterorhabditis bacteriophora and *H. megidis* (alternative name) (433)+TX, *Hippodamia convergens* (alternative name) (442)+TX, *Leptomastix dactylopii* (alternative name) (488)+TX, *Macrolophus caliginosus* (alternative name) (491)+TX, *Mamestra brassicae* NPV (alternative name) (494)+TX, *Metaphycus helvolus* (alternative name) (522)+TX, *Metarhizium anisopliae* var. *acri*- dum (scientific name) (523)+TX, *Metarhizium anisopliae* var. *anisopliae* (scientific name) (523)+TX, *Neodiprion sertifer* NPV and *N. lecontei* NPV (alternative name) (575)+TX, *Orius* spp. (alternative name) (596)+TX, *Paecilomyces fumosoroseus* (alternative name) (613)+TX, *Phytoseiulus persimilis* (alternative name) (644)+TX, *Spodoptera exigua* multicapsid nuclear polyhedrosis virus (scientific name) (741)+TX, *Steinernema bibionis* (alternative name) (742)+TX, *Steinernema carpocapsae* (alternative name) (742)+TX, *Steinernema feltiae* (alternative name) (742)+TX, *Steinernema glaseri* (alternative name) (742)+TX, *Steinernema riobrave* (alternative name) (742)+TX, *Steinernema riobravis* (alternative name) (742)+TX, *Steinernema scapterisci* (alternative name) (742)+TX, *Steinernema* spp. (alternative name) (742)+TX, *Trichogramma* spp. (alternative name) (826)+TX, *Typhlodromus occidentalis* (alternative name) (844) and *Verticillium lecanii* (alternative name) (848)+TX, a soil sterilant selected from the group of substances consisting of iodomethane (IUPAC name) (542) and methyl bromide (537)+TX, a chemosterilant selected from the group of substances consisting of apholate [CCN]+TX, bisazir (alternative name) [CCN]+TX, busulfan (alternative name) [CCN]+TX, diflubenzuron (250)+TX, dimatif (alternative name) [CCN]+TX, hemel [CCN]+TX, hempa [CCN]+TX, metepa [CCN]+TX, methiotepa [CCN]+TX, methyl apholate [CCN]+TX, morzid [CCN]+TX, penfluron (alternative name) [CCN]+TX, tepa [CCN]+TX, thiohempa (alternative name) [CCN]+TX, thiotepa (alternative name) [CCN]+TX, tretamine (alternative name) [CCN] and uredepa (alternative name) [CCN]+TX, an insect pheromone selected from the group of substances consisting of (E)-dec-5-en-1-yl acetate with (E)-dec-5-en-1-ol (IUPAC name) (222)+TX, (E)-tridec-4-en-1-yl acetate (IUPAC name) (829)+TX, (E)-6-methylhept-2-en-4-ol (IUPAC name) (541)+TX, (E,Z)-tetradeca-4,10-dien-1-yl acetate (IUPAC name) (779)+TX, (Z)-dodec-7-en-1-yl acetate (IUPAC name) (285)+TX, (Z)-hexadec-11-enal (IUPAC name) (436)+TX, (Z)-hexadec-11-en-1-yl acetate (IUPAC name) (437)+TX, (Z)-hexadec-13-en-11-yn-1-yl acetate (IUPAC name) (438)+TX, (Z)-icos-13-en-10-one (IUPAC name) (448)+TX, (Z)-tetradec-7-en-1-al (IUPAC name) (782)+TX, (Z)-tetradec-9-en-1-ol (IUPAC name) (783)+TX, (Z)-tetradec-9-en-1-yl acetate (IUPAC name) (784)+TX, (7E,9Z)-dodeca-7,9-dien-1-yl acetate (IUPAC name) (283)+TX, (9Z,11E)-tetradeca-9,11-dien-1-yl acetate (IUPAC name) (780)+TX, (9Z,12E)-tetradeca-9,12-dien-1-yl acetate (IUPAC name) (781)+TX, 14-methyloctadec-1-ene (IUPAC name) (545)+TX, 4-methylnonan-5-ol with 4-methylnonan-5-one (IUPAC name) (544)+TX, alpha-multistriatin (alternative name) [CCN]+TX, brevicomin (alternative name) [CCN]+TX, codlelure (alternative name) [CCN]+TX, codlemone (alternative name) (167)+TX, cuelure (alternative name) (179)+TX, disparlure (277)+TX, dodec-8-en-1-yl acetate (IUPAC name) (286)+TX, dodec-9-en-1-yl acetate (IUPAC name) (287)+TX, dodeca-8+TX, 10-dien-1-yl acetate (IUPAC name) (284)+TX, dominicalure (alternative name) [CCN]+TX, ethyl 4-methyloctanoate (IUPAC name) (317)+TX, eugenol (alternative name) [CCN]+TX, frontalin (alternative name) [CCN]+TX, gossyplure (alternative name) (420)+TX, grandlure (421)+TX, grandlure I (alternative name) (421)+TX, grandlure II (alternative name) (421)+TX, grandlure III (alternative name) (421)+TX, grandlure IV (alternative name) (421)+TX, hexalure [CCN]+TX, ipsdienol (alternative name) [CCN]+TX, ipsenol (alternative name) [CCN]+TX, japonilure (alternative name) (481)+TX, lineatin (alternative name) [CCN]+TX, litlure (alternative name) [CCN]+TX, looplure (alternative name) [CCN]+TX, medlure [CCN]+TX, megatomoic acid (alternative name) [CCN]+TX, methyl eugenol (alternative name) (540)+TX, muscalure (563)+TX, octadeca-2,13-dien-1-yl acetate (IUPAC name) (588)+TX, octadeca-3,13-dien-1-yl acetate (IUPAC name) (589)+TX, orfralure (alternative name) [CCN]+TX, oryctalure (alternative name) (317)+TX, ostramone (alternative name) [CCN]+TX, siglure [CCN]+TX, sordidin (alternative name) (736)+TX, sulcatol (alternative name) [CCN]+TX, tetradec-11-en-1-yl acetate (IUPAC name) (785)+TX, trimedlure (839)+TX, trimedlure A (alternative name) (839)+TX, trimedlure $B_1$ (alternative name) (839)+TX, trimedlure $B_2$ (alternative name) (839)+TX, trimedlure C (alternative name) (839) and trunc-call (alternative name) [CCN]+TX, an insect repellent selected from the group of substances consisting of 2-(octylthio)-ethanol (IUPAC name) (591)+TX, butopyronoxyl (933)+TX, butoxy(polypropylene glycol) (936)+TX, dibutyl adipate (IUPAC name) (1046)+TX, dibutyl phthalate (1047)+TX, dibutyl succinate (IUPAC name) (1048)+TX, diethyltoluamide [CCN]+TX, dimethyl carbate [CCN]+TX, dimethyl phthalate [CCN]+TX, ethyl hexanediol (1137)+TX, hexamide [CCN]+TX, methoquin-butyl (1276)+TX, methylneodecanamide [CCN]+TX, oxamate [CCN] and picaridin [CCN]+TX, an insecticide selected from the group of substances consisting of 1-dichloro-1-nitroethane (IUPAC/Chemical Abstracts name) (1058)+TX, 1,1-dichloro-2,2-bis(4-ethylphenyl)ethane (IUPAC name) (1056), +TX, 1,2-dichloropropane (IUPAC/Chemical Abstracts name) (1062)+TX, 1,2-dichloropropane with 1,3-dichloropropene (IUPAC name) (1063)+TX, 1-bromo-2-chloroethane (IUPAC/Chemical Abstracts name) (916)+TX, 2,2,2-trichloro-1-(3, 4-dichlorophenyl)ethyl acetate (IUPAC name) (1451)+TX, 2,2-dichlorovinyl 2-ethylsulfinylethyl methyl phosphate (IUPAC name) (1066)+TX, 2-(1,3-dithiolan-2-yl)phenyl dimethylcarbamate (IUPAC/Chemical Abstracts name) (1109)+TX, 2-(2-butoxyethoxy)ethyl thiocyanate (IUPAC/Chemical Abstracts name) (935)+TX, 2-(4,5-dimethyl-1,3-dioxolan-2-yl)phenyl methylcarbamate (IUPAC/Chemical Abstracts name) (1084)+TX, 2-(4-chloro-3,5-xylyloxy) ethanol (IUPAC name) (986)+TX, 2-chlorovinyl diethyl phosphate (IUPAC name) (984)+TX, 2-imidazolidone (IUPAC name) (1225)+TX, 2-isovalerylindan-1,3-dione (IUPAC name) (1246)+TX, 2-methyl(prop-2-ynyl)aminophenyl methylcarbamate (IUPAC name) (1284)+TX, 2-thiocyanatoethyl laurate (IUPAC name) (1433)+TX, 3-bromo-1-chloroprop-1-ene (IUPAC name) (917)+TX, 3-methyl-1-phenylpyrazol-5-yl dimethylcarbamate (IUPAC name) (1283)+TX, 4-methyl(prop-2-ynyl)amino-3,5-xylyl methylcarbamate (IUPAC name) (1285)+TX, 5,5-dimethyl-3-oxocyclohex-1-enyl dimethylcarbamate (IUPAC name) (1085)+TX, abamectin (1)+TX, acephate (2)+TX, acetamiprid (4)+TX, acethion (alternative name) [CCN]+TX, acetoprole [CCN]+TX, acrinathrin (9)+TX, acrylonitrile (IUPAC name) (861)+TX, alanycarb (15)+TX, aldicarb (16)+TX, aldoxycarb (863)+TX, aldrin (864)+TX, allethrin (17)+TX, allosamidin (alternative name) [CCN]+TX, allyxycarb (866)+TX, alpha-cypermethrin (202)+TX, alpha-ecdysone (alternative name) [CCN]+TX, aluminium phosphide (640)+TX, amidithion (870)+TX, amidothioate (872)+TX, aminocarb (873)+TX, amiton (875)+TX, amiton hydrogen oxalate (875)+TX, amitraz (24)+TX, anabasine (877)+TX, athidathion (883)+TX, AVI 382 (compound code)+TX, AZ 60541 (compound code)+TX, azadirachtin (alternative name) (41)+TX, azamethiphos (42)+TX, azinphos-ethyl (44)+TX, azinphos-methyl (45)+TX, azothoate (889)+TX, *Bacillus thuringiensis* delta endotoxins (alternative name) (52)+TX, barium hexafluorosilicate (alternative name) [CCN]+TX, barium polysulfide (IUPAC/Chemical Abstracts name) (892)+TX, barthrin [CCN]+TX, Bayer 22/190 (development code) (893)+TX, Bayer 22408 (development code) (894)+TX, bendiocarb (58)+TX, benfuracarb (60)+TX, bensultap (66)+TX, beta-cyfluthrin (194)+TX, beta-cypermethrin (203)+TX, bifenthrin (76)+TX, bioallethrin (78)+TX, bioallethrin S-cyclopentenyl isomer (alternative name) (79)+TX, bioethanomethrin [CCN]+TX, biopermethrin (908)+TX, bioresmethrin (80)+TX, bis(2-chloroethyl) ether (IUPAC name) (909)+TX, bistrifluron (83)+TX, borax (86)+TX, brofenvalerate (alternative name)+TX, bromfenvinfos (914)+TX, bromocyclen (918)+TX, bromo-DDT (alternative name) [CCN]+TX, bromophos (920)+TX, bromophos-ethyl (921)+TX, bufencarb (924)+TX, buprofezin (99)+TX, butacarb (926)+TX, butathiofos (927)+TX, butocarboxim (103)+TX, butonate (932)+TX, butoxycarboxim (104)+TX, butylpyridaben (alternative name)+TX, cadusafos (109)+TX, calcium arsenate [CCN]+TX, calcium cyanide (444)+TX, calcium polysulfide (IUPAC name) (111)+TX, camphechlor (941)+TX, carbanolate (943)+TX, carbaryl (115)+TX, carbofuran (118)+TX, carbon disulfide (IUPAC/Chemical Abstracts name) (945)+TX, carbon tetrachloride (IUPAC name) (946)+TX, carbophenothion (947)+TX, carbosulfan (119)+TX, cartap (123)+TX, cartap hydrochloride (123)+TX, cevadine (alternative name) (725)+TX, chlorbicyclen (960)+TX, chlordane (128)+TX, chlordecone (963)+TX, chlordimeform (964)+TX, chlordimeform hydrochloride (964)+TX, chlorethoxyfos (129)+TX, chlorfenapyr (130)+TX, chlorfenvinphos (131)+TX, chlorfluazuron (132)+TX, chlormephos (136)+TX, chloroform [CCN]+TX, chloropicrin (141)+TX, chlorphoxim (989)+TX, chlorprazophos (990)+TX, chlorpyrifos (145)+TX, chlorpyrifos-methyl (146)+TX, chlorthiophos (994)+TX, chromafenozide (150)+TX, cinerin I (696)+TX, cinerin II (696)+TX, cinerins (696)+TX, cis-resmethrin (alternative name)+TX, cismethrin (80)+TX, clocythrin (alternative name)+TX, cloethocarb (999)+TX, closantel (alternative name) [CCN]+TX, clothianidin (165)+TX, copper acetoarsenite [CCN]+TX, copper arsenate [CCN]+TX, copper oleate [CCN]+TX, coumaphos (174)+TX, coumithoate (1006)+TX, crotamiton (alternative name) [CCN]+TX, crotoxyphos (1010)+TX, crufomate (1011)+TX, cryolite (alternative name) (177)+TX, CS 708 (development code) (1012)+TX, cyanofenphos (1019)+TX, cyanophos (184)+TX, cyanthoate (1020)+TX, cyclethrin [CCN]+TX, cycloprothrin (188)+TX, cyfluthrin (193)+TX, cyhalothrin (196)+TX, cypermethrin (201)+TX, cyphenothrin (206)+TX, cyromazine (209)+TX, cythioate (alternative name) [CCN]+TX, d-limonene (alternative name) [CCN]+TX, d-tetramethrin (alternative name) (788)+TX, DAEP (1031)+TX, dazomet (216)+TX, DDT (219)+TX, decarbofuran (1034)+TX, deltamethrin (223)+TX, demephion (1037)+TX, demephion-O (1037)+TX, demephion-S (1037)+TX, demeton (1038)+TX, demeton-methyl (224)+TX, demeton-O (1038)+TX, demeton-O-methyl (224)+TX, demeton-S (1038)+TX, demeton-S-methyl (224)+TX, demeton-S-methylsulphon (1039)+TX, diafenthiuron (226)+TX, dialifos (1042)+TX, diamidafos (1044)+TX, diazinon (227)+TX, dicapthon (1050)+TX, dichlofenthion (1051)+TX, dichlorvos (236)+TX, dicliphos (alternative name)+TX, dicresyl (alternative name) [CCN]+TX, dicrotophos (243)+TX, dicyclanil (244)+TX, dieldrin (1070)+TX, diethyl 5-methylpyrazol-3-yl phosphate (IUPAC name) (1076)+TX, diflubenzuron (250)+TX, dilor (alternative name) [CCN]+TX, dimefluthrin [CCN]+TX, dimefox (1081)+TX, dimetan (1085)+TX, dimethoate (262)+TX, dimethrin (1083)+TX, dimethylvinphos (265)+TX, dimetilan (1086)+TX, dinex (1089)+TX, dinex-diclexine (1089)+TX, dinoprop (1093)+TX, dinosam (1094)+TX, dinoseb (1095)+TX, dinotefuran (271)+TX, diofenolan (1099)+TX, dioxabenzofos (1100)+TX, dioxacarb (1101)+TX, dioxathion (1102)+TX, disulfoton (278)+TX, dithicrofos (1108)+TX, DNOC (282)+TX, doramectin (alternative name) [CCN]+TX, DSP (1115)+TX, ecdysterone (alternative name) [CCN]+TX, EI 1642 (development code) (1118)+TX, emamectin (291)+TX, emamectin benzoate (291)+TX, EMPC (1120)+TX, empenthrin (292)+TX, endosulfan (294)+TX, endothion (1121)+TX, endrin (1122)+TX, EPBP (1123)+TX, EPN (297)+TX, epofenonane (1124)+TX, eprinomectin (alternative name) [CCN]+TX, esfenvalerate (302)+TX, etaphos (alternative name) [CCN]+TX, ethiofencarb (308)+TX, ethion (309)+TX, ethiprole (310)+TX, ethoate-methyl (1134)+TX, ethoprophos (312)+TX, ethyl formate (IUPAC name) [CCN]+TX, ethyl-DDD (alternative name) (1056)+TX, ethylene dibromide (316)+TX, ethylene dichloride (chemical name) (1136)+TX, ethylene oxide [CCN]+TX, etofenprox (319)+TX, etrimfos (1142)+TX, EXD (1143)+TX, famphur (323)+TX, fenamiphos (326)+TX, fenazaflor (1147)+TX, fenchlorphos (1148)+TX, fenethacarb (1149)+TX, fenfluthrin (1150)+TX, fenitrothion (335)+TX, fenobucarb (336)+TX, fenoxacrim (1153)+TX, fenoxycarb (340)+TX, fenpirithrin (1155)+TX, fenpropathrin (342)+TX, fenpyrad (alternative name)+TX, fensulfothion (1158)+TX, fenthion (346)+TX, fenthion-ethyl [CCN]+TX, fenvalerate (349)+TX, fipronil (354)+TX, flonicamid (358)+TX, flubendiamide (CAS. Reg. No.: 272451-65-7)+TX, flucofuron (1168)+TX, flucycloxuron (366)+TX, flucythrinate (367)+TX, fluenetil (1169)+TX, flufenerim [CCN]+TX, flufenoxuron (370)+TX, flufenprox (1171)+TX, flumethrin (372)+TX, fluvalinate (1184)+TX, FMC 1137 (development code) (1185)+TX, fonofos (1191)+TX, formetanate (405)+TX, formetanate hydrochloride (405)+TX, formothion (1192)+TX, formparanate (1193)+TX, fosmethilan (1194)+TX, fospirate (1195)+TX, fosthiazate (408)+TX, fosthietan (1196)+TX, furathiocarb (412)+TX, furethrin (1200)+TX, gamma-cyhalothrin (197)+TX, gamma-HCH (430)+TX, guazatine (422)+TX, guazatine acetates (422)+TX, GY-81 (development code) (423)+TX, halfenprox (424)+TX, halofenozide (425)+TX, HCH (430)+TX, HEOD (1070)+TX, heptachlor (1211)+TX, heptenophos (432)+TX, heterophos [CCN]+TX, hexaflumuron (439)+TX, HHDN (864)+TX, hydramethylnon (443)+TX, hydrogen cyanide (444)+TX, hydroprene (445)+TX, hyquincarb (1223)+TX, imidacloprid (458)+TX, imiprothrin (460)+TX, indoxacarb (465)+TX, iodomethane (IUPAC name) (542)+TX, IPSP (1229)+TX, isazofos (1231)+TX, isobenzan (1232)+TX, isocarbophos (alternative name) (473)+TX, isodrin (1235)+TX, isofenphos (1236)+TX, isolane (1237)+TX, isoprocarb (472)+TX, isopropyl O-(methoxy-aminothiophosphoryl)salicylate (IUPAC name) (473)+TX, isoprothiolane (474)+TX, isothioate (1244)+TX, isoxathion (480)+TX, ivermectin (alternative name) [CCN]+TX, jasmolin I (696)+TX, jasmolin II (696)+TX, jodfenphos (1248)+TX, juvenile hormone I (alternative name) [CCN]+TX, juvenile hormone II (alternative name) [CCN]+TX, juvenile hormone III (alternative name) [CCN]+TX, kelevan (1249)+TX, kinoprene (484)+TX, lambda-cyhalothrin (198)+TX, lead arsenate [CCN]+TX, lepimectin (CCN)+TX, leptophos (1250)+TX, lindane (430)+TX, lirimfos (1251)+TX, lufenuron (490)+TX, lythidathion (1253)+TX, m-cumenyl methylcarbamate (IUPAC name) (1014)+TX, magnesium phosphide (IUPAC name) (640)+TX, malathion (492)+TX, malonoben (1254)+TX, mazidox (1255)+TX, mecarbam (502)+TX, mecarphon (1258)+TX, menazon (1260)+TX, mephosfolan (1261)+TX, mercurous chloride (513)+TX, mesulfenfos (1263)+TX, metaflumizone (CCN)+TX, metam (519)+TX, metam-potassium (alternative name) (519)+TX, metam-sodium (519)+TX, methacrifos (1266)+TX, methamidophos (527)+TX, methanesulfonyl fluoride (IUPAC/Chemical Abstracts name) (1268)+TX, methidathion (529)+TX, methiocarb (530)+TX, methocrotophos (1273)+TX, methomyl (531)+TX, methoprene (532)+TX, methoquin-butyl (1276)+TX, methothrin (alternative name) (533)+TX, methoxychlor (534)+TX, methoxyfenozide (535)+TX, methyl bromide (537)+TX, methyl isothiocyanate (543)+TX, methylchloroform (alternative name) [CCN]+TX, methylene chloride [CCN]+TX, metofluthrin [CCN]+TX, metolcarb (550)+TX, metoxadiazone (1288)+TX, mevinphos (556)+TX, mexacarbate (1290)+TX, milbemectin (557)+TX, milbemycin oxime (alternative name) [CCN]+TX, mipafox (1293)+TX, mirex (1294)+TX, monocrotophos (561)+TX, morphothion (1300)+TX, moxidectin (alternative name) [CCN]+TX, naftalofos (alternative name) [CCN]+TX, naled (567)+TX, naphthalene (IU PAC/Chemical Abstracts name) (1303)+TX, NC-170 (development code) (1306)+TX, NC-184 (compound code)+TX, nicotine (578)+TX, nicotine sulfate (578)+TX, nifluridide (1309)+TX, nitenpyram (579)+TX, nithiazine (1311)+TX, nitrilacarb (1313)+TX, nitrilacarb 1:1 zinc chloride complex (1313)+TX, NNI-0101 (compound code)+TX, NNI-0250 (compound code)+TX, nornicotine (traditional name) (1319)+TX, novaluron (585)+TX, noviflumuron (586)+TX, O-5-dichloro-4-iodophenyl O-ethyl ethylphosphonothioate (IUPAC name) (1057)+TX, O,O-diethyl O-4-methyl-2-oxo-2H-chromen-7-yl phosphorothioate (IUPAC name) (1074)+TX, O,O-diethyl O-6-methyl-2-propylpyrimidin-4-yl phosphorothioate (IUPAC name) (1075)+TX, O,O,O',O'-tetrapropyl dithiopyrophosphate (IUPAC name) (1424)+TX, oleic acid (IUPAC name) (593)+TX, omethoate (594)+TX, oxamyl (602)+TX, oxydemeton-methyl (609)+TX, oxydeprofos (1324)+TX, oxydisulfoton (1325)+TX, pp'-DDT (219)+TX, para-dichlorobenzene [CCN]+TX, parathion (615)+TX, parathion-methyl (616)+TX, penfluron (alternative name) [CCN]+TX, pentachlorophenol (623)+TX, pentachlorophenyl laurate (IUPAC name) (623)+TX, permethrin (626)+TX, petroleum oils (alternative name) (628)+TX, PH 60-38 (development code) (1328)+TX, phenkapton (1330)+TX, phenothrin (630)+TX, phenthoate (631)+TX, phorate (636)+TX, phosalone (637)+TX, phosfolan (1338)+TX, phosmet (638)+TX, phosnichlor (1339)+TX, phosphamidon (639)+TX, phosphine (IUPAC name) (640)+TX, phoxim (642)+TX, phoxim-methyl (1340)+TX, pirimetaphos (1344)+TX, pirimicarb (651)+TX, pirimiphos-ethyl (1345)+TX, pirimiphos-methyl (652)+TX, polychlorodicyclopentadiene isomers (IUPAC name) (1346)+TX, polychloroterpenes (traditional name) (1347)+TX, potassium arsenite [CCN]+TX, potassium thiocyanate [CCN]+TX, prallethrin (655)+TX, precocene I (alternative name) [CCN]+TX, precocene II (alternative name) [CCN]+TX, precocene III (alternative name) [CCN]+TX, primidophos (1349)+TX, profenofos (662)+TX, profluthrin [CCN]+TX, promacyl (1354)+TX, promecarb (1355)+TX, propaphos (1356)+TX, propetamphos (673)+TX, propoxur (678)+TX, prothidathion (1360)+TX, prothiofos (686)+TX, prothoate (1362)+TX, protrifenbute [CCN]+TX, pymetrozine (688)+TX, pyraclofos (689)+TX, pyrazophos (693)+TX, pyresmethrin (1367)+TX, pyrethrin I (696)+TX, pyrethrin II (696)+TX, pyrethrins (696)+TX, pyridaben (699)+TX, pyridalyl (700)+TX, pyridaphenthion (701)+TX, pyrimidifen (706)+TX, pyrimitate (1370)+TX, pyriproxyfen (708)+TX, quassia (alternative name) [CCN]+TX, quinalphos (711)+TX, quinalphos-methyl (1376)+TX, quinothion (1380)+TX, quintiofos (1381)+TX, R-1492 (development code) (1382)+TX, rafoxanide (alternative name) [CCN]+TX, resmethrin (719)+TX, rotenone (722)+TX, RU 15525 (development code) (723)+TX, RU 25475 (development code) (1386)+TX, ryania (alternative name) (1387)+TX, ryanodine (traditional name) (1387)+TX, sabadilla (alternative name) (725)+TX, schradan (1389)+TX, sebufos (alternative name)+TX, selamectin (alternative name) [CCN]+TX, SI-0009 (compound code)+TX, SI-0205 (compound code)+TX, SI-0404 (compound code)+TX, SI-0405 (compound code)+TX, silafluofen (728)+TX, SN 72129 (development code) (1397)+TX, sodium arsenite [CCN]+TX, sodium cyanide (444)+TX, sodium fluoride (IUPAC/Chemical Abstracts name) (1399)+TX, sodium hexafluorosilicate (1400)+TX, sodium pentachlorophenoxide (623)+TX, sodium selenate (IUPAC name) (1401)+TX, sodium thiocyanate [CCN]+TX, sophamide (1402)+TX, spinosad (737)+TX, spiromesifen (739)+TX, spirotetrmat (CCN)+TX, sulcofuron (746)+TX, sulcofuron-sodium (746)+TX, sulfluramid (750)+TX, sulfotep (753)+TX, sulfuryl fluoride (756)+TX, sulprofos (1408)+TX, tar oils (alternative name) (758)+TX, tau-fluvalinate (398)+TX, tazimcarb (1412)+TX, TDE (1414)+TX, tebufenozide (762)+TX, tebufenpyrad (763)+TX, tebupirimfos (764)+TX, teflubenzuron (768)+TX, tefluthrin (769)+TX, temephos (770)+TX, TEPP (1417)+TX, terallethrin (1418)+TX, terbam (alternative name)+TX, terbufos (773)+TX, tetrachloroethane [CCN]+TX, tetrachlorvinphos (777)+TX, tetramethrin (787)+TX, theta-cypermethrin (204)+TX, thiacloprid (791)+TX, thiafenox (alternative name)+TX, thiamethoxam (792)+TX, thicrofos (1428)+TX, thiocarboxime (1431)+TX, thiocyclam (798)+TX, thiocyclam hydrogen oxalate (798)+TX, thiodicarb (799)+TX, thiofanox (800)+TX, thiometon (801)+TX, thionazin (1434)+TX, thiosultap (803)+TX, thiosultap-sodium (803)+TX, thuringiensin (alternative name) [CCN]+TX, tolfenpyrad (809)+TX, tralomethrin (812)+TX, transfluthrin (813)+TX, transpermethrin (1440)+TX, triamiphos (1441)+TX, triazamate (818)+TX, triazophos (820)+TX, triazuron (alternative name)+TX, trichlorfon (824)+TX, trichlormetaphos-3 (alternative name) [CCN]+TX, trichloronat (1452)+TX, trifenofos (1455)+TX, triflumuron (835)+TX, trimethacarb (840)+TX, triprene (1459)+TX, vamidothion (847)+TX, vaniliprole [CCN]+TX, veratridine (alternative name) (725)+TX, veratrine (alternative name) (725)+TX, XMC (853)+TX, xylylcarb (854)+TX, YI-5302 (compound code)+TX, zeta-cypermethrin (205)+TX, zetamethrin (alternative name)+TX, zinc phosphide (640)+TX, zolaprofos (1469) and ZXI 8901 (development code) (858)+TX, cyantraniliprole [736994-63-19+TX, chlorantraniliprole [500008-45-7]+TX, cyenopyrafen [560121-52-0]+TX, cyflumetofen [400882-07-7]+TX, pyrifluquinazon [337458-27-2]+TX, spinetoram [187166-40-1+187166-15-0]+TX, spirotetramat [203313-25-1]+TX, sulfoxaflor [946578-00-3]+TX, flufiprole [704886-18-0]+TX, meperfluthrin [915288-13-0]+TX, tetramethylfluthrin [84937-88-2]+TX, triflumezopyrim (disclosed in WO 2012/092115)+TX, a molluscicide selected from the group of substances consisting of bis(tributyltin) oxide (IUPAC name) (913)+TX, bromoacetamide [CCN]+TX, calcium arsenate [CCN]+TX, cloethocarb (999)+TX, copper acetoarsenite [CCN]+TX, copper sulfate (172)+TX, fentin (347)+TX, ferric phosphate (IUPAC name) (352)+TX, metaldehyde (518)+TX, methiocarb (530)+TX, niclosamide (576)+TX, niclosamide-olamine (576)+TX, pentachlorophenol (623)+TX, sodium pentachlorophenoxide (623)+TX, tazimcarb (1412)+TX, thiodicarb (799)+TX, tributyltin oxide (913)+TX, trifenmorph (1454)+TX, trimethacarb (840)+TX, triphenyltin acetate (IUPAC name) (347) and triphenyltin hydroxide (IUPAC name) (347)+TX, pyriprole [394730-71-3]+TX, a nematicide selected from the group of substances consisting of AKD-3088 (compound code)+TX, 1,2-dibromo-3-chloropropane (IUPAC/Chemical Abstracts name) (1045)+TX, 1,2-dichloropropane (IUPAC/Chemical Abstracts name) (1062)+TX, 1,2-dichloropropane with 1,3-dichloropropene (IUPAC name) (1063)+TX, 1,3-dichloropropene (233)+TX, 3,4-dichlorotetrahydrothiophene 1,1-dioxide (IUPAC/Chemical Abstracts name) (1065)+TX, 3-(4-chlorophenyl)-5-methylrhodanine (IUPAC name) (980)+TX, 5-methyl-6-thioxo-1,3,5-thiadiazinan-3-ylacetic acid (IUPAC name) (1286)+TX, 6-isopentenylaminopurine (alternative name) (210)+TX, abamectin (1)+TX, acetoprole [CCN]+TX, alanycarb (15)+TX, aldicarb (16)+TX, aldoxycarb (863)+TX, AZ 60541 (compound code)+TX, bencloth-iaz [CCN]+TX, benomyl (62)+TX, butylpyridaben (alternative name)+TX, cadusafos (109)+TX, carbofuran (118)+TX, carbon disulfide (945)+TX, carbosulfan (119)+TX, chloropicrin (141)+TX, chlorpyrifos (145)+TX, cloethocarb (999)+TX, cytokinins (alternative name) (210)+TX, dazomet (216)+TX, DBCP (1045)+TX, DCIP (218)+TX, diamidafos (1044)+TX, dichlofenthion (1051)+TX, dicliphos (alternative name)+TX, dimethoate (262)+TX, doramectin (alternative name) [CCN]+TX, emamectin (291)+TX, emamectin benzoate (291)+TX, eprinomectin (alternative name) [CCN]+TX, ethoprophos (312)+TX, ethylene dibromide (316)+TX, fenamiphos (326)+TX, fenpyrad (alternative name)+TX, fensulfothion (1158)+TX, fosthiazate (408)+TX, fosthietan (1196)+TX, furfural (alternative name) [CCN]+TX, GY-81 (development code) (423)+TX, heterophos [CCN]+TX, iodomethane (IUPAC name) (542)+TX, isamidofos (1230)+TX, isazofos (1231)+TX, ivermectin (alternative name) [CCN]+TX, kinetin (alternative name) (210)+TX, mecarphon (1258)+TX, metam (519)+TX, metam-potassium (alternative name) (519)+TX, metam-sodium (519)+TX, methyl bromide (537)+TX, methyl isothiocyanate (543)+TX, milbemycin oxime (alternative name) [CCN]+TX, moxidectin (alternative name) [CCN]+TX, *Myrothecium* verrucaria composition (alternative name) (565)+TX, NC-184 (compound code)+TX, oxamyl (602)+TX, phorate (636)+TX, phosphamidon (639)+TX, phosphocarb [CCN]+TX, sebufos (alternative name)+TX, selamectin (alternative name) [CCN]+TX, spinosad (737)+TX, terbam (alternative name)+TX, terbufos (773)+TX, tetrachlorothiophene (IUPAC/Chemical Abstracts name) (1422)+TX, thiafenox (alternative name)+TX, thionazin (1434)+TX, triazophos (820)+TX, triazuron (alternative name)+TX, xylenols [CCN]+TX, YI-5302 (compound code) and zeatin (alternative name) (210)+TX, fluensulfone [318290-98-1]+TX, a nitrification inhibitor selected from the group of substances consisting of potassium ethylxanthate [CCN] and nitrapyrin (580)+TX, a plant activator selected from the group of substances consisting of acibenzolar (6)+TX, acibenzolar-S-methyl (6)+TX, probenazole (658) and *Reynoutria sachalinensis* extract (alternative name) (720)+TX, a rodenticide selected from the group of substances consisting of 2-isovalerylindan-1,3-dione (IUPAC name) (1246)+TX, 4-(quinoxalin-2-ylamino)benzenesulfonamide (IUPAC name) (748)+TX, alpha-chlorohydrin [CCN]+TX, aluminium phosphide (640)+TX, antu (880)+TX, arsenous oxide (882)+TX, barium carbonate (891)+TX, bisthiosemi (912)+TX, brodifacoum (89)+TX, bromadiolone (91)+TX, bromethalin (92)+TX, calcium cyanide (444)+TX, chloralose (127)+TX, chlorophacinone (140)+TX, cholecalciferol (alternative name) (850)+TX, coumachlor (1004)+TX, coumafuryl (1005)+TX, coumatetralyl (175)+TX, crimidine (1009)+TX, difenacoum (246)+TX, difethialone (249)+TX, diphacinone (273)+TX, ergocalciferol (301)+TX, flocoumafen (357)+TX, fluoroacetamide (379)+TX, flupropadine (1183)+TX, flupropadine hydrochloride (1183)+TX, gamma-HCH (430)+TX, HCH (430)+TX, hydrogen cyanide (444)+TX, iodomethane (IUPAC name) (542)+TX, lindane (430)+TX, magnesium phosphide (IUPAC name) (640)+TX, methyl bromide (537)+TX, norbormide (1318)+TX, phosacetim (1336)+TX, phosphine (IUPAC name) (640)+TX, phosphorus [CCN]+TX, pindone (1341)+TX, potassium arsenite [CCN]+TX, pyrinuron (1371)+TX, scilliroside (1390)+TX, sodium arsenite [CCN]+TX, sodium cyanide (444)+TX, sodium fluoroacetate (735)+TX, strychnine (745)+TX, thallium sulfate [CCN]+TX, warfarin (851) and zinc phosphide (640)+TX, a synergist selected from the group of substances consisting of 2-(2-butoxyethoxy)-ethyl piperonylate (IUPAC name) (934)+TX, 5-(1,3-benzodioxol-5-yl)-3-hexylcyclohex-2-enone (IUPAC name) (903)+TX, farnesol with nerolidol (alternative name) (324)+TX, MB-599 (development code) (498)+TX, MGK 264 (development code) (296)+TX, piperonyl butoxide (649)+TX, piprotal (1343)+TX, propyl isomer (1358)+TX, S421 (development code) (724)+TX, sesamex (1393)+TX, sesasmolin (1394) and sulfoxide (1406)+TX, an animal repellent selected from the group of substances consisting of anthraquinone (32)+TX, chloralose (127)+TX, copper naphthenate [CCN]+TX, copper oxychloride (171)+TX, diazinon (227)+TX, dicyclopentadiene (chemical name) (1069)+TX, guazatine (422)+TX, guazatine acetates (422)+TX, methiocarb (530)+TX, pyridin-4-amine (IUPAC name) (23)+TX, thiram (804)+TX, trimethacarb (840)+TX, zinc naphthenate [CCN] and ziram (856)+TX, a virucide selected from the group of substances consisting of imanin (alternative name) [CCN] and ribavirin (alternative name) [CCN]+TX, a wound protectant selected from the group of substances consisting of mercuric oxide (512)+TX, octhilinone (590) and thiophanate-methyl (802)+TX, and biologically active compounds selected from the group consisting of azaconazole (60207-31-0]+TX, bitertanol [70585-36-3]+TX, bromuconazole [116255-48-2]+TX, cyproconazole [94361-06-5]+TX, difenoconazole [119446-68-3]+TX, diniconazole [83657-24-3]+TX, epoxiconazole [106325-08-0]+TX, fenbuconazole [114369-43-6]+TX, fluquinconazole [136426-54-5]+TX, flusilazole [85509-19-9]+TX, flutriafol [76674-21-0]+TX, hexaconazole [79983-71-4]+TX, imazalil [35554-44-0]+TX, imibenconazole [86598-92-7]+TX, ipconazole [125225-28-7]+TX, metconazole [125116-23-6]+TX, myclobutanil [88671-89-0]+TX, pefurazoate [101903-30-4]+TX, penconazole [66246-88-6]+TX, prothioconazole [178928-70-6]+TX, pyrifenox [88283-41-4]+TX, prochloraz [67747-09-5]+TX, propiconazole [60207-90-1]+TX, simeconazole [149508-90-7]+TX, tebuconazole [107534-96-3]+TX, tetraconazole [112281-77-3]+TX, triadimefon [43121-43-3]+TX, triadimenol [55219-65-3]+TX, triflumizole [99387-89-0]+TX, triticonazole [131983-72-7]+TX, ancymidol [12771-68-5]+TX, fenarimol [60168-88-9]+TX, nuarimol [63284-71-9]+TX, bupirimate [41483-43-6]+TX, dimethirimol [5221-53-4]+TX, ethirimol [23947-60-6]+TX, dodemorph [1593-77-7]+

TX, fenpropidine [67306-00-7]+TX, fenpropimorph [67564-91-4]+TX, spiroxamine [118134-30-8]+TX, tridemorph [81412-43-3]+TX, cyprodinil [121552-61-2]+TX, mepanipyrim [110235-47-7]+TX, pyrimethanil [53112-28-0]+TX, fenpiclonil [74738-17-3]+TX, fludioxonil [131341-86-1]+TX, benalaxyl [71626-11-4]+TX, furalaxyl [57646-30-7]+TX, metalaxyl [57837-19-1]+TX, R-metalaxyl [70630-17-0]+TX, ofurace [58810-48-3]+TX, oxadixyl [77732-09-3]+TX, benomyl [17804-35-2]+TX, carbendazim [10605-21-7]+TX, debacarb [62732-91-6]+TX, fuberidazole [3878-19-1]+TX, thiabendazole [148-79-8]+TX, chlozolinate [84332-86-5]+TX, dichlozoline [24201-58-9]+TX, iprodione [36734-19-7]+TX, myclozoline [54864-61-8]+TX, procymidone [32809-16-8]+TX, vinclozoline [50471-44-8]+TX, boscalid [188425-85-6]+TX, carboxin [5234-68-4]+TX, fenfuram [24691-80-3]+TX, flutolanil [66332-96-5]+TX, mepronil [55814-41-0]+TX, oxycarboxin [5259-88-1]+TX, penthiopyrad [183675-82-3]+TX, thifluzamide [130000-40-7]+TX, guazatine [108173-90-6]+TX, dodine [2439-10-3][112-65-2] (free base)+TX, iminoctadine [13516-27-3]+TX, azoxystrobin [131860-33-8]+TX, dimoxystrobin [149961-52-4]+TX, enestroburin {Proc. BCPC, Int. Congr., Glasgow, 2003, 1, 93}+TX, fluoxastrobin [361377-29-9]+TX, kresoxim-methyl [143390-89-0]+TX, metominostrobin [133408-50-1]+TX, trifloxystrobin [141517-21-7]+TX, orysastrobin [248593-16-0]+TX, picoxystrobin [117428-22-5]+TX, pyraclostrobin [175013-18-0]+TX, ferbam [14484-64-1]+TX, mancozeb [8018-01-7]+TX, maneb [12427-38-2]+TX, metiram [9006-42-2]+TX, propineb [12071-83-9]+TX, thiram [137-26-8]+TX, zineb [12122-67-7]+TX, ziram [137-30-4]+TX, captafol [2425-06-1]+TX, captan [133-06-2]+TX, dichlofluanid [1085-98-9]+TX, fluoroimide [41205-21-4]+TX, folpet [133-07-3]+TX, tolylfluanid [731-27-1]+TX, bordeaux mixture [8011-63-0]+TX, copperhydroxid [20427-59-2]+TX, copperoxychlorid [1332-40-7]+TX, coppersulfat [7758-98-7]+TX, copperoxid [1317-39-1]+TX, mancopper [53988-93-5]+TX, oxine-copper [10380-28-6]+TX, dinocap [131-72-6]+TX, nitrothal-isopropyl [10552-74-6]+TX, edifenphos [17109-49-8]+TX, iprobenphos [26087-47-8]+TX, isoprothiolane [50512-35-1]+TX, phosdiphen [36519-00-3]+TX, pyrazophos [13457-18-6]+TX, tolclofos-methyl [57018-04-9]+TX, acibenzolar-S-methyl [135158-54-2]+TX, anilazine [101-05-3]+TX, benthiavalicarb [413615-35-7]+TX, blasticidin-S [2079-00-7]+TX, chinomethionat [2439-01-2]+TX, chloroneb [2675-77-6]+TX, chlorothalonil [1897-45-6]+TX, cyflufenamid [180409-60-3]+TX, cymoxanil [57966-95-7]+TX, dichlone [117-80-6]+TX, diclocymet [139920-32-4]+TX, diclomezine [62865-36-5]+TX, dicloran [99-30-9]+TX, diethofencarb [87130-20-9]+TX, dimethomorph [110488-70-5]+TX, SYP-L190 (Flumorph) [211867-47-9]+TX, dithianon [3347-22-6]+TX, ethaboxam [162650-77-3]+TX, etridiazole [2593-15-9]+TX, famoxadone [131807-57-3]+TX, fenamidone [161326-34-7]+TX, fenoxanil [115852-48-7]+TX, fentin [668-34-8]+TX, ferimzone [89269-64-7]+TX, fluazinam [79622-59-6]+TX, fluopicolide [239110-15-7]+TX, flusulfamide [106917-52-6]+TX, fenhexamid [126833-17-8]+TX, fosetyl-aluminium [39148-24-8]+TX, hymexazol [10004-44-1]+TX, iprovalicarb [140923-17-7]+TX, IKF-916 (Cyazofamid) [120116-88-3]+TX, kasugamycin [6980-18-3]+TX, methasulfocarb [66952-49-6]+TX, metrafenone [220899-03-6]+TX, pencycuron [66063-05-6]+TX, phthalide [27355-22-2]+TX, polyoxins [11113-80-7]+TX, probenazole [27605-76-1]+TX, propamocarb [25606-41-1]+TX, proquinazid [189278-12-4]+TX, pyroquilon [57369-32-1]+TX, quinoxyfen [124495-15-6]+TX, quintozene [82-68-8]+TX, sulfur [7704-34-9]+TX, tiadinil [223580-51-6]+TX, triazoxide [72459-58-6]+TX, tricyclazole [41814-78-2]+TX, triforine [26644-46-2]+TX, validamycin [37248-47-8]+TX, zoxamide (RH7281) [156052-68-5]+TX, mandipropamid [374726-62-2]+TX, isopyrazam [881685-58-1]+TX, sedaxane [874967-67-6]+TX, 3-difluoromethyl-1-methyl-1H-pyrazole-4-carboxylic acid (9-dichloromethylene-1,2,3,4-tetrahydro-1,4-methano-naphthalen-5-yl)-amide (dislosed in WO 2007/048556)+TX, 3-difluoromethyl-1-methyl-1H-pyrazole-4-carboxylic acid (3',4',5'-trifluoro-biphenyl-2-yl)-amide (disclosed in WO 2006/087343)+TX, [(3S,4R,4aR,6S,6aS,12R,12aS,12bS)-3-[(cyclopropylcarbonyl)oxy]-1,3,4,4a,5,6,6a,12,12a,12b-decahydro-6,12-dihydroxy-4,6a,12-trimethyl-11-oxo-9-(3-pyridinyl)-2H,11Hnaphtho[2,1-b]pyrano[3,4-e]pyran-4-yl] methyl-cyclopropanecarboxylate [915972-17-7]+TX and 1,3,5-trimethyl-N-(2-methyl-1-oxopropyl)-N-[3-(2-methylpropyl)-4-[2,2,2-trifluoro-1-methoxy-1-(trifluoromethyl) ethyl]phenyl]-1H-pyrazole-4-carboxamide [926914-55-8]+TX, or a biologically active compound selected from the group consisting of N-[(5-chloro-2-isopropyl-phenyl)methyl]-N-cyclopropyl-3-(difluoromethyl)-5-fluoro-1-methyl-pyrazole-4-carboxamide+TX, 2,6-Dimethyl-1H,5H-[1,4]dithiino[2,3-c:5,6-c']dipyrrole-1,3,5,7(2H,6H)-tetrone+TX, 4-(2-bromo-4-fluoro-phenyl)-N-(2-chloro-6-fluoro-phenyl)-2,5-dimethyl-pyrazol-3-amine+TX, 3-(difluoromethyl)-N-(7-fluoro-1,1,3-trimethyl-indan-4-yl)-1-methyl-pyrazole-4-carboxamide+TX, CAS 850881-30-0+TX, 3-(3,4-dichloro-1,2-thiazol-5-ylmethoxy)-1,2-benzothiazole 1,1-dioxide+TX, 2-[2-[(2,5-dimethylphenoxy)methyl]phenyl]-2-methoxy-N-methyl-acetamide+TX, 3-(4,4-difluoro-3,4-dihydro-3,3-dimethylisoquinolin-1-yl)quinolone+TX, 2-[2-fluoro-6-[(8-fluoro-2-methyl-3-quinolyl)oxy]phenyl] propan-2-ol+TX, Oxathiapiprolin+TX, tert-butyl N-[6-[[[(1-methyltetrazol-5-yl)-phenyl-methylene]amino] oxymethyl]-2-pyridyl]carbamate+TX, N-[2-(3,4-difluorophenyl)phenyl]-3-(trifluoromethyl)pyrazine-2-carboxamide+TX, 3-(difluoromethyl)-1-methyl-N-[(3R)-1,1,3-trimethylindan-4-yl]pyrazole-4-carboxamide+TX, 2,2,2-trifluoroethyl N-[2-methyl-1-[[(4-methylbenzoyl)amino] methyl]propyl]carbamate+TX, (2RS)-2-[4-(4-chlorophenoxy)-α,α,α-trifluoro-o-tolyl]-1-(1H-1,2,4-triazol-1-yl)propan-2-ol+TX, (2RS)-2-[4-(4-chlorophenoxy)-α,α,α-trifluoro-o-tolyl]-3-methyl-1-(1H-1,2,4-triazol-1-yl)butan-2-ol+TX, 2-(difluoromethyl)-N-[(3R)-3-ethyl-1,1-dimethyl-indan-4-yl]pyridine-3-carboxamide+TX, N'-(2,5-dimethyl-4-phenoxy-phenyl)-N-ethyl-N-methyl-formamidine+TX, N'-[4-(4,5-dichlorothiazol-2-yl)oxy-2,5-dimethyl-phenyl]-N-ethyl-N-methyl-formamidine+TX, [2-[3-[2-[1-[2-[3,5-bis (difluoromethyl)pyrazol-1-yl]acetyl]-4-piperidyl]thiazol-4-yl]-4,5-dihydroisoxazol-5-yl]-3-chloro-phenyl] methanesulfonate+TX, but-3-ynyl N-[6-[[[(Z)-[(1-methyltetrazol-5-yl)-phenyl-methylene]amino]oxymethyl]-2-pyridyl] carbamate+TX, methyl N-[[5-[4-(2,4-dimethylphenyl)triazol-2-yl]-2-methyl-phenyl]methyl]carbamate+TX, 3-chloro-6-methyl-5-phenyl-4-(2,4,6-trifluorophenyl) pyridazine+TX, 3-chloro-4-(2,6-difluorophenyl)-6-methyl-5-phenyl-pyridazine+TX, 3-(difluoromethyl)-1-methyl-N-[1,1,3-trimethylindan-4-yl]pyrazole-4-carboxamide+TX, 1-[2-[[1-(4-chlorophenyl)pyrazol-3-yl]oxymethyl]-3-methyl-phenyl]-4-methyl-tetrazol-5-one+TX, 1-methyl-4-[3-methyl-2-[[2-methyl-4-(3,4,5-trimethylpyrazol-1-yl)phenoxy]methyl]phenyl]tetrazol-5-one+TX, and

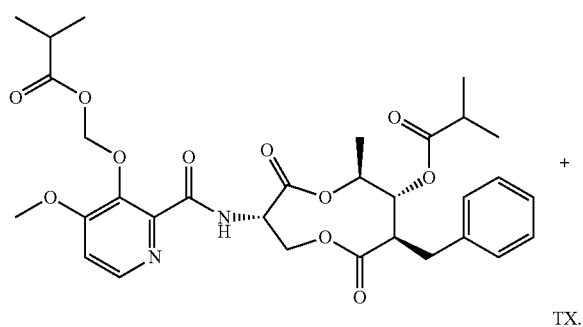

TX.

The references in brackets behind the active ingredients, e.g. [3878-19-1] refer to the Chemical Abstracts Registry number. The above described mixing partners are known. Where the active ingredients are included in "The Pesticide Manual" [The Pesticide Manual—A World Compendium; Thirteenth Edition; Editor: C. D. S. TomLin; The British Crop Protection Council], they are described therein under the entry number given in round brackets hereinabove for the particular compound; for example, the compound "abamectin" is described under entry number (1). Where "[CCN]" is added hereinabove to the particular compound, the compound in question is included in the "Compendium of Pesticide Common Names", which is accessible on the internet [A. Wood; *Compendium of Pesticide Common Names*, Copyright © 1995-2004]; for example, the compound "acetoprole" is described under the internet address http://www.alanwood.net/pesticides/acetoprole.html Most of the active ingredients described above are referred to hereinabove by a so-called "common name", the relevant "ISO common name" or another "common name" being used in individual cases. If the designation is not a "common name", the nature of the designation used instead is given in round brackets for the particular compound; in that case, the IUPAC name, the IUPAC/Chemical Abstracts name, a "chemical name", a "traditional name", a "compound name" or a "develoment code" is used or, if neither one of those designations nor a "common name" is used, an "alternative name" is employed. "CAS Reg. No" means the Chemical Abstracts Registry Number.

The active ingredient mixture of the compounds of formula (I) selected from Table X (above) with active ingredients described above comprises a compound selected from Table X (above) and an active ingredient as described above preferably in a mixing ratio of from 100:1 to 1:6000, especially from 50:1 to 1:50, more especially in a ratio of from 20:1 to 1:20, even more especially from 10:1 to 1:10, very especially from 5:1 and 1:5, special preference being given to a ratio of from 2:1 to 1:2, and a ratio of from 4:1 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are by weight.

In a preferred embodiment the compostions according to the invention comprise a weight ratio of component (A) to component (B) in the range of from 30:1 to 1:40.

Preferred field rates of mixing partner:compound of formula (I) from Table X, and also the preferred ratios of mixing partner:a compound of formula (I) from Table X, are given in the Table below for certain preferred individual mixing partners:

| Mixing partner | Preferred field rates of mixing partner (B): compound of formula (I) from Table X (A) | Preferred ratio of mixing partner (B): a compound of formula (I) from Table X (A) | Most preferred ratio of mixing partner (B): a compound of formula (I) from Table X (A) |
| --- | --- | --- | --- |
| Azoxystrobin | 60 g/ha:60 g/ha or 60 g/ha:75 g/ha | 3:1 to 1:3 | 5:4-4:5 |
| Trifloxystrobin | 60 g/ha:60 g/ha or 60 g/ha:75 g/ha | 3:1 to 1:3 | 5:4-4:5 |
| Cyproconazole | 60 g/ha:60 g/ha or 60 g/ha:75 g/ha | 3:1 to 1:3 | 5:4-4:5 |
| Difenoconazole | 75 g/ha:60 g/ha or 75 g/ha:75 g/ha | 5:2 to 2:5 | 5:4 |
| Prothioconazole | 70 g/ha:60 g/ha or 70 g/ha:75 g/ha | 1:3 to 3:1 | 7:5-5:7 |
| Mefentrifluconazole | 100 g/ha:60 g/ha or 150 g/ha:60 g/ha | 4:1 to 2:3 | 5:3-5:2 |
| Bixafen | 60 g/ha:60 g/ha or 60 g/ha:75 g/ha | 1:3 to 3:1 | 2:3 to 4:3 |
| Fluxapyroxad | 60 g/ha:60 g/ha or 60 g/ha:75 g/ha | 1:3 to 3:1 | 2:3 to 4:3 |
| Isopyrazam | 125 g/ha:60 g/ha | 1:3 to 3:1 | 1:1 to 5:2 |
| Sedaxane | 125 g/ha:60 g/ha | 1:3 to 3:1 | 1:1 to 5:2 |
| Benzovindiflupyr | 45 g/ha:60 g/ha or 45 g/ha:45 g/ha | 1:2-2:1 | 3:4-4:3, especially most preferred is 3:4-1:1 |

-continued

| Mixing partner | Preferred field rates of mixing partner (B): compound of formula (I) from Table X (A) | Preferred ratio of mixing partner (B): a compound of formula (I) from Table X (A) | Most preferred ratio of mixing partner (B): a compound of formula (I) from Table X (A) |
|---|---|---|---|
| 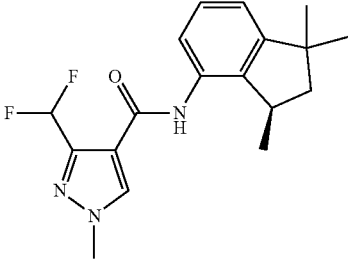 [SMILES: C[C@@H]1CC(C)(C)c2cccc(NC(=O)c3cn(C)nc3C(F)F)c21] | 20 g/ha:60 g/ha or 40 g/ha:75 g/ha | 1:4 to 4:1 | 1:3 to 1:2 |
| 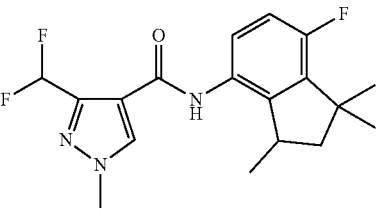 Fluindapyr | 40 g/ha:60 g/ha or 60 g/ha:60 g/ha | 1:2 to 2:1 | 3:2 to 2:3 |
| 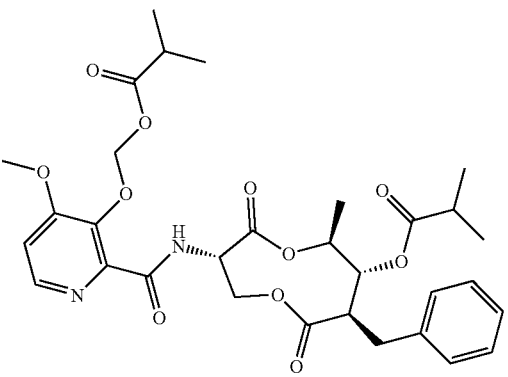 UK-2A procide (fenpicoxamid) | 130 g/ha:60 g/ha or 130 g/ha:75 g/ha | 4:1 to 1:4 | 3:1 to 1:1 |
| Chlorothalonil | 1000 g/ha:60 g/ha or 1000 g/ha:45 g/ha | 25:1 to 15:1 | 16:1 to 23:1 |
| Mancozeb | 1500 g/ha:60 g/ha or 1500 g/ha:45 g/ha | 38:1 to 20:1 | 24:1 to 34:1 |

The mixtures as described above can be used in a method for controlling pests, which comprises applying a composition comprising a mixture as described above to the pests or their environment, with the exception of a method for treatment of the human or animal body by surgery or therapy and diagnostic methods practised on the human or animal body.

The mixtures comprising a compound of formula (I) selected from Table X (above) and one or more active ingredients as described above can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compounds of formula (I) selected from Table X (above) and the active ingredients as described above is not essential for working the present invention.

The compositions of the present invention may also be used in crop enhancement.

According to the present invention, 'crop enhancement' means an improvement in plant vigour, an improvement in plant quality, improved tolerance to stress factors, and/or improved input use efficiency.

According to the present invention, an 'improvement in plant vigour' means that certain traits are improved qualitatively or quantitatively when compared with the same trait in a control plant which has been grown under the same conditions in the absence of the method of the invention. Such traits include, but are not limited to, early and/or improved germination, improved emergence, the ability to use less seeds, increased root growth, a more developed root system, increased root nodulation, increased shoot growth, increased tillering, stronger tillers, more productive tillers, increased or improved plant stand, less plant verse (lodging), an increase and/or improvement in plant height, an increase in plant weight (fresh or dry), bigger leaf blades, greener leaf colour, increased pigment content, increased photosynthetic activity, earlier flowering, longer panicles, early grain maturity, increased seed, fruit or pod size, increased pod or ear number, increased seed number per pod or ear, increased seed mass, enhanced seed filling, less dead basal leaves, delay of senescence, improved vitality of the plant, increased levels of amino acids in storage tissues and/or less inputs needed (e.g. less fertiliser, water and/or labour needed). A plant with improved vigour may have an increase in any of the aforementioned traits or any combination or two or more of the aforementioned traits.

According to the present invention, an 'improvement in plant quality' means that certain traits are improved qualitatively or quantitatively when compared with the same trait in a control plant which has been grown under the same conditions in the absence of the method of the invention. Such traits include, but are not limited to, improved visual appearance of the plant, reduced ethylene (reduced production and/or inhibition of reception), improved quality of harvested material, e.g. seeds, fruits, leaves, vegetables (such improved quality may manifest as improved visual appearance of the harvested material), improved carbohydrate content (e.g. increased quantities of sugar and/or starch, improved sugar acid ratio, reduction of reducing sugars, increased rate of development of sugar), improved protein content, improved oil content and composition, improved nutritional value, reduction in anti-nutritional compounds, improved organoleptic properties (e.g. improved taste) and/or improved consumer health benefits (e.g. increased levels of vitamins and anti-oxidants)), improved post-harvest characteristics (e.g. enhanced shelf-life and/or storage stability, easier processability, easier extraction of compounds), more homogenous crop development (e.g. synchronised germination, flowering and/or fruiting of plants), and/or improved seed quality (e.g. for use in following seasons). A plant with improved quality may have an increase in any of the aforementioned traits or any combination or two or more of the aforementioned traits.

According to the present invention, an 'improved tolerance to stress factors' means that certain traits are improved qualitatively or quantitatively when compared with the same trait in a control plant which has been grown under the same conditions in the absence of the method of the invention. Such traits include, but are not limited to, an increased tolerance and/or resistance to abiotic stress factors which cause sub-optimal growing conditions such as drought (e.g. any stress which leads to a lack of water content in plants, a lack of water uptake potential or a reduction in the water supply to plants), cold exposure, heat exposure, osmotic stress, UV stress, flooding, increased salinity (e.g. in the soil), increased mineral exposure, ozone exposure, high light exposure and/or limited availability of nutrients (e.g. nitrogen and/or phosphorus nutrients). A plant with improved tolerance to stress factors may have an increase in any of the aforementioned traits or any combination or two or more of the aforementioned traits. In the case of drought and nutrient stress, such improved tolerances may be due to, for example, more efficient uptake, use or retention of water and nutrients.

According to the present invention, an 'improved input use efficiency' means that the plants are able to grow more effectively using given levels of inputs compared to the grown of control plants which are grown under the same conditions in the absence of the method of the invention. In particular, the inputs include, but are not limited to fertiliser (such as nitrogen, phosphorous, potassium, micronutrients), light and water. A plant with improved input use efficiency may have an improved use of any of the aforementioned inputs or any combination of two or more of the aforementioned inputs.

Other crop enhancements of the present invention include a decrease in plant height, or reduction in tillering, which are beneficial features in crops or conditions where it is desirable to have less biomass and fewer tillers.

Any or all of the above crop enhancements may lead to an improved yield by improving e.g. plant physiology, plant growth and development and/or plant architecture. In the context of the present invention 'yield' includes, but is not limited to, (i) an increase in biomass production, grain yield, starch content, oil content and/or protein content, which may result from (a) an increase in the amount produced by the plant per se or (b) an improved ability to harvest plant matter, (ii) an improvement in the composition of the harvested material (e.g. improved sugar acid ratios, improved oil composition, increased nutritional value, reduction of anti-nutritional compounds, increased consumer health benefits) and/or (iii) an increased/facilitated ability to harvest the crop, improved processability of the crop and/or better storage stability/shelf life. Increased yield of an agricultural plant means that, where it is possible to take a quantitative measurement, the yield of a product of the respective plant is increased by a measurable amount over the yield of the same product of the plant produced under the same conditions, but without application of the present invention. According to the present invention, it is preferred that the yield be increased by at least 0.5%, more preferred at least 1%, even more preferred at least 2%, still more preferred at least 4%, preferably 5% or even more.

Any or all of the above crop enhancements may also lead to an improved utilisation of land, i.e. land which was previously unavailable or sub-optimal for cultivation may become available. For example, plants which show an increased ability to survive in drought conditions, may be able to be cultivated in areas of sub-optimal rainfall, e.g. perhaps on the fringe of a desert or even the desert itself.

In one aspect of the present invention, crop enhancements are made in the substantial absence of pressure from pests and/or diseases and/or abiotic stress. In a further aspect of the present invention, improvements in plant vigour, stress tolerance, quality and/or yield are made in the substantial absence of pressure from pests and/or diseases. For example pests and/or diseases may be controlled by a pesticidal treatment that is applied prior to, or at the same time as, the method of the present invention. In a still further aspect of the present invention, improvements in plant vigour, stress tolerance, quality and/or yield are made in the absence of pest and/or disease pressure. In a further embodiment, improvements in plant vigour, quality and/or yield are made in the absence, or substantial absence, of abiotic stress.

The compositions of the present invention may also be used in the field of protecting storage goods against attack of fungi. According to the present invention, the term "storage goods" is understood to denote natural substances of vegetable and/or animal origin and their processed forms, which have been taken from the natural life cycle and for which long-term protection is desired. Storage goods of vegetable origin, such as plants or parts thereof, for example stalks, leafs, tubers, seeds, fruits or grains, can be protected in the freshly harvested state or in processed form, such as predried, moistened, comminuted, ground, pressed or roasted. Also falling under the definition of storage goods is timber, whether in the form of crude timber, such as construction timber, electricity pylons and barriers, or in the form of finished articles, such as furniture or objects made from wood. Storage goods of animal origin are hides, leather, furs, hairs and the like. The composition according the present invention can prevent disadvantageous effects such as decay, discoloration or mold. Preferably "storage goods" is understood to denote natural substances of vegetable origin and/or their processed forms, more preferably fruits and their processed forms, such as pomes, stone fruits, soft fruits and citrus fruits and their processed forms. In another preferred embodiment of the invention "storage goods" is understood to denote wood.

Therefore a further aspect of the present invention is a method of protecting storage goods, which comprises applying to the storage goods a composition according to the invention.

The composition of the present invention may also be used in the field of protecting technical material against attack of fungi. According to the present invention, the term "technical material" includes paper; carpets; constructions; cooling and heating systems; wall-boards; ventilation and air conditioning systems and the like; preferably "technical material" is understood to denote wall-boards. The composition according the present invention can prevent disadvantageous effects such as decay, discoloration or mold.

The composition according to the is generally formulated in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the formulations according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate;

sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood N.J. (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The formulations according to the invention can include an additive comprising an oil of vegetable or animal origin, a mineral oil, alkyl esters of such oils or mixtures of such oils and oil derivatives. The amount of oil additive in the formulation according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, 10$^{th}$ Edition, Southern Illinois University, 2010.

The formulations generally comprise from 0.1 to 99% by weight, especially from 0.1 to 95% by weight, of compounds of formula (I) and (II) and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Preferred formulations can have the following compositions (weight %):
Emulsifiable Concentrates:
active ingredient: 1 to 95%, preferably 60 to 90%
surface-active agent: 1 to 30%, preferably 5 to 20%
liquid carrier: 1 to 80%, preferably 1 to 35%
Dusts:
active ingredient: 0.1 to 10%, preferably 0.1 to 5%
solid carrier: 99.9 to 90%, preferably 99.9 to 99%
Suspension Concentrates:
active ingredient: 5 to 75%, preferably 10 to 50%
water: 94 to 24%, preferably 88 to 30%
surface-active agent: 1 to 40%, preferably 2 to 30%
Wettable Powders:
active ingredient: 0.5 to 90%, preferably 1 to 80%
surface-active agent: 0.5 to 20%, preferably 1 to 15%
solid carrier: 5 to 95%, preferably 15 to 90%
Granules:
active ingredient: 0.1 to 30%, preferably 0.1 to 15%
solid carrier: 99.5 to 70%, preferably 97 to 85%

The following Examples further illustrate, but do not limit, the invention.

| Wettable powders | a) | b) | c) |
|---|---|---|---|
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | — | 20 |

The combination is thoroughly mixed with the adjuvants and the mixture is thoroughly ground in a suitable mill, affording powders that can be used directly for seed treatment.

| Emulsifiable concentrate | |
|---|---|
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
|---|---|---|---|
| active ingredients | 5% | 6% | 4% |
| talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder granules | |
|---|---|
| active ingredients | 15% |
| sodium lignosulfonate | 2% |
| carboxymethylcellulose | 1% |
| Kaolin | 82% |

The combination is mixed and ground with the adjuvants, and the mixture is moistened with water. The mixture is extruded and then dried in a stream of air.

| Coated granules | |
|---|---|
| active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

| Suspension concentrate | |
|---|---|
| active ingredients | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| Flowable concentrate for seed treatment | |
|---|---|
| active ingredients | 40% |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

In general, the weight ratio of component (A) to component (B) is from 2000:1 to 1:1000. A non-limiting example for such weight ratios is compound of formula (I):component (B) compound 10:1. The weight ratio of component (A) to component (B) is preferably from 100:1 to 1:100; more preferably from 20:1 to 1:50.

The composition comprising the compound of formula (I) and the compound of formula (I) may show a synergistic effect. This occurs whenever the action of an active ingredient combination is greater than the sum of the actions of the individual components. The action to be expected E for a given active ingredient combination obeys the so-called COLBY formula and can be calculated as follows (COLBY, S. R. "Calculating synergistic and antagonistic responses of herbicide combination". Weeds, Vol. 15, pages 20-22; 1967):

ppm=milligrams of active ingredient (=a.i.) per liter of spray mixture

X=% action by active ingredient A) using p ppm of active ingredient

Y=% action by active ingredient B) using q ppm of active ingredient.

According to COLBY, the expected (additive) action of active ingredients A)+B) using p+q ppm of active ingredient is:

$$E = X + Y - \frac{X \cdot Y}{100}.$$

If the action actually observed (O) is greater than the expected action (E), then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

However, besides the actual synergistic action with respect to fungicidal activity, the composition according to the invention may also have further surprising advantageous properties. Examples of such advantageous properties that may be mentioned are: more advantageous degradability; improved toxicological and/or ecotoxicological behaviour; or improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigor, and early germination.

The composition according to the invention can be applied to the phytopathogenic microorganisms, the useful plants, the locus thereof, the propagation material thereof, storage goods or technical materials threatened by microorganism attack.

The composition according to the invention may be applied before or after infection of the useful plants, the propagation material thereof, storage goods or technical materials by the microorganisms.

The amount of a composition according to the invention to be applied, will depend on various factors, such as the compounds employed; the subject of the treatment, such as, for example plants, soil or seeds; the type of treatment, such as, for example spraying, dusting or seed dressing; the purpose of the treatment, such as, for example prophylactic or therapeutic; the type of fungi to be controlled or the application time.

When applied to the useful plants component (A) is typically applied at a rate of 5 to 2000 g a.i./ha, particularly 10 to 1000 g a.i./ha, e.g. 50, 75, 100 or 200 g a.i./ha, typically in association with 1 to 5000 g a.i./ha, particularly 2 to 2000 g a.i./ha, e.g. 100, 250, 500, 800, 1000, 1500 g a.i./ha of component (B).

In agricultural practice the application rates of the composition according to the invention depend on the type of effect desired, and typically range from 20 to 4000 g of total composition per hectare.

When the composition according to the invention is used for treating seed, rates of 0.001 to 50 g of a compound of component (A) per kg of seed, preferably from 0.01 to 10 g per kg of seed, and 0.001 to 50 g of a compound of component (B), per kg of seed, preferably from 0.01 to 10 g per kg of seed, are generally sufficient.

For the avoidance of doubt, where a literary reference, patent application, or patent, is cited within the text of this application, the entire text of said citation is herein incorporated by reference.

SYNTHETIC EXAMPLES

Using techniques described below and techniques analogous to those described in WO 12/146125 (pp. 370-378) and further techniques known to the person skilled in the art, for example as found in WO 08/101682 (pp. 22-33), compounds of formula (I) may be prepared.

Preparation of (2R)-1-propoxypropan-2-ol

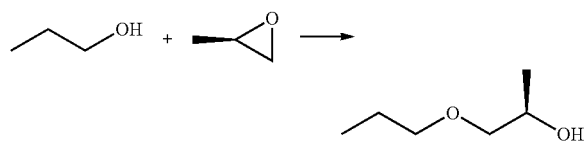

To an ice-bath cooled solution of THF (400 mL) under inert atmosphere (Ar) charged with sodium hydride (12 g, 490 mmol, 5 equiv.) 1-propanol (40 mL, 490 mmol, 5 equiv) was added dropwise. The ice bath was removed and the reaction mixture was stirred at room temperature for 30 minutes then (2R)-2-methyloxirane (5.8 g, 99 mmol) was added dropwise and the reaction was stirred for 18h under heating at 50° C. After this time, GC-MS and NMR indicated that the starting material was consumed and the reaction mixture was allowed to reach room temperature before quenching with aqueous NH$_4$Cl solution and extracting with dichloromethane. The organic layer was dried over anhydrous Na$_2$SO$_4$ and filtered. The solvent was removed in vacuo (not dropping below 200 mbar) at 30° C. and provided the title compound (4.4 g, 38% yield) as a yellow liquid.

$^1$H NMR (400 MHz, CDCl$_3$): δ (ppm) 4.00-3.87 (1H, m) 3.50-3.40 (m, 3H), 3.30-3.20 (m, 1H), 2.64 (d, 1H), 1.61 (m, 2H), 1.12 (d, 3H), 0.95 (t, 3H)

Preparation of N'-[5-bromo-2-methyl-6-[(1S)-1-methyl-2-propoxy-ethoxy]-3-pyridyl]-N-ethyl-N-methyl-formamidine

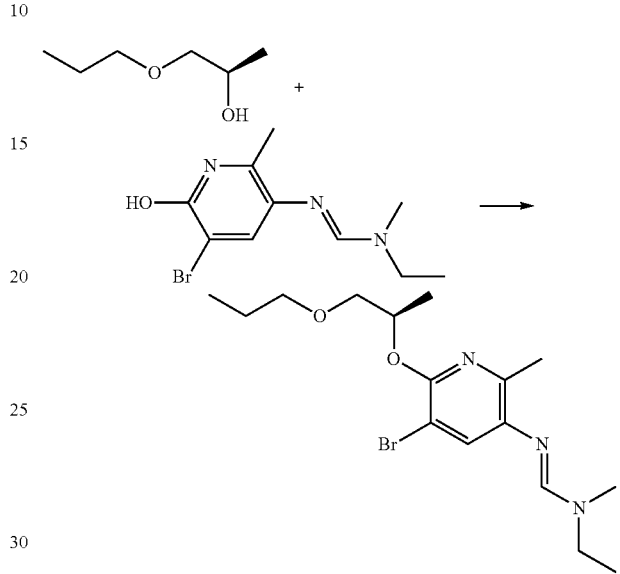

To a stirring suspension of N'-(5-bromo-6-hydroxy-2-methyl-3-pyridyl)-N-ethyl-N-methyl-formamidine (0.75 g, 2.8 mmol) in THF (15 mL), (2R)-1-propoxypropan-2-ol (0.36 g, 3 mmol, 1.1 equiv) and triphenylphosphine (0.80 g, 3 mmol, 1.1 equiv) were added at room temperature under inert atmosphere (Ar). To this mixture, DIAD (diisopropyl diazodicarboxylate) (0.60 mL, 3 mmol, 1.1 equiv) was added dropwise over 10 minutes while keeping the temperature below 40° C. The reaction mixture was stirred for 24h at room temperature. After this time, LC-MS indicated that the starting material had been nearly consumed and the reaction mixture was quenched with water (40 mL). The water phase was extracted with ethyl acetate (3×50 mL). The organic layer was dried over anhydrous Na$_2$SO$_4$ and filtered. The solvent was removed in vacuo to give a brown residue, which was purified by preparative reverse phase chromatography to afford the desired (0.10 g, 10% yield).

$^1$H NMR (400 MHz, CDCl$_3$): δ (ppm) 7.45-7.30 (broad s, 1H), 7.24 (s, 1H), 5.40-5.30 (m, 1H), 3.70-3.60 (m, 1H), 3.55-3.45 (m, 3H), 3.45-3.30 (broad m, 2H), 3.00 (s, 3H), 2.35 (s, 3H), 1.65-1.50 (m, 2H), 1.35 (m, 3H), 1.20 (m, 3H), 0.90 (t, 3H).

Preparation of N'-[5-bromo-2-methyl-6-[(1R)-1-methyl-2-propoxy-ethoxy]-3-pyridyl]-N-ethyl-N-methyl-formamidine

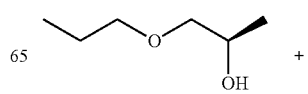

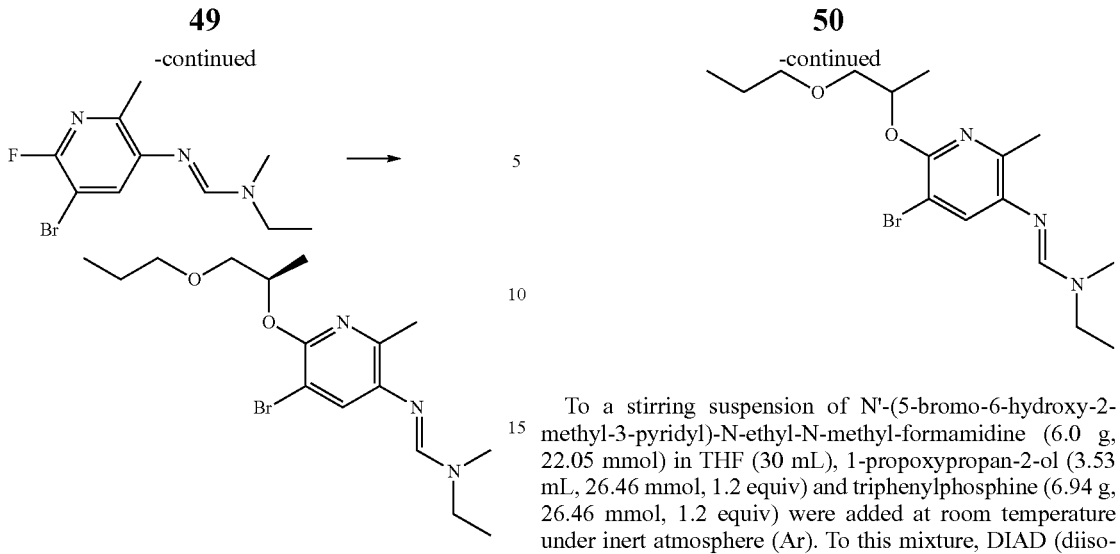

To an ice-bath cooled solution of (2R)-1-propoxypropan-2-ol (0.103 g, 0.88 mmol, 1.2 equiv) in DMF (4 mL) under inert atmosphere (Ar), potassium tertbutoxide (0.25 g, 2.19 mmol, 3 equiv) and triphenylphosphine (0.14 g, 0.55 mmol, 1.5 equiv) were added. The reaction mixture was stirred for 20 minutes before N'-(5-bromo-6-fluoro-2-methyl-3-pyridyl)-N-ethyl-N-methyl-formamidine (0.20 g, 0.73 mmol) was added. The reaction mixture was stirred for 4h at room temperature and was quenched with water upon completion. The water phase was extracted with ethyl acetate (2×50 mL). The organic layers were combined, washed with water (3×50 mL), dried over anhydrous Na$_2$SO$_4$, and filtered. The solvent was removed in vacuo to give a brown residue, which was purified by preparative reverse phase chromatography to afford the desired compound (0.130 g, 13% yield).

$^1$H NMR (400 MHz, CDCl$_3$): δ (ppm) 7.45-7.30 (broad s, 1H), 7.24 (s, 1H), 5.40-5.30 (m, 1H), 3.70-3.60 (m, 1H), 3.55-3.45 (m, 3H), 3.50-3.30 (broad m, 2H), 3.00 (s, 3H), 2.35 (s, 3H), 1.65-1.50 (m, 2H), 1.35 (m, 3H), 1.20 (m, 3H), 0.90 (t, 3H).

Preparation of N'-[5-bromo-2-methyl-6-(1-methyl-2-propoxy-ethoxy)-3-pyridyl]-N-ethyl-N-methyl-formamidine

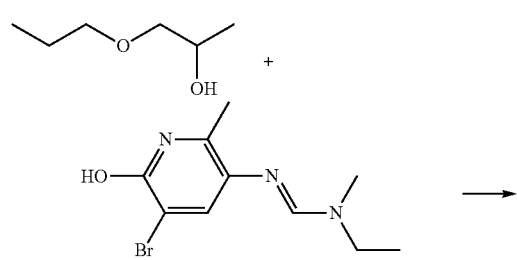

To a stirring suspension of N'-(5-bromo-6-hydroxy-2-methyl-3-pyridyl)-N-ethyl-N-methyl-formamidine (6.0 g, 22.05 mmol) in THF (30 mL), 1-propoxypropan-2-ol (3.53 mL, 26.46 mmol, 1.2 equiv) and triphenylphosphine (6.94 g, 26.46 mmol, 1.2 equiv) were added at room temperature under inert atmosphere (Ar). To this mixture, DIAD (diisopropyl diazodicarboxylate) (5.21 mL, 26.46 mmol, 1.2 equiv) was added dropwise over 10 minutes while keeping the temperature below 40° C. The reaction mixture was stirred for 1.5 h at room temperature. After this time, LC-MS indicated that the starting material had been consumed and the reaction mixture was concentrated in vacuo. Heptane was added to the residue and the mixture was cooled with an ice bath to recrystallize triphenylphosphine oxide. The brown residue was purified by combiflash column chromatography (silica gel, heptane:ethyl acetate, v/v=90/10 to 4/1). Fractions containing the pure compound were collected and concentrated in vacuo to give the title compound (7.80 g, 95% yield) as a light yellow oil.

$^1$H NMR (400 MHz, CDCl$_3$): δ (ppm) 7.45-7.30 (broad s, 1H), 7.24 (s, 1H), 5.40-5.30 (m, 1H), 3.70-3.60 (m, 1H), 3.55-3.45 (m, 3H), 3.45-3.30 (broad m, 2H), 3.00 (s, 3H), 2.35 (s, 3H), 1.65-1.50 (m, 2H), 1.35 (m, 3H), 1.20 (m, 3H), 0.90 (t, 3H).

Preparation of N'-[5-cyano-2-methyl-6-(1-methyl-2-propoxy-ethoxy)-3-pyridyl]-N-ethyl-N-methyl-formamidine

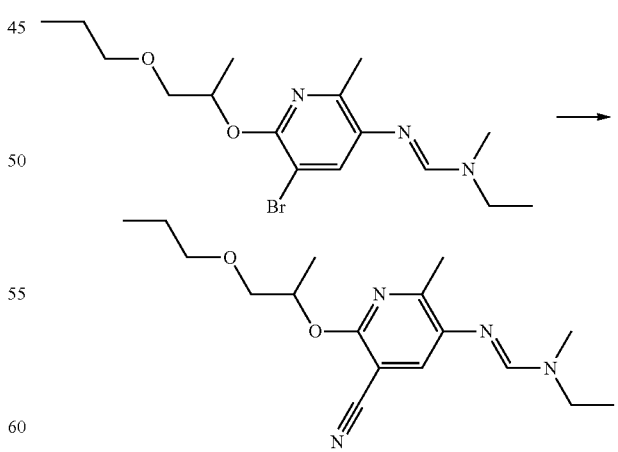

To a stirred solution of N'-[5-bromo-2-methyl-6-(1-methyl-2-propoxy-ethoxy)-3-pyridyl]-N-ethyl-N-methyl-formamidine (0.25 g, 0.67 mmol) in DMF (1 mL) under inert atmosphere (Ar), zinc cyanide (0.087 g, 0.74 mmol, 1.1 equiv) and tetrakis(triphenylphosphine)palladium (0.23 g, 0.20 mmol, 0.3 equiv) were added and the reaction mixture was stirred for 18h under heating at 120° C. After this time, TLC and LC-MS indicated that the starting material was consumed and the reaction mixture was allowed to reach room temperature before quenching with water. The water phase was extracted with ethyl acetate (2×30 mL). The organic layer was washed with brine (3×50 mL), dried over anhydrous $Na_2SO_4$ and filtered. The solvent was removed in vacuo to give a brown residue, which was purified by combiflash column chromatography (silica gel, heptane/ethyl acetate, v/v=90/10 to 70/30). Fractions containing the pure compound were collected and concentrated in vacuo to give the title compound (0.207 g, 97% yield) as a colorless oil.

$^1$H NMR (400 MHz, $CDCl_3$): δ (ppm) 7.45-7.30 (broad s, 1H), 7.20 (s, 1H), 5.50-5.40 (m, 1H), 3.70-3.60 (m, 1H), 3.55-3.40 (m, 3H), 3.45-3.30 (broad m, 2H), 3.00 (s, 3H), 2.40 (s, 3H), 1.65-1.50 (m, 2H), 1.35 (m, 3H), 1.20 (m, 3H), 0.90 (t, 3H).

Preparation of
3-chloro-6-methyl-5-nitro-pyridin-2-ol

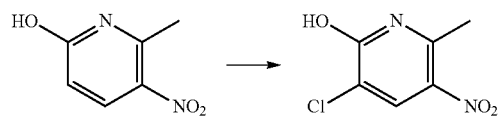

To an ice-bath cooled suspension of 6-methyl-5-nitro-pyridin-2-ol (0.50 g, 3.24 mmol) in acetonitrile (5 mL) under inert atmosphere (Ar), was added N-chlorosuccinimide (0.43 g, 3.24 mmol, 1 equiv) was added portionwise. The reaction mixture was stirred for 20h under heating at 67° C. At this time, LC-MS indicated that the starting material was consumed and the reaction mixture was cooled to 0° C. and the precipitate was filtered to give the title compound (0.36 g, 48% yield) as a beige-white solid.

$^1$H NMR (400 MHz, $CD_3OD$): δ (ppm) 8.5 (s, 1H), 2.7 (s, 3H).

Preparation of 5-chloro-2-methyl-3-nitro-6-(o-tolyl-methoxy)pyridine

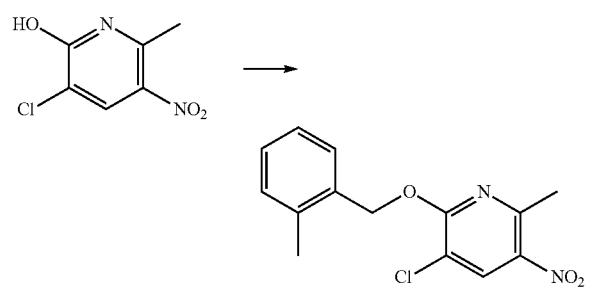

To a stirred solution of o-tolylmethanol (3.99 g, 32.1 mmol, 1.2 equiv) in THF (100 mL), 3-chloro-6-methyl-5-nitro-pyridin-2-ol (5.30 g, 26.7 mmol) and triphenylphosphine (8.41 g, 32.1 mmol, 1.2 equiv) were added at room temperature under inert atmosphere (Ar). To this mixture, DIAD (diisopropyl diazodicarboxylate) (6.58 mL, 33.4 mmol, 1.25 equiv) was added dropwise over 10 minutes while keeping the temperature below 40° C. The reaction mixture was stirred for 16 h at room temperature. At this time, LC-MS indicated that the starting material was consumed and the reaction mixture was quenched with water (20 mL). A precipitate formed and was filtered and washed with a mixture of methanol/water (v/v=5/1), suspended in toluene and concentrated in vacuo to give the title compound (5.28 g, 47% yield) as a yellow solid.

$^1$H NMR (400 MHz, DMSO): δ (ppm)=8.60 (s, 1H), 7.45 (d, 1H), 7.30-7.20 (m, 3H), 5.50 (s, 2H), 2.70 (s, 3H), 2.35 (s, 3H).

Preparation of
6-benzyloxy-5-chloro-2-methyl-pyridin-3-amine

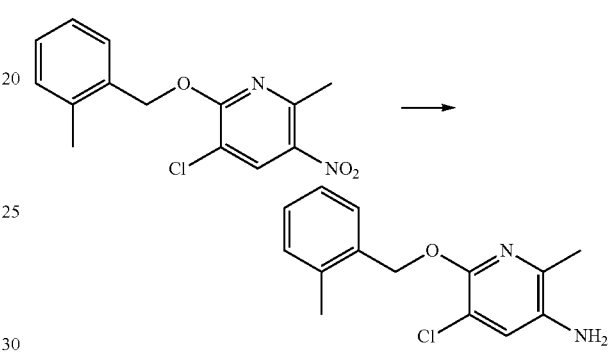

A solution of 2-benzyloxy-3-chloro-6-methyl-5-nitro-pyridine (250 mg, 0.90 mmol), 10% platinum on carbon (12 mg, 0.062 mmol) in THF (5 mL) was placed under hydrogen (3 equiv., 2.70 mmol) pressure of 3 bar and the reaction was stirred for 18 h at 37° C. After this time, TLC indicated that the starting material has been consumed. The reaction mixture was filtered and the residue was washed with methanol. The organic layer was concentrated to give the title compound (0.216 g, 97% yield) which was used without further purification.

$^1$H NMR (400 MHz, $CDCl_3$): δ (ppm) 7.50-7.45 (m, 1H), 7.25-7.15 (m, 3H), 7.0 (s, 1H), 5.35 (s, 2H), 3.40-3.10 (broad s, 2H), 2.42 (s, 3H), 2.30 (s, 3H).

Preparation of N'-(5-chloro-6-hydroxy-2-methyl-3-pyridyl)-N-ethyl-N-methyl-formamidine

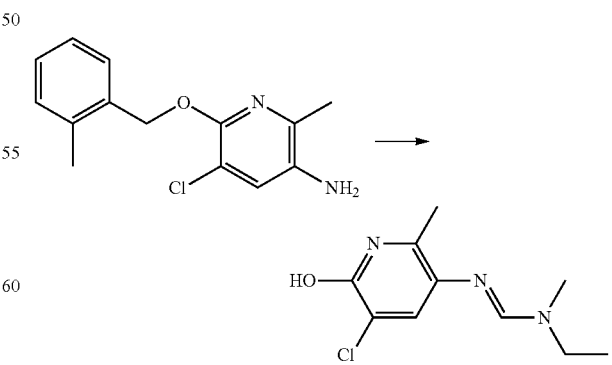

To a solution of N-ethyl-N-methyl-formamide (1.29 g, 14.76 mmol, 1.1 equiv) in dichloromethane (70 mL) was added phosphorus oxychloride (1.38 mL, 14.76 mmol, 1.1 equiv). The solution was stirred for 1.5 h at room temperature and then a solution of 5-chloro-2-methyl-6-(o-tolylmethoxy)pyridin-3-amine (3.52 g, 13.41 mmol) in dichloromethane (10 mL) was added dropwise. After being stirred for 20 h at room temperature the solid was filtered and washed with dichloromethane. The residue was purified by combiflash column chromatography (silica gel, dichloromethane/methanol+5% triethylamine v/v=10/0 to 9/1). Fractions containing the compound were collected and concentrated in vacuo to give the title compound (2.52 g, 82% yield) as a yellow solid.

$^1$H NMR (400 MHz, CD$_3$OD): δ (ppm) 7.65-7.50 (broad s, 1H), 3.50-3.30 (broad s, 1H), 3.0 (s, 2H), 2.25 (s, 3H), 1.35 (m, 3H), 1.25 (m, 3H).

Preparation of N'-[5-chloro-2-methyl-6-(1-methyl-2-propoxy-ethoxy)-3-pyridyl]-N-ethyl-N-methyl-formamidine

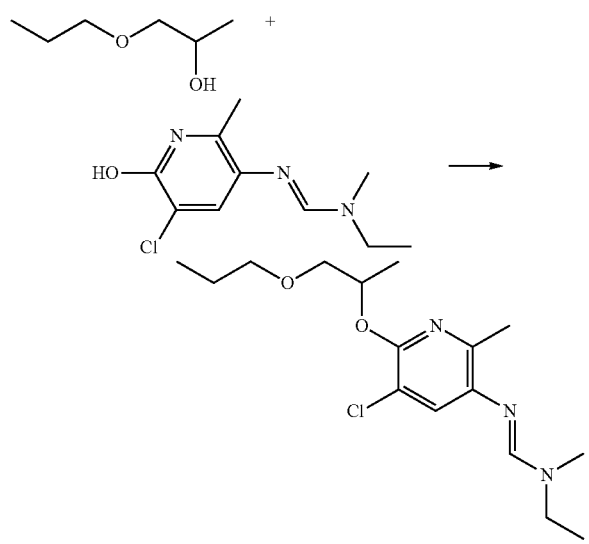

To a stirred solution of N'-(5-chloro-6-hydroxy-2-methyl-3-pyridyl)-N-ethyl-N-methyl-formamidine (0.25 g, 1.10 mmol) in THF (10 mL), 1-propoxypropan-2-ol (0.14 g, 1.21 mmol, 1.1 equiv) and triphenylphosphine (0.32 g, 1.21 mmol, 1.1 equiv) were added at room temperature under inert atmosphere (Ar). To this mixture, DIAD (diisopropyl diazodicarboxylate) (0.24 mL, 1.21 mmol, 1.1 equiv) was added dropwise over 10 minutes while keeping the temperature below 40° C. The reaction mixture was stirred for 16h under heating at 60° C. After this time, triphenylphosphine (0.15 g, 0.55 mmol, 0.5 equiv) and DIAD (diisopropyl diazodicarboxylate) (0.11 mL, 0.55 mmol, 0.5 equiv) were added again and the reaction mixture wasfurther stirred for 9 h. The reaction mixture was allowed to reach room temperature before quenching with water (10 mL) and 2M NaOH aqueous solution (2 mL).

The water phase was extracted with ethyl acetate (1×25 mL). The organic layers were combined, dried over anhydrous Na$_2$SO$_4$ and filtered. The solvent was removed in vacuo to give a brown residue, which was purified by combiflash column chromatography (silica gel, heptane/ethyl acetate, v/v=9/1 to 1/1). Fractions containing the pure compound were collected and concentrated in vacuo to give the title compound (0.19 g, 53% yield) as an yellow oil.

$^1$H NMR (400 MHz, CDCl$_3$): δ (ppm) 7.45-7.30 (broad s, 1H), 7.05 (s, 1H), 5.40-5.30 (m, 1H), 3.70-3.60 (m, 1H), 3.55-3.40 (m, 3H), 3.45-3.30 (broad m, 2H), 3.00 (s, 3H), 2.35 (s, 3H), 1.65-1.50 (m, 2H), 1.35 (m, 3H), 1.20 (m, 3H), 0.85 (t, 3H).

Preparation of 5-bromo-2-methyl-6-(1-methyl-2-propoxy-ethoxy)-3-nitro-pyridine

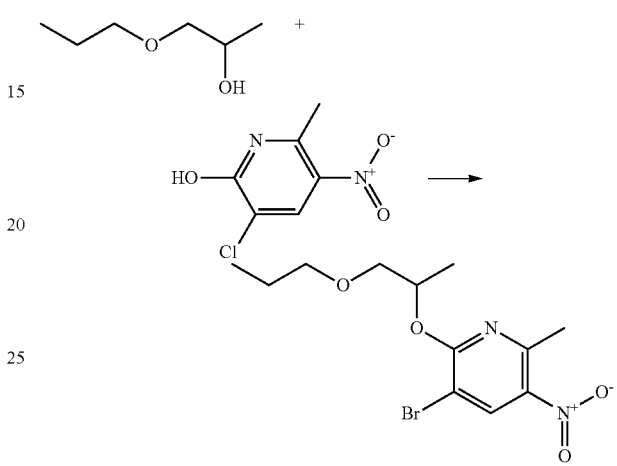

To a stirred suspension of 3-bromo-6-methyl-5-nitro-pyridin-2-ol (0.23 g, 1 mmol) in THF (0.08 mL), 1-propoxypropan-2-ol (0.15 g, 1.2 mmol, 1.2 equiv) and triphenylphosphine (0.32 g, 1.2 mmol, 1.2 equiv) were added at room temperature under inert atmosphere (Ar). To this mixture, DIAD (diisopropyl diazodicarboxylate) (0.24 mL, 1.2 mmol, 1.2 equiv) was added dropwise over 10 minutes while keeping the temperature below 40° C. The reaction mixture was stirred for 12h under heating at 65° C. After this time, LC-MS still showed remaining starting material but the reaction mixture was allowed to reach room temperature and the solvent was removed in vacuo to give a brown residue, which was purified by combiflash column chromatography (silica gel, heptane/triethylamine, v/v=95/5). Fractions containing the pure compound were collected and concentrated in vacuo to give the title compound (0.20 g, 60% yield) as a beige oil.

$^1$H NMR (400 MHz, CDCl$_3$): δ (ppm) 8.45 (s, 1H), 5.50-5.40 (m, 1H), 3.65-3.60 (m, 1H), 3.65-3.50 (m, 1H), 3.50-3.35 (m, 2H), 2.70 (s, 3H), 1.50 (m, 2H), 1.30 (m, 3H), 0.80 (t, 3H).

Preparation of 5-bromo-2-methyl-6-(1-methyl-2-propoxy-ethoxy)pyridin-3-amine

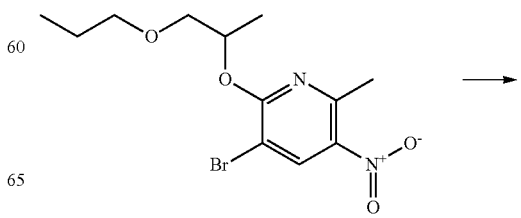

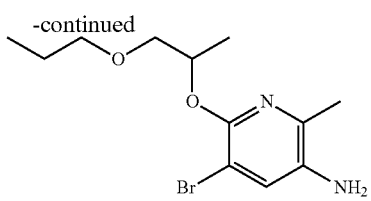

To a stirred suspension of 5-bromo-2-methyl-6-(1-methyl-2-propoxy-ethoxy)-3-nitro-pyridine (0.47 g, 1.41 mmol) in ethanol (10 mL) were added ammonium chloride (0.15 g, 2.82 mmol, 2 equiv), water (2.8 mL) and then iron powder (0.32 g, 5.64 mmol, 4 equiv). The reaction mixture was stirred for 4h under heating at 85° C. As reaction monitoring still showed remaining starting material, ammonium chloride (0.75 g, 1.41 mmol, 1 equiv) and iron powder (0.16 g, 2.82 mmol, 2 equiv) were added and reaction mixture was further stirred for 10 h under heating at 85° C. After this time, LC-MS indicated that the starting material has been consumed and the reaction mixture was allowed to reach room temperature before filtering it over celite. The solvent was removed in vacuo and the residue was redissolved with ethyl acetate (15 mL). The organic phase was washed with a 2N aqueous NaOH solution (2×25 mL), dried over anhydrous $Na_2SO_4$ and filtered. The solvent was removed in vacuo to give a brown residue, which was purified by combiflash column chromatography (silica gel, heptane/ethyl acetate+10% triethylamine, v/v=10/0 to 1/1). Fractions containing the pure compound were collected and concentrated in vacuo to give the title compound (0.27 g, 63% yield) as an orange-brown oil.

$^1$H NMR (400 MHz, $CDCl_3$): δ (ppm) 7.10 (s, 1H), 5.25-5.15 (m, 1H), 3.65-3.60 (m, 1H), 3.55-3.50 (m, 3H), 3.50-3.35 (broad m, 2H), 2.20 (s, 3H), 1.50 (m, 2H), 1.25 (m, 3H), 0.80 (t, 3H).

Preparation of N'-[5-bromo-2-methyl-6-(1-methyl-2-propoxy-ethoxy)-3-pyridyl]-N-ethyl-formamidine

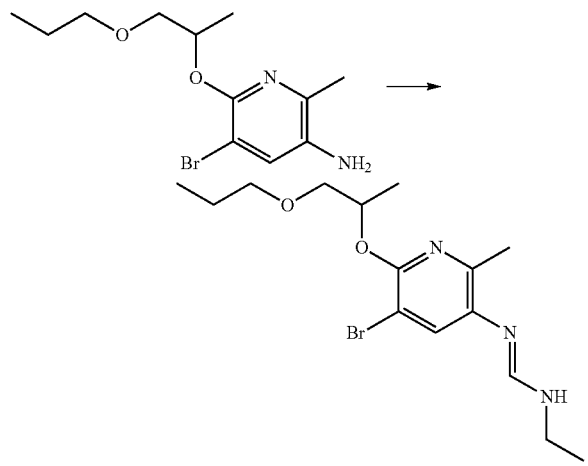

To a solution of N-ethylformamide (0.070 mL, 0.91 mmol, 1.1 equiv) in dichloromethane (6.6 mL) was added phosphorus oxychloride (0.085 mL, 0.91 mmol, 1.1 equiv). The solution was stirred for 1 h at room temperature. Then a solution of 5-bromo-2-methyl-6-(1-methyl-2-propoxy-ethoxy)pyridin-3-amine (0.25 g, 0.83 mmol) in dichloromethane (3 mL) was added dropwise. The suspension was stirred for 2 h at room temperature then poured onto a mixture of 2N aqueous NaOH solution (25 mL) and ice. The aqueous layer was separated, extracted with dichloromethane (2×15 mL). The organic phase was washed with 2N aqueous NaOH solution (25 mL) and brine (25 mL), dried over anhydrous $Na_2SO_4$ and filtered. The solvent was removed in vacuo to give a dark yellow residue, which was purified by reverse phase preparative HPLC to give the title compound (0.09 g, 29% yield) as an orange-brown oil.

$^1$H NMR (400 MHz, $CDCl_3$): δ (ppm) 7.45 (s, 1H), 7.25 (s, 1H), 5.40-5.30 (m, 1H), 4.70-4.50 (broad s, 1H), 3.75-3.60 (m, 1H), 3.55-3.45 (m, 3H), 3.50-3.35 (broad m, 2H), 2.30 (s, 3H), 1.60-1.50 (m, 2H), 1.35 (m, 3H), 1.25 (m, 3H), 0.80 (t, 3H).

Preparation of N'-[5-bromo-2-methyl-6-(1-methyl-2-propoxy-ethoxy)-3-pyridyl]-N-methyl-formamidine

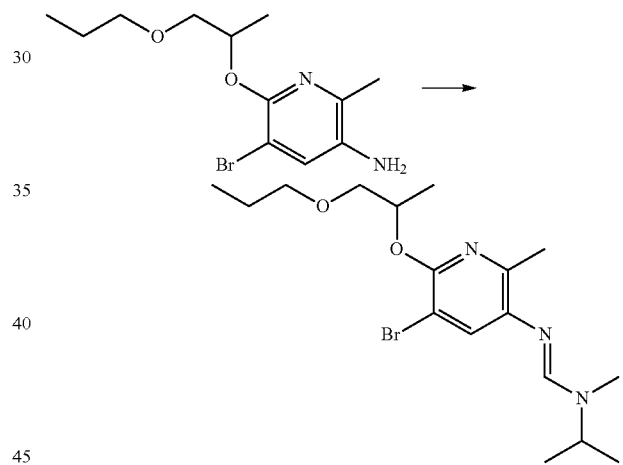

To a solution of N-methyl N-ethylformamide (0.30 g, 2.37 mmol, 1.1 equiv, 80% wt.) in dichloromethane (4.0 mL) was added phosphorus oxychloride (0.20 mL, 2.2 mmol, 1.1 equiv). The solution was stirred for 1 h at room temperature. Then a solution of 5-bromo-2-methyl-6-(1-methyl-2-propoxy-ethoxy)pyridin-3-amine (0.60 g, 2.0 mmol) in dichloromethane (0.5 mL) was added dropwise. The suspension was stirred for 2h at room temperature, then poured onto a mixture of 2N aqueous NaOH solution (25 mL) and ice. The aqueous layer was separated, extracted with dichloromethane (2×15 mL). The organic phase was washed with 2N aqueous NaOH solution (25 mL) and brine (25 mL), dried over anhydrous $Na_2SO_4$ and filtered. The solvent was removed in vacuo to give a dark yellow residue, which was purified by reverse phase preparative HPLC to give the title compound (0.30 g, 40% yield) as an orange oil.

$^1$H NMR (400 MHz, $CDCl_3$): δ (ppm) 7.47 (broad s, 1H), 7.25 (s, 1H), 5.40-5.30 (m, 2H), 3.70-3.64 (m, 3H), 3.60-3.40 (m, 3H), 2.94 (broad s, 2H) 2.35 (d, 3H), 1.65-1.50 (m, 2H), 1.35 (m, 3H), 1.25 (m, 6H), 0.90 (t, 3H).

TABLE 67

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: R<sub>t</sub> (min); MS-ESI (m/z; (M + H)$^+$); |
|---|---|---|
| 67.001 | 5-[[ethyl(methyl)amino]methyleneamino]-6-methyl-2-(1-methyl-2-propoxy-ethoxy)pyridine-3-carboxamide | Method 1 0.9 min.; 337 |
| 67.002 | N'-[5-bromo-2-methyl-6-[(1S)-1-methyl-2-propoxy-ethoxy]-3-pyridyl]-N-ethyl-N-methyl-formamidine | Method 1 0.76 min.; 372 |
| 67.003 | N'-[5-bromo-2-methyl-6-[(1R)-1-methyl-2-propoxy-ethoxy]-3-pyridyl]-N-ethyl-N-methyl-formamidine | Method 1 0.76 min.; 372 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: $R_t$ (min); MS-ESI (m/z; (M + H)$^+$); |
|---|---|---|
| 67.004 | 5-[[ethyl(methyl)amino]methyleneamino]-N,N,6-trimethyl-2-(1-methyl-2-propoxy-ethoxy)pyridine-3-carboxamide | Method 1 0.8 min.; 361 |
| 67.005 | 5-[[ethyl(methyl)amino]methyleneamino]-N,6-dimethyl-2-(1-methyl-2-propoxy-ethoxy)pyridine-3-carboxamide | Method 1 0.8 min.; 351 |
| 67.006 | 5-[[ethyl(methyl)amino]methyleneamino]-6-methyl-2-(1-methyl-2-propoxy-ethoxy)pyridine-3-carboxylic acid | Method 1 0.7 min.; 338 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: R$_t$ (min); MS-ESI (m/z; (M + H)$^+$); |
|---|---|---|
| 67.007 | N'-[5-cyano-2-methyl-6-(1-methyl-2-propoxy-ethoxy)-3-pyridyl]-N-ethyl-N-methyl-formamidine | Method 1 0.78 min.; 319 |
| 67.008 | N'-[5-bromo-2-methyl-6-(1-methyl-2-propoxy-ethoxy)-3-pyridyl]-N-isopropyl-N-methyl-formamidine | oil |
| 67.009 | N'-[5-(difluoromethyl)-2-methyl-6-(1-methyl-2-propoxy-ethoxy)-3-pyridyl]-N-ethyl-N-methyl-formamidine | Method 2 13.04 min.; 342 |
| 67.010 | N'-[5-(difluoromethoxy)-2-methyl-6-(1-methyl-2-propoxy-ethoxy)-3-pyridyl]-N-ethyl-N-methyl-formamidine | Method 1 0.85 min.; 360 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: R<sub>t</sub> (min); MS-ESI (m/z; (M + H)<sup>+</sup>); |
|---|---|---|
| 67.011 | N'-[2,5-dimethyl-6-(1-methyl-2-propoxy-ethoxy)-3-pyridyl]-N-ethyl-N-methyl-formamidine | Method 1 0.79 min.; 308 |
| 67.012 | N'-[2-methyl-6-(1-methyl-2-propoxy-ethoxy)-3-pyridyl]- N-ethyl-N-methyl-formamidine | Method 1 0.67 min.; 294 |
| 67.013 | N'-[5-bromo-2-methyl-6-(1-methyl-2-propoxy-ethoxy)-3-pyridyl]-N-ethyl-N-methyl-formamidine | Method 1 0.76 min.; 372 |
| 67.014 | N'-[6-(2-allyloxy-1-methyl-ethoxy)-5-chloro-2-methyl-3-pyridyl]-N-ethyl-N-methyl-formamidine | Method 3 1.08 min.; 326 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: R$_t$ (min); MS-ESI (m/z; (M + H)$^+$); |
|---|---|---|
| 67.015 | N'-[5-chloro-2-methyl-6-(1-methyl-2-propoxy-ethoxy)-3-pyridyl]-N-ethyl-N-methyl-formamidine | Method 1 1.11 min.; 328 |
| 67.016 | N'-[6-[1-(allyloxymethyl)-2-methoxy-ethoxy]-5-bromo-2-methyl-3-pyridyl]-N-ethyl-N-methyl-formamidine | Method 3 1.02 min.; 400 |
| 67.017 | N'-[6-(2-allyloxy-1-methyl-ethoxy)-5-cyano-2-methyl-3-pyridyl]-N-ethyl-N-methyl-formamidine | Method 3 0.96 min.; 317 |
| 67.018 | N'-[5-bromo-2-methyl-6-(1-methyl-2-propoxy-ethoxy)-3-pyridyl]-N-isopropyl-N-methyl-formamidine | oil |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: $R_t$ (min); MS-ESI (m/z; $(M + H)^+$); |
|---|---|---|
| 67.019 | 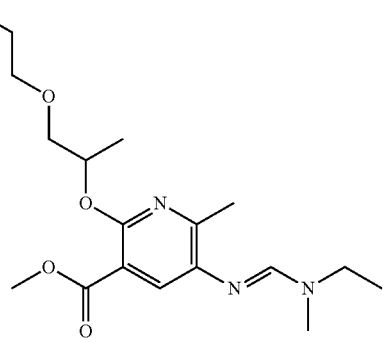Methyl 5-[[ethyl(methyl)amino]methyleneamino]-6-methyl-2-(1-methyl-2-propoxy-ethoxy)pyridine-3-carboxylate | Method 1<br>0.80 min.;<br>352 |
| 67.020 | 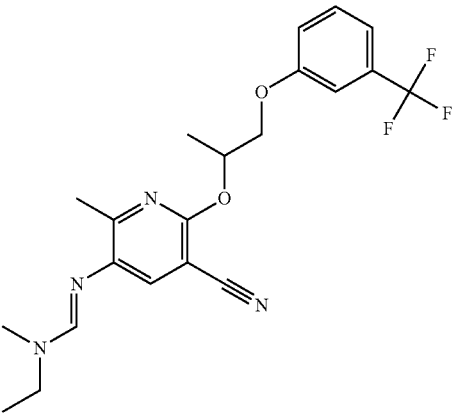N'-[5-cyano-2-methyl-6-[1-methyl-2-[3-(trifluoromethyl)phenoxy]ethoxy]-3-pyridyl]-N-ethyl-N-methyl-formamidine | Method 3<br>1.33 min.;<br>422 |
| 67.021 | 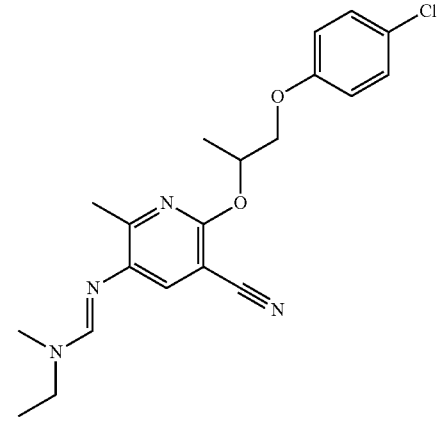N'-[6-[2-(4-chlorophenoxy)-1-methyl-ethoxy]-5-cyano-2-methyl-3-pyridyl]-N-ethyl-N-methyl-formamidine | Method 3<br>1.29 min.;<br>387 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: $R_t$ (min); MS-ESI (m/z; (M + H)$^+$); |
|---|---|---|
| 67.022 | 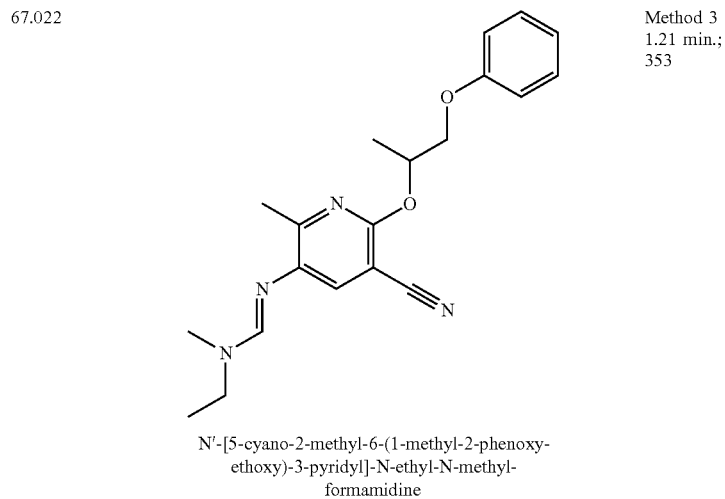<br>N'-[5-cyano-2-methyl-6-(1-methyl-2-phenoxy-ethoxy)-3-pyridyl]-N-ethyl-N-methyl-formamidine | Method 3<br>1.21 min.;<br>353 |
| 67.023 | 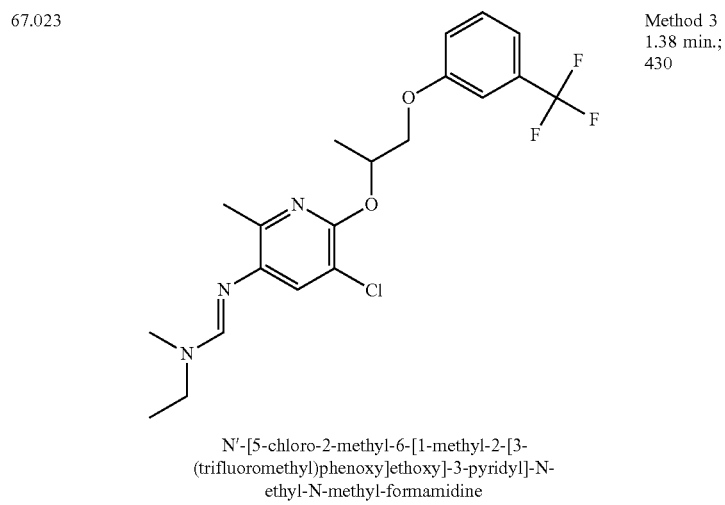<br>N'-[5-chloro-2-methyl-6-[1-methyl-2-[3-(trifluoromethyl)phenoxy]ethoxy]-3-pyridyl]-N-ethyl-N-methyl-formamidine | Method 3<br>1.38 min.;<br>430 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: $R_t$ (min); MS-ESI (m/z; (M + H)$^+$); |
|---|---|---|
| 67.024 | 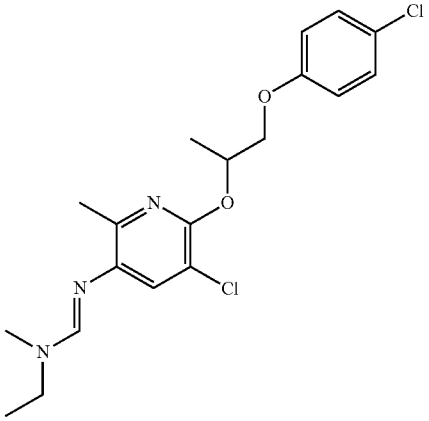 N'-[5-chloro-6-[2-(4-chlorophenoxy)-1-methyl-ethoxy]-2-methyl-3-pyridyl]-N-ethyl-N-methyl-formamidine | Method 3 1.38 min.; 396 |
| 67.025 | 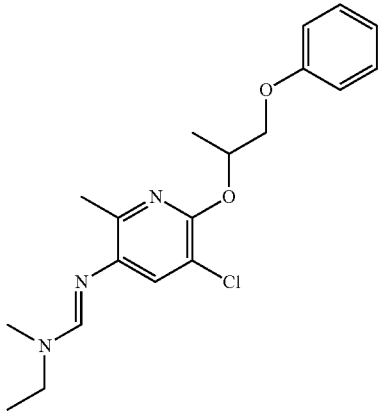 N'-[5-chloro-2-methyl-6-(1-methyl-2-phenoxy-ethoxy)-3-pyridyl]-N-ethyl-N-methyl-formamidine | Method 3 1.23 min.; 362 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: $R_t$ (min); MS-ESI (m/z; (M + H)$^+$); |
|---|---|---|
| 67.026 | 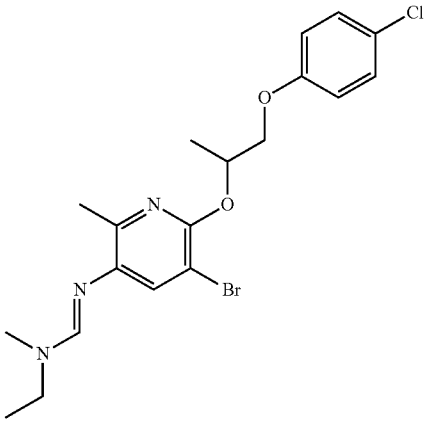  N'-[5-bromo-6-[2-(4-chlorophenoxy)-1-methyl-ethoxy]-2-methyl-3-pyridyl]-N-ethyl-N-methyl-formamidine | Method 3 1.37 min.; 440 |
| 67.027 | 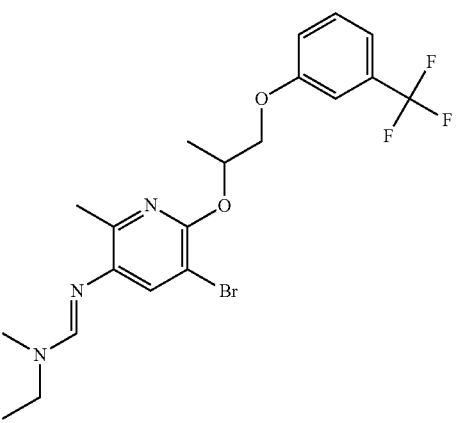  N'-[5-bromo-2-methyl-6-[1-methyl-2-[3-(trifluoromethyl)phenoxy]ethoxy]-3-pyridyl]-N-ethyl-N-methyl-formamidine | Method 3 1.42 min.; 474 |

TABLE 67-continued

This table gives analytical data for compounds of formula (I) prepared using techniques analogous to those above, as well as those described in WO 12/146125 (pp. 370-378) and further techniques known to the person skilled in the art, for example as found in WO 08/101682 (pp. 22-33).

| Compound No. | Structural formula | LC-Method: $R_t$ (min); MS-ESI (m/z; (M + H)$^+$); |
|---|---|---|
| 67.028 | 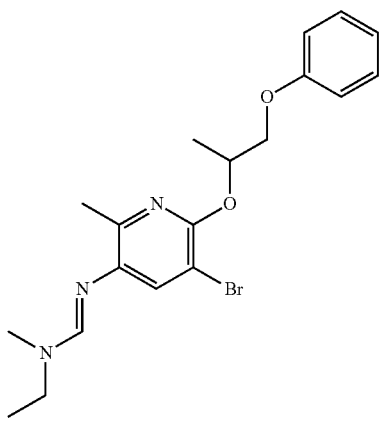<br>N'-[5-bromo-2-methyl-6-(1-methyl-2-phenoxy-ethoxy)-3-pyridyl]-N-ethyl-N-methyl-formamidine | Method 3<br>1.25 min.;<br>406 |
| 67.029 | 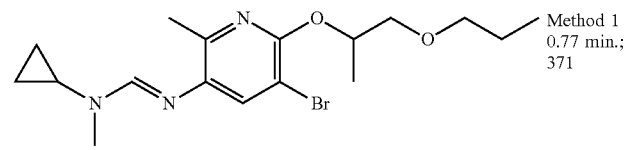<br>N'-[5-bromo-2-methyl-6-(1-methyl-2-propoxy-ethoxy)-3-pyridyl]-N-cyclopropyl-N-methyl-formamidine | Method 1<br>0.77 min.;<br>371 |
| 67.030 | 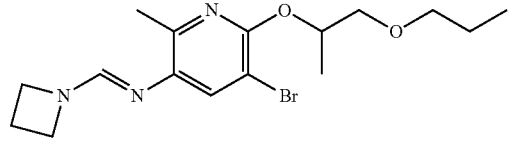<br>1-(azetidin-1-yl)-N-[5-bromo-2-methyl-6-(1-methyl-2-propoxy-ethoxy)-3-pyridyl]methanimine | Method 1<br>0.76 min.;<br>385 |

Analytical Methods Used

Method 1: Mass spectra were recorded on a Mass Spectrometer from Waters (SQD or ZQ Single quadrupole mass spectrometer) equipped with an electrospray source (Polarity: positive or negative ions, Capillary: 3.00 kV, Cone range: 30-60 V, Extractor: 2.00 V, Source Temperature: 150° C., Desolvation Temperature: 350° C., Cone Gas Flow: 0 L/Hr, Desolvation Gas Flow: 650 L/Hr, Mass range: 100 to 900 Da) and an Acquity UPLC from Waters: Binary pump, heated column compartment and diode-array detector. Solvent degasser, binary pump, heated column compartment and diode-array detector. Column: Waters UPLC HSS T3, 1.8 m, 30×2.1 mm, Temp: 60° C., DAD Wavelength range (nm): 210 to 500, Solvent Gradient: A=water+5% MeOH+ 0.05% HCOOH, B=Acetonitrile+0.05% HCOOH. Gradient: 0 min 0% B, 100% A; 1.2-1.5 min 100% B: Flow (ml/min) 0.85.

Method 2: Mass spectra were recorded on a Mass Spectrometer from Shimadzu (SQD or ZQ Single quadrupole mass spectrometer) equipped with an electrospray source (Polarity: positive or negative ions, Capillary: 1.5 kV, Cone range: unknown, Extractor: 5.00 V, Source Temperature: 200° C., Desolvation Temperature: 250° C., Cone Gas Flow: 90 L/Hr, Desolvation Gas Flow: 90 L/Hr, Mass range: 50 to 900 Da) and an SPD-20A from LC from Shimadzu: Solvent degasser, binary pump, heated column compartment and ultraviolet detector. Column: Diamonsil $C_{18}$ (2) 5u 150*4.6 mm, Temp: 40° C., SPD-20A Wavelength range (nm): 210 to 500, Solvent Gradient: A=water+0.1% F$_3$CCOOH, B=Acetonitrile+0.1% F$_3$CCOOH; Gradient: 0 min 10% B, 90% A; 15 min 100% B; Flow 1.00 (ml/min)

Method 3: Mass spectra were recorded on a ZQ2000 Mass Spectrometer from Waters (Single quadrupole mass spectrometer) equipped with an electrospray source (Polarity:

positive ions, Capillary (kV) 3.5, Cone (V) 60.00, Extractor (V) 3.00, Source Temperature (° C.) 150, Desolvation Temperature (° C.) 350, Cone Gas Flow (L/Hr) 50, Desolvation Gas Flow (L/Hr) 800, Mass range: 140 to 800 Da) DAD Wavelength range (nm): 210 to 400, Type of column: Waters ACQUITY UPLC HSS T3; Column length: 30 mm; Internal diameter of column: 2.1 mm; Particle Size: 1.8 micron; Temperature: 60° C. Solvent Gradient: A=water+10% MeOH+0.1% HCOOH, B=Acetonitrile+0.1% HCOOH. Gradient: 0 min 0% B, 100% A; 2.5-2.8 min 100% B; 0% A; 3.0 min 100% A, 0% B: Flow (ml/min) 0.85.

Biological Examples for Compounds of Formula (I)

Certain compositions of the invention can be distinguished from known compositions and compounds by virtue of displaying a greater efficacy at low application rates, which can be verified by the person skilled in the art using the experimental procedures outlined in the Examples, using lower application rates if necessary, for example 50 ppm, 12.5 ppm, 6 ppm, 3 ppm, 1.5 ppm, 0.8 ppm and/or 0.2 ppm. The use of "concentration/dilution factors" in biological testing to determine the intrinsic biological efficacy of bioactive molecules is known in the art.

*Blumeria graminis* f. Sp. *Tritici* (*Erysiphe qraminis* f. Sp. *Tritici*)/Wheat/Leaf Disc Preventative (Powdery Mildew on Wheat)

Wheat leaf segments cv. Kanzler were placed on agar in a multiwell plate (24-well format) and sprayed with the formulated test compound or mixture composition diluted in water. The leaf disks were inoculated by shaking powdery mildew infected plants above the test plates 1 day after application. The inoculated leaf disks were incubated at 20° C. and 60% rh under a light regime of 24 h darkness followed by 12 h light/12 h darkness in a climate chamber and the activity of a compound or mixture composition was assessed as percent disease control compared to untreated when an appropriate level of disease damage appears on untreated check leaf segments (6-8 days after application).

The following compounds gave at 200 ppm give at least 80% disease control in this test when compared to untreated control leaf disks under the same conditions, which show extensive disease development:

67.002, 67.003, 67.007, 67.008, 67.009, 67.010, 67.011, 67.013, 67.014, 67.015, 67.016, 67.017, 67.018, 67.020, 67.021, 67.022, 67.023, 67.024, 67.025, 67.026, 67.027, 67.028, 67.029, 67.030.

*Puccinia recondita* f. sp. *tritici*/wheat/leaf disc preventative (brown rust)

Wheat leaf segments cv. Kanzler were placed on agar in multiwell plates (24-well format) and sprayed with the formulated test compound or mixture composition diluted in water. The leaf disks were inoculated with a spore suspension of the fungus 1 day after application. The inoculated leaf segments were incubated at 19° C. and 75% rh under a light regime of 12 h light/12 h darkness in a climate cabinet and the activity of a compound or mixture composition was assessed as percent disease control compared to untreated when an appropriate level of disease damage appears in untreated check leaf segments (7-9 days after application).

The following compounds gave at 200 ppm gave at least 80% disease control in this test when compared to untreated control leaf disks under the same conditions, which show extensive disease development:

67.002, 67.003, 67.007, 67.008, 67.009, 67.010, 67.011, 67.013, 67.014, 67.015, 67.016, 67.017, 67.018, 67.020, 67.021, 67.022, 67.023, 67.024, 67.025, 67.026, 67.028, 67.029, 67.030.

*Puccinia recondita* f. Sp. *Tritici*/Wheat/Leaf Disc Curative (Brown Rust)

Wheat leaf segments cv. Kanzler are placed on agar in multiwell plates (24-well format). The leaf segments are inoculated with a spore suspension of the fungus. Plates were stored in darkness at 19° C. and 75% rh. The formulated test compound or mixture composition diluted in water was applied 1 day after inoculation. The leaf segments were incubated at 19° C. and 75% rh under a light regime of 12 h light/12 h darkness in a climate cabinet and the activity of a compound or mixture composition was assessed as percent disease control compared to untreated when an appropriate level of disease damage appears in untreated check leaf segments (6-8 days after application).

The following compounds gave at 200 ppm gave at least 80% disease control in this test when compared to untreated control leaf disks under the same conditions, which show extensive disease development:

67.002, 67.003, 67.007, 67.008, 67.009, 67.010, 67.011, 67.012, 67.013, 67.014, 67.015, 67.016, 67.017, 67.018, 67.019, 67.020, 67.021, 67.022, 67.023, 67.024, 67.025, 67.026, 67.027, 67.028, 67.029, 67.030.

*Phakopsora pachyrhizi* on Soybean, Preventive Treatment

The compound or mixture composition activity was tested under 1 day preventive conditions. Soybean plants with a fully enfolded first trifoliate leaf were sprayed with a track sprayer and 50 l/ha spray volume with the test compounds or mixture composition, either solo or in tankmix as shown in the table below.

1 day after application leaf discs were cut from the first trifoliate leaf and placed in multiwell plates on water-agar. 5 leaf discs per treatment where infested with spores of a triazole tolerant soybean rust strain. The multiwell plates where sealed and placed in an incubator 48 h in darkness and 12 h light/dark cycle afterwards. Rust infestation on leaf discs was evaluated visually 11 days after application and average activity calculated in relation to disease severity on untreated check leaf discs.

The following compounds gave at 200 ppm gave at least 80% disease control in this test when compared to untreated control leaf disks under the same conditions, which show extensive disease development:

67.002, 67.003, 67.007, 67.008, 67.009, 67.010, 67.011, 67.012, 67.013, 67.014, 67.015, 67.016, 67.017, 67.018, 67.019 67.020, 67.023, 67.024, 67.025, 67.026, 67.027, 67.028, 67.029, 67.030.

Further Biological Test Examples:

Example B1

Preventative Activity Against Blumeria *Graminis* f. Sp. *Tritici* (*Erysiphe Graminis* f. Sp. *Tritici*) on Wheat Wheat leaf segments cv. Kanzler are placed on agar in a multiwell plate (24-well format) and sprayed with the formulated test compound or mixture composition diluted in water. The leaf disks are inoculated by shaking powdery mildew infected plants above the test plates 1 day after application. The inoculated leaf disks are incubated at 20° C. and 60% rh under a light regime of 24 h darkness followed by 12 h light/12 h darkness in a climate chamber and the activity of a compound or mixture composition is assessed as percent disease control compared to untreated when an appropriate level of disease damage appears on untreated check leaf segments (6-8 days after application).

Example B2

Activity Against *Mycosphaerella arachidis* (*Cercospora arachidicola*)

Conidia of the fungus from cryogenic storage are directly mixed into nutrient broth (PDB potato dextrose broth). After placing a (DMSO) solution of test compound or mixture composition into a microtiter plate (96-well format), the nutrient broth containing the fungal spores is added. The test plates are incubated at 24° C. and the inhibition of growth is determined photometrically 4-5 days after application.

Example B3

Preventative Activity Against *Phakopsora pachyrhizi* on Soybean

Soybean leaf disks are placed on water agar in multiwell plates (24-well format) and sprayed with the formulated test compound or mixture composition diluted in water. One day after application leaf discs are inoculated by spraying a spore suspension on the lower leaf surface. After an incubation period in a climate cabinet of 24-36 hours in darkness at 20° C. and 75% rh leaf disc are kept at 20° C. with 12 h light/day and 75% rh. The activity of a compound or mixture composition is assessed as percent disease control compared to untreated when an appropriate level of disease damage appears in untreated check leaf disks (10-12 days after application).

The following mixture compositions (A: B) at the reported concentration (in ppm) gave at least 80% disease control in this test when compared to untreated control leaf disks under the same conditions, which show extensive disease development:

| Component A | Component B | Ratio A:B | Conc. (ppm) (A:B) |
|---|---|---|---|
| N'-[5-bromo-2-methyl-6-(1-methyl-2-propoxy-ethoxy)-3-pyridyl]-N-ethyl-N-methyl-formamidine (Compound 67.013) | Azoxystrobin | 1:1 | 66:66 |
| Compound 67.013 | Azoxystrobin | 1:1 | 22:22 |
| Compound 67.013 | Azoxystrobin | 1:1 | 7.3:7.3 |
| Compound 67.013 | Azoxystrobin | 1:3 | 66:200 |
| Compound 67.013 | Azoxystrobin | 1:3 | 22:66 |
| Compound 67.013 | Azoxystrobin | 3:1 | 200:66 |
| Compound 67.013 | Azoxystrobin | 3:1 | 66:22 |
| Compound 67.013 | Azoxystrobin | 3:1 | 22:7.33 |
| Compound 67.013 | Azoxystrobin | 3:1 | 7.3:2.44 |
| Compound 67.013 | Azoxystrobin | 3:1 | 2.44:0.8 |
| Compound 67.013 | Azoxystrobin | 3:1 | 0.8:0.27 |
| Compound 67.013 | Trifloxystrobin | 1:1 | 66:66 |
| Compound 67.013 | Trifloxystrobin | 1:1 | 22:22 |
| Compound 67.013 | Trifloxystrobin | 1:3 | 66:200 |
| Compound 67.013 | Trifloxystrobin | 1:3 | 22:66 |
| Compound 67.013 | Trifloxystrobin | 1:3 | 7.33:22 |
| Compound 67.013 | Trifloxystrobin | 3:1 | 200:66 |
| Compound 67.013 | Trifloxystrobin | 3:1 | 66:22 |
| Compound 67.013 | Trifloxystrobin | 3:1 | 22:7.33 |
| Compound 67.013 | Trifloxystrobin | 3:1 | 7.3:2.44 |
| Compound 67.013 | Trifloxystrobin | 3:1 | 2.44:0.8 |
| Compound 67.013 | Cyproconazole | 1:1 | 66:66 |
| Compound 67.013 | Cyproconazole | 1:3 | 66:200 |
| Compound 67.013 | Cyproconazole | 3:1 | 200:66 |
| Compound 67.013 | Cyproconazole | 3:1 | 66:22 |
| Compound 67.013 | Cyproconazole | 3:1 | 22:7.33 |
| Compound 67.013 | Cyproconazole | 3:1 | 7.3:2.44 |
| Compound 67.013 | Cyproconazole | 3:1 | 2.44:0.8 |
| Compound 67.013 | Difenoconazole | 1:1 | 66:66 |
| Compound 67.013 | Difenoconazole | 1:1 | 22:22 |
| Compound 67.013 | Difenoconazole | 1:3 | 66:200 |
| Compound 67.013 | Difenoconazole | 1:3 | 22:66 |
| Compound 67.013 | Difenoconazole | 3:1 | 200:66 |
| Compound 67.013 | Difenoconazole | 3:1 | 66:22 |
| Compound 67.013 | Difenoconazole | 3:1 | 22:7.33 |
| Compound 67.013 | Difenoconazole | 3:1 | 7.3:2.44 |
| Compound 67.013 | Prothioconazole | 1:1 | 66:66 |

-continued

| Component A | Component B | Ratio A:B | Conc. (ppm) (A:B) |
|---|---|---|---|
| Compound 67.013 | Prothioconazole | 1:1 | 22:22 |
| Compound 67.013 | Prothioconazole | 1:3 | 66:200 |
| Compound 67.013 | Prothioconazole | 1:3 | 22:66 |
| Compound 67.013 | Prothioconazole | 1:3 | 7.33:22 |
| Compound 67.013 | Prothioconazole | 3:1 | 200:66 |
| Compound 67.013 | Prothioconazole | 3:1 | 66:22 |
| Compound 67.013 | Prothioconazole | 3:1 | 22:7.33 |
| Compound 67.013 | Prothioconazole | 3:1 | 7.3:2.44 |
| Compound 67.013 | Mefentrifluconazole | 1:1 | 66:66 |
| Compound 67.013 | Mefentrifluconazole | 1:3 | 66:200 |
| Compound 67.013 | Mefentrifluconazole | 1:3 | 22:66 |
| Compound 67.013 | Mefentrifluconazole | 3:1 | 200:66 |
| Compound 67.013 | Mefentrifluconazole | 3:1 | 66:22 |
| Compound 67.013 | Mefentrifluconazole | 3:1 | 22:7.33 |
| Compound 67.013 | Mefentrifluconazole | 3:1 | 7.3:2.44 |
| Compound 67.013 | Bixafen | 1:1 | 66:66 |
| Compound 67.013 | Bixafen | 1:1 | 22:22 |
| Compound 67.013 | Bixafen | 1:3 | 66:200 |
| Compound 67.013 | Bixafen | 1:3 | 22:66 |
| Compound 67.013 | Bixafen | 1:3 | 7.33:22 |
| Compound 67.013 | Bixafen | 3:1 | 200:66 |
| Compound 67.013 | Bixafen | 3:1 | 66:22 |
| Compound 67.013 | Bixafen | 3:1 | 22:7.33 |
| Compound 67.013 | Bixafen | 3:1 | 7.3:2.44 |
| Compound 67.013 | Fluxapyroxad | 3:1 | 66:22 |
| Compound 67.013 | Fluxapyroxad | 3:1 | 22:7.3 |
| Compound 67.013 | Fluxapyroxad | 1:1 | 66:66 |
| Compound 67.013 | Fluxapyroxad | 1:1 | 22:22 |
| Compound 67.013 | Fluxapyroxad | 9:1 | 200:22 |
| Compound 67.013 | Fluxapyroxad | 9:1 | 66:7.33 |
| Compound 67.013 | Isopyrazam | 9:1 | 66:7.3 |
| Compound 67.013 | Isopyrazam | 3:1 | 66:22 |
| Compound 67.013 | Isopyrazam | 3:1 | 22:7.3 |
| Compound 67.013 | Isopyrazam | 55:2 | 200:7.33 |
| Compound 67.013 | Isopyrazam | 55:2 | 66:2.44 |
| Compound 67.013 | Isopyrazam | 55:2 | 22:0.8 |
| Compound 67.013 | Isopyrazam | 55:2 | 7.3:0.27 |
| Compound 67.013 | Sedaxane | 9:1 | 66:7.3 |
| Compound 67.013 | Sedaxane | 3:1 | 66:22 |
| Compound 67.013 | Sedaxane | 55:2 | 200:7.33 |
| Compound 67.013 | Sedaxane | 55:2 | 66:2.44 |
| Compound 67.013 | Sedaxane | 55:2 | 22:0.8 |
| Compound 67.013 | Sedaxane | 55:2 | 7.3:0.27 |
| Compound 67.013 | Benzovindifupyr | 9:1 | 66:7.3 |
| Compound 67.013 | Benzovindifupyr | 9:1 | 22:2.44 |
| Compound 67.013 | Benzovindifupyr | 9:1 | 7.3:0.8 |
| Compound 67.013 | Benzovindifupyr | 3:1 | 66:22 |
| Compound 67.013 | Benzovindifupyr | 3:1 | 22:7.3 |
| Compound 67.013 | Benzovindifupyr | 3:1 | 7.33:2.44 |
| Compound 67.013 | Benzovindifupyr | 3:1 | 2.44:0.8 |
| Compound 67.013 | Benzovindifupyr | 55:2 | 200:7.33 |
| Compound 67.013 | Benzovindifupyr | 55:2 | 66:2.44 |
| Compound 67.013 | Benzovindifupyr | 55:2 | 22:0.8 |
| Compound 67.013 | Benzovindifupyr | 55:2 | 7.3:0.27 |
| Compound 67.013 | 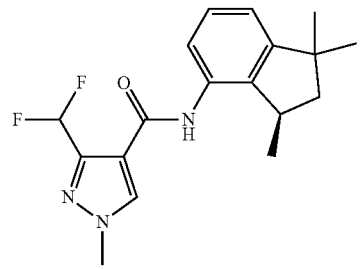 [SMILES: C[C@@H]1CC(C)(C)c2cccc(NC(=O)c3cn(C)nc3C(F)F)c21] | 9:1 | 66:7.3 |

-continued

| Component A | Component B | Ratio A:B | Conc. (ppm) (A:B) |
|---|---|---|---|
| Compound 67.013 | *[structure]* | 9:1 | 22:2.44 |
| Compound 67.013 | *[structure]* | 3:1 | 66:22 |
| Compound 67.013 | *[structure]* | 3:1 | 22:7.3 |
| Compound 67.013 | *[structure]* | 3:1 | 7.33:2.44 |
| Compound 67.013 | *[structure]* | 55:2 | 200:7.33 |

-continued
| Component A | Component B | Ratio A:B | Conc. (ppm) (A:B) |
|---|---|---|---|
| Compound 67.013 | 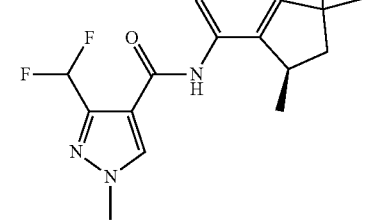 | 55:2 | 66:2.44 |
| Compound 67.013 | 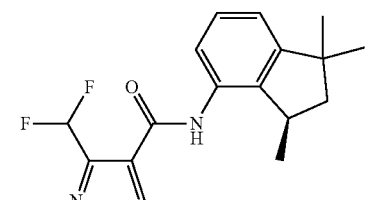 | 55:2 | 22:0.8 |
| Compound 67.013 |  | 55:2 | 7.3:0.27 |
| Compound 67.013 | 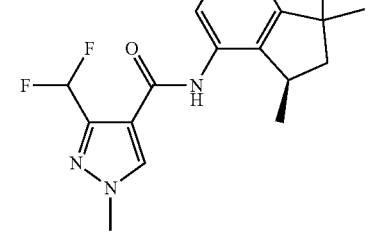<br>Fuindapyr | 3:1 | 22:7.3 |
| Compound 67.013 | Fuindapyr | 1:1 | 66:66 |
| Compound 67.013 | Fuindapyr | 1:1 | 22:22 |
| Compound 67.013 | Fuindapyr | 1:1 | 7.3:7.3 |
| Compound 67.013 | Fuindapyr | 9:1 | 200:22 |
| Compound 67.013 | Fuindapyr | 9:1 | 66:7.33 |
| Compound 67.013 | Fuindapyr | 9:1 | 22:2.44 |
| Compound 67.013 | Fuindapyr | 9:1 | 7.3:0.8 |

| Component A | Component B | Ratio A:B | Conc. (ppm) (A:B) |
|---|---|---|---|
| Compound 67.013 | 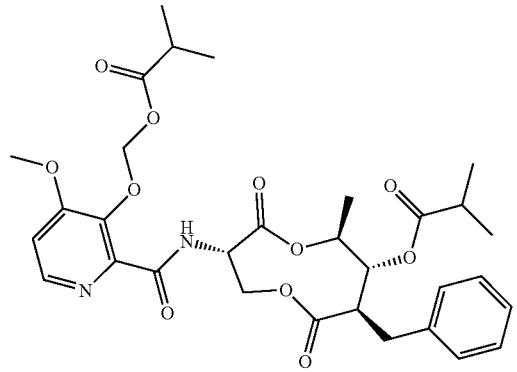UK-2A procide | 3:1 | 66:22 |
| Compound 67.013 | UK-2A procide | 3:1 | 22:7.3 |
| Compound 67.013 | UK-2A procide | 1:1 | 66:66 |
| Compound 67.013 | UK-2A procide | 1:1 | 22:22 |
| Compound 67.013 | UK-2A procide | 1:1 | 7.3:7.3 |
| Compound 67.013 | UK-2A procide | 9:1 | 200:22 |
| Compound 67.013 | UK-2A procide | 9:1 | 66:7.33 |
| Compound 67.013 | UK-2A procide | 9:1 | 22:2.44 |
| Compound 67.013 | UK-2A procide | 9:1 | 7.3:0.8 |
| Compound 67.013 | Chlorothalonil | 1:1 | 66:66 |
| Compound 67.013 | Chlorothalonil | 1:3 | 66:200 |
| Compound 67.013 | Chlorothalonil | 3:1 | 200:66 |
| Compound 67.013 | Chlorothalonil | 3:1 | 66:22 |
| Compound 67.013 | Chlorothalonil | 3:1 | 22:7.33 |
| Compound 67.013 | Chlorothalonil | 3:1 | 7.3:2.44 |
| Compound 67.013 | Chlorothalonil | 3:1 | 2.44:0.8 |
| Compound 67.013 | Mancozeb | 1:1 | 66:66 |
| Compound 67.013 | Mancozeb | 1:3 | 66:200 |
| Compound 67.013 | Mancozeb | 3:1 | 200:66 |
| Compound 67.013 | Mancozeb | 3:1 | 66:22 |
| Compound 67.013 | Mancozeb | 3:1 | 22:7.33 |
| Compound 67.013 | Mancozeb | 3:1 | 7.3:2.44 |

Example B4

Preventative Activity Against *Phakopsora pachyrhizi* on Soybean 4-week old soybean plants are sprayed in a spray chamber with the formulated test compound or mixture composition diluted in water. Leaf disks are cut from treated plants and placed on agar into 24-well plates one day after application. Leaf disks are inoculated by spraying them with a spore suspension on their lower leaf surface. After an incubation period in a climate cabinet of 24-36 hours in darkness at 20° C. and 75% rh, the leaf disks are then kept at 20° C. with 12 h light/day and 75% rh. The percentage leaf disk area covered by disease is assessed when an appropriate level of disease appears on untreated check plants (12-14 days after application).

Example B5

Preventative Activity Against *Puccinia recondita* on Wheat

Wheat leaf segments cv. Kanzler are placed on agar in multiwell plates (24-well format) and sprayed with the formulated test compound or mixture composition diluted in water. The leaf disks are inoculated with a spore suspension of the fungus 1 day after application. The inoculated leaf segments are incubated at 19° C. and 75% rh under a light regime of 12 h light/12 h darkness in a climate cabinet and the activity of a compound or mixture composition is assessed as percent disease control compared to untreated when an appropriate level of disease damage appears in untreated check leaf segments (7-9 days after application).

Examples B6

Preventative Activity Against *Pyrenophora teres* on Barley

Barley leaf segments cv. Hasso are placed on agar in a multiwell plate (24-well format) and sprayed with the formulated test compound or mixture composition diluted in water. The leaf segments are inoculated with a spore suspension of the fungus 2 days after application. The inoculated leaf segments are incubated at 20° C. and 65% rh under a light regime of 12 h light/12 h darkness in a climate cabinet and the activity of a compound or mixture composition is assessed as disease control compared to untreated when an appropriate level of disease damage appears in untreated check leaf segments (5-7 days after application).

Example B7

Activity Against *Thanatephorus cucumeris*
(*Rhizoctonia solani*)

Mycelia fragments of a newly grown liquid culture of the fungus are directly mixed into nutrient broth (PDB potato dextrose broth). After placing a (DMSO) solution of the test compound or mixture composition into a microtiter plate (96-well format), the nutrient broth containing the fungal material is added. The test plates are incubated at 24° C. and the inhibition of growth is determined photometrically 3-4 days after application.

The invention claimed is:

1. A fungicidal composition comprising a mixture of components (A) and (B), wherein component (A) is a compound of formula (I)

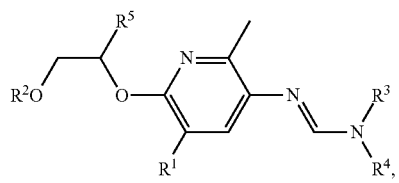

(I)

wherein
- $R^1$ represents hydrogen, chloro, bromo, cyano, $C_1$-$C_2$ alkyl, $CO_2(C_1$-$C_2$ alkyl), $CO_2H$, $CONH_2$, $CONH(C_1$-$C_4$ alkyl), $CON(C_1$-$C_4$ alkyl)$_2$, $C_1$-$C_4$ haloalkyl, or $C_1$-$C_4$ haloalkoxy;
- $R^2$ represents $C_3$-$C_6$alkyl, $C_3$-$C_6$alkenyl;
- $R^3$ and $R^4$ independently of each other represent hydrogen, methyl, ethyl, isopropyl or cyclopropyl; or $R^3$ and $R^4$ together with the nitrogen atom to which they are attached form a 3-, 4- or 5-membered saturated cyclic group;
- $R^5$ represents $C_1$-$C_3$ alkyl, or $C_1$-$C_2$ alkoxy$C_1$-$C_2$ alkyl;

or a salt, enantiomer, tautomer or N-oxide thereof;

and component (B) is a compound selected from the group consisting of
- (B1) a strobilurin fungicide selected from the group consisting of azoxystrobin, picoxystrobin, enoxastrobin, pyraoxystrobin, mandestrobin, flufenoxystrobin, coumoxystrobin, orysastrobin, dimoxystrobin, metominostrobin, fenaminostrobin, pyrametostrobin, triclopyricarb, kresoxim-methyl, fluoxastrobin, pyribencarb, pyraclostrobin and trifloxystrobin;
- (B2) an azole fungicide selected from the group consisting of azaconazole, etaconazole, ipconazole, tebuconazole, bitertanol, fenbucoanzole, metconazole, tetraconazole, bromucoanzole, fluquinconazole, myclobutanil, triadimefon, flusilazole, penconazole, triadimenol, triticonazole, simeconazole, imibenconazole, hexaconazole, flutriafol, diniconazole, cyproconazole, difenoconazole, epoxiconazole, propiconazole, prothioconazole, pyrifenox, nuarimol, fenarimol, imizalil, triflumizole, prochloraz, pefurazoate, oxpoconazole, Mefentrifluconazole, 2-[[3-(2-chlorophenyl)-2-(2,4-difluorophenyl)oxiran-2-yl]methyl]-4H-1,2,4-triazole-3-thione and 2-[2-chloro-4-(4-chlorophenoxy)phenyl]-1-(1,2,4-triazol-1-yl)propan-2-ol;
- (B3) a morpholine fungicide selected from aldimorph, dodemorph, fenpropimorph and tridemorph;
- (B4) a carboxamide fungicide selected from bixafen, fluopyram, fluxapyroxad, isopyrazam, sedaxane, furametpyr, penflufen, penthiopyrad, benzovindiflupyr, thifluzamide, isofetamid, boscalid, carboxin, oxycarboxin, fenfuram, flutolanil, pyraziflumid, pydiflumetofen, mepronil, benodanil, N-[(5-chloro-2-isopropyl-phenyl)methyl]-N-cyclopropyl-3-(difluoromethyl)-5-fluoro-1-methyl-pyrazole-4-carboxamide, 3-(difluoromethyl)-N-(7-fluoro-1,1,3-trimethyl-indan-4-yl)-1-methyl-pyrazole-4-carboxamide, 3-(difluoromethyl)-1-methyl-N-(1,1,3-trimethylindan-4-yl)pyrazole-4-carboxamide and (R)-3-(difluoromethyl)-1-methyl-N-(1,1,3-trimethylindan-4-yl)pyrazole-4-carboxamide;
- (B5) an anilinopyrimidine fungicide selected from cyprodinil, mepanipyrim and pyrimethanil;
- (B6) an phenylpyrrole fungicide selected from fludioxonil and fenpiclonil;
- (B7) a phenylamide fungicide selected from benalaxyl, benalaxyl-M, furalaxyl, mefenoxam (metalaxyl-M) and metalaxyl, ofurace and oxadixyl;
- (B8) a fungicide selected from the group consisting of ametoctradin, amisulbrom, anilazine, aureofungin, benomyl, benthiavalicarb, benthiazole, bethoxazin, BLAD, blasticidin-S, Bordeaux mixture, bupirimate, calcium polysulfide, captafol, captan, carbaryl, carbendazim, carpropamid, chinomethionate, chitosan, chlobenthiazone, chlorfenazole, chloroneb, chlorothalonil, chlozolinate, climbazole, copper acetate, copper carbonate, copper hydroxide, copper naphthenate, copper oleate, copper oxychloride, copper oxyquinolate, copper silicate, copper sulphate, copper tallate, cuprous oxide, cyazofamid, cyclafuramid, cyflufenamid, cymoxanil, dazomet, dichlofluanid, dichlorprop, diclocymet, diclomezine, dicloran, diethofencarb, diflumetorim, dimetachlone, dimethipin, dimethirimol, dimethomorph, dinocap, dinocton, dinobuton, dinopenton, dipymetitrone, ditalimfos, dithianon, dodicin, dodine, doguadin, edifenphos, etem, ethaboxam, ethirimol, ethoxyquin, etridiazole, famoxadone, fenamidone, fenarimol, fenhexamid, fenoxanil, fenpropidine, fenpyrazamine, fentin acetate, fentin hydroxide, ferbam, ferimzone, fluazinam, flumorph, fluopicolide, fluoroimide, flusulfamide, flutianil, folpet, fosetyl-Al, fuberidazole, gibberellic acid, guazatine, hymexazole, iminoctadine, iodocarb, iprobenfos, iprodione, iprovalicarb, isoprothiolane, kasugamycin, mancozeb, mandipropamid, maneb, metam, meptyldinocap, metiram, metrafenone, nabam, oxathiapiprolin, paclobutrazol, pencycuron, phenamacril, phosdiphen, phthalide, picarbutrazox, polyoxin D, probenazole, procymidone, prohexadione, propamocarb, propineb, proquinazid, pyrazophos, pyrifenox, pyrimorph, pyriofenone, pyroquilon, quinoxyfen, quintozene, silthiofam, spiroxamine, streptomycin, sulphur, tebufloquin, tecloftalam, tecnazene, thiabendazole, thidiazuron, thicyofen, thiophanate-methyl, thiram, tioxymid, tolclofos-methyl, tolprocarb, tolylfluanid, triazoxide, tribufos, tricyclazole, triforine, validamycin, valifenalate, vapam, vinclozolin, zineb, ziram, zoxamide, [2-[3-[2-[1-[2-[3,5-bis(difluoromethyl)pyrazol-1-yl]acetyl]-4-piperidyl]thiazol-4-yl]-4,5-dihydroisoxazol-5-yl]-3-chlorophenyl] methanesulfonate, but-3-ynyl N-[6-[[(Z)-[(1-methyltetrazol-5-yl)-phenyl-methylene]amino]oxymethyl]-2-pyridyl]carbamate, N'-[4-(4,5-dichlorothiazol-2-yl)oxy-2,5-dimethyl-phenyl]-N-ethyl-N-methyl-formamidine, 4-(2-bromo-4-fluorophenyl)-N-(2-chloro-6-fluoro-phenyl)-2,5-dimethyl-pyrazol-3-amine, 2-[2-fluoro-6-[(8-fluoro-2-methyl-3-quinolyl)oxy]phenyl]propan-2-ol, 4,4,5-trifluoro-3,3-dimethyl-1-(3-quinolyl)isoquinoline, 3-chloro-6-methyl-5-phenyl-4-(2,4,6-trifluorophenyl)pyridazine, 3-chloro-4-(2,6-difluorophenyl)-6-methyl-5-phenyl-pyridazine, 2-(difluoromethyl)-N-(1,1,3-trimethylindan-4-yl)pyridine-3-carboxamide, 2-(difluoromethyl)-N-(3-ethyl-1,1-dimethyl-indan-4-yl)pyridine-3-carboxamide, 2-(difluoromethyl)-N-(1,1-dimethyl-3-propyl-indan-4-yl)pyridine-3-carboxamide, 2-(difluoromethyl)-N-(3-isobutyl-1,1-dimethyl-indan-4-yl)pyridine-3-carboxamide, 2-(difluoromethyl)-N-[(3R)-1,1,3-trimethylindan-4-yl]pyridine-3-carboxamide, 2-(difluoromethyl)-N-[(3R)-3-ethyl-1,1-dimethyl-indan-4-yl]pyridine-3-carboxamide, 2-(difluoromethyl)-N-[(3R)-1,1-dimethyl-3-propyl-indan-4-yl]pyridine-3-carboxamide, a compound of the formula

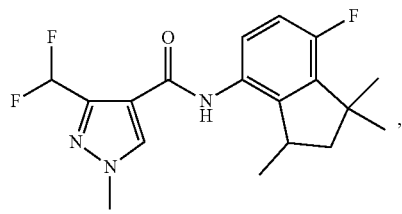 [SMILES: CC1CC(C)(C)c2c(F)ccc(NC(=O)c3cn(C)nc3C(F)F)c21]

a compound of the formula

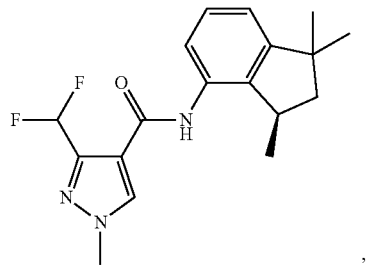 [SMILES: C[C@@H]1CC(C)(C)c2cccc(NC(=O)c3cn(C)nc3C(F)F)c21]

and a compound of the formula:

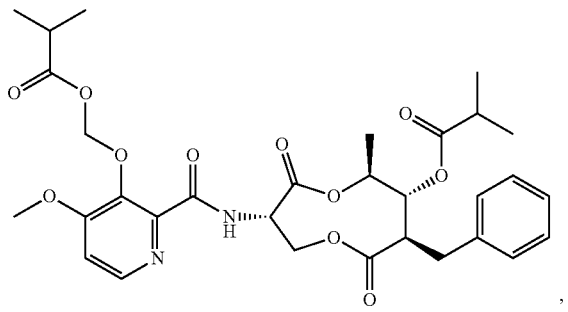 [SMILES: COc1ccnc(C(=O)N[C@H]2COC(=O)[C@H](Cc3ccccc3)[C@@H](OC(=O)C(C)C)[C@H](C)OC2=O)c1OCOC(=O)C(C)C]

(B9) a plant-bioregulator selected from the group consisting of acibenzolar-S-methyl, chlormequat chloride, ethephon, isotianil, mepiquat chloride, tiadinil and trinexapac-ethyl;

(B10) an insecticide selected from the group consisting of abamectin, acequinocyl, acetamiprid, acrinathrin, afidopyropen, alanycarb, allethrin, alpha-cypermethrin, alphamethrin, amidoflumet, azadirachtin, azocyclotin, *bacillus firmus, bacillus thuringiensis*, bensultap, benzoximate, betacyfluthrin, bifenazate, binapacryl, bioallethrin, bioresmethrin, biphenthrin, broflanilide, broflu-thrinate, bromophos-ethyl, buprofezine, cadusafos, carbaryl, carbosulfan, cartap, chlorantraniliprole, chlorfenapyr, chromafenozide, cloethocarb, clothianidin, cyantraniliprole, cyclaniliprole, cycloprothrin, cycloxaprid, cyenopyrafen, cyflumetofen, cyfluthrin, cyhalothrin, cypermethrin, cyphenothrin, cyromazine, deltamethrin, demeton-s-methyl, diafenthiuron, dialifos, dichloromezotiaz, diflovidazine, diflubenzuron, dinactin, dinocap, dinotefuran, d-limonene, emamectin, empenthrin, esfenvalerate, ethion, ethiprole, etofenprox, etoxazole, famphur, fenazaquin, fenfluthrin, fenobucarb, fenoxycarb, fenpropathrin, fenpyroxymate, fenvalerate, fipronil, flometoquin, flonicamid, fluacrypyrim, fluazuron, flubendiamide, flucythrinate, fluensulfone, flufenerim, flufenprox, flufiprole, fluhexafon, flumethrin, flupyradifuron, fluvalinate, fosthiazate, gamma-cyhalothrin, gossyplure, guadipyr, halofenozide, halofenprox, harpin, hexythiazox, hydramethylnon, imicyafos, imidacloprid, imiprothrin, indoxacarb, iodomethane, isothioate, ivermectin, lambda-cyhalothrin, lepimectin, lufenuron, metaflumizone, metaldehyde, methomyl, methoxyfenozide, metofluthrin, milbemectin, niclosamide, nitenpyram, oxamyl, parathion-ethyl, pasteuria nishizawae, p-cymene, permethrin, phenothrin, phosphocarb, piperonylbutoxide, pirimicarb, pirimiphos-ethyl, polyhedrosis virus, prallethrin, profenofos, profenofos, propargite, propetamphos, protrifenbute, pyflubumide, pymetrozine, pyraclofos, pyrafluprole, pyrethrum, pyridaben, pyridalyl, pyrifluquinazon, pyrimidifen, pyriprole, pyriproxyfen, selamectin, silafluofen, spinetoram, spinosad, spirodiclofen, spiromesifen, spirotetramat, sulfoxaflor, tebufenozide, tebufenpyrad, tefluthrin, terpenoid blends, terpenoids, tetradiphon, tetramethrin, tetranactin, tetraniliprole, theta-cypermethrin, thiacloprid, thiamethoxam, thiodicarb, tioxazafen, tolfenpyrad, transfluthrin, trichlorfon, triflumezopyrim, zeta-cypermethrin and α-terpinene; and (B11) glyphosate, wherein the weight ratio of component (A) to component (B) is from 30:1 to 1:40.

2. A fungicidal composition according to claim 1 wherein component (A) is a compound of formula (I) wherein $R^1$ is chloro, bromo, cyano, methyl or $C_1$ fluoroalkyl; $R^2$ is n-propyl, iso-propyl or allyl; $R^3$ is methyl; $R^4$ is ethyl or iso-propyl; and $R^5$ is methyl; or a salt, enantiomer, tautomer or N-oxide thereof.

3. A fungicidal composition according to either claim 1 wherein component (B) is a compound selected from the group consisting of azoxystrobin, picoxystrobin, pyraclostrobin, trifloxystrobin, cyproconazole, difenoconazole, epoxiconazole, metconazole, propiconazole, prothioconazole, mefentrifluconazole, bixafen, fluopyram, fluxapyroxad, isopyrazam, sedaxane, benzovindiflupyr, pydiflumetofen, acibenzolar-S-methyl, chlorothalonil, mancozeb, dithianon, a compound of the formula a compound of the formula

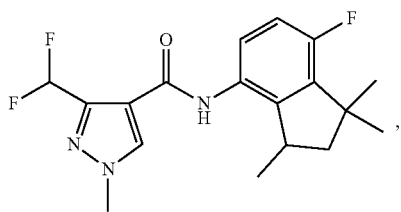 [SMILES: CC1CC(C)(C)c2c(F)ccc(NC(=O)c3cn(C)nc3C(F)F)c21]

and a compound of the formula

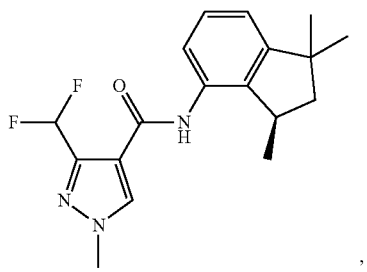

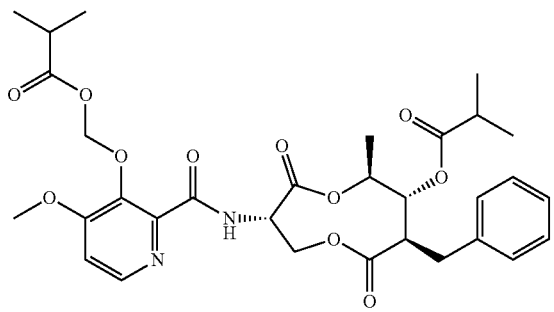

4. A fungicidal composition according to claim 1 wherein component (A) is a compound selected from N'-[5-bromo-2-methyl-6-[(1S)-1-methyl-2-propoxy-ethoxy]-3-pyridyl]-N-ethyl-N-methyl-formamidine (compound 67.002), N'-[5-bromo-2-methyl-6-[(1R)-1-methyl-2-propoxy-ethoxy]-3-pyridyl]-N-ethyl-N-methyl-formamidine (compound 67.003), N'-[5-cyano-2-methyl-6-(1-methyl-2-propoxy-ethoxy)-3-pyridyl]-N-ethyl-N-methyl-formamidine (compound 67.007), N'-[5-(difluoromethyl)-2-methyl-6-(1-methyl-2-propoxy-ethoxy)-3-pyridyl]-N-ethyl-N-methyl-formamidine (compound 67.009), N'-[2,5-dimethyl-6-(1-methyl-2-propoxy-ethoxy)-3-pyridyl]-N-ethyl-N-methyl-formamidine (compound 67.011), N'-[5-bromo-2-methyl-6-(1-methyl-2-propoxy-ethoxy)-3-pyridyl]-N-ethyl-N-methyl-formamidine (compound 67.013), N'-[6-(2-allyloxy-1-methyl-ethoxy)-5-chloro-2-methyl-3-pyridyl]-N-ethyl-N-methyl-formamidine (compound 67.014), N'-[5-chloro-2-methyl-6-(1-methyl-2-propoxy-ethoxy)-3-pyridyl]-N-ethyl-N-methyl-formamidine (compound 67.015), and N'-[5-bromo-2-methyl-6-(1-methyl-2-propoxy-ethoxy)-3-pyridyl]-N-isopropyl-N-methyl-formamidine (compound 67.018); or a salt, enantiomer, tautomer or N-oxide thereof.

5. A fungicidal composition according to claim 1 wherein component (A) is N'-[5-bromo-2-methyl-6-[(1S)-1-methyl-2-propoxy-ethoxy]-3-pyridyl]-N-ethyl-N-methyl-formamidine (compound 67.002); or a salt, enantiomer, tautomer or N-oxide thereof.

6. A fungicidal composition according to claim 1 wherein component (A) is N'-[5-bromo-2-methyl-6-[(1R)-1-methyl-2-propoxy-ethoxy]-3-pyridyl]-N-ethyl-N-methyl-formamidine (compound 67.003); or a salt, enantiomer, tautomer or N-oxide thereof.

7. A fungicidal composition according to claim 1 wherein component (A) is N'-[5-bromo-2-methyl-6-(1-methyl-2-propoxy-ethoxy)-3-pyridyl]-N-ethyl-N-methyl-formamidine (compound 67.013); or a salt, enantiomer, tautomer or N-oxide thereof.

8. A fungicidal composition according to claim 1 wherein component (A) is N'-[5-chloro-2-methyl-6-(1-methyl-2-propoxy-ethoxy)-3-pyridyl]-N-ethyl-N-methyl-formamidine (compound 67.015); or a salt, enantiomer, tautomer or N-oxide thereof.

9. A fungicidal composition according to claim 1 wherein component (A) is N'-[5-bromo-2-methyl-6-(1-methyl-2-propoxy-ethoxy)-3-pyridyl]-N-isopropyl-N-methyl-formamidine (compound 67.018); or a salt, enantiomer, tautomer or N-oxide thereof.

10. A fungicidal composition according to claim 1 wherein the composition comprises one or more further pesticides selected from the group consisting of:

a fungicide, selected from etridiazole, fluazinam, benalaxyl, benalaxyl-M (kiralaxyl), furalaxyl, metalaxyl, metalaxyl-M (mefenoxam), dodicin, N'-(2,5-Dimethyl-4-phenoxy-phenyl)-N-ethyl-N-methyl-formamidine, N'-[4-(4,5-Dichloro-thiazol-2-yloxy)-2,5-dimethyl-phenyl]-N-ethyl-N-methyl-formamidine, N'-[4-[[3-[(4-chlorophenyl)methyl]-1,2,4-thiadiazol-5-yl]oxy]-2,5-dimethyl-phenyl]-N-ethyl-N-methyl-formamidine, ethirimol, 3'-chloro-2-methoxy-N-[(3RS)-tetrahydro-2-oxofuran-3-yl]acet-2',6'-xylidide (clozylacon), cyprodinil, mepanipyrim, pyrimethanil, dithianon, aureofungin, blasticidin-S, biphenyl, chloroneb, dicloran, hexachlorobenzene, quintozene, tecnazene, (TCNB), tolclofos-methyl, metrafenone, 2,6-dichloro-N-(4-trifluoromethylbenzyl)-benzamide, fluopicolide (flupicolide), tioxymid, flusulfamide, benomyl, carbendazim, carbendazim chlorhydrate, chlorfenazole, fuberidazole, thiabendazole, thiophanate-methyl, benthiavalicarb, chlobenthiazone, probenazole, acibenzolar, bethoxazin, pyriofenone (IKF-309), acibenzolar-S-methyl, pyribencarb (KIF-7767), butylamine, 3-iodo-2-propinyl n-butylcarbamate (IPBC), iodocarb (isopropanyl butylcarbamate), isopropanyl butylcarbamate (iodocarb), picarbutrazox, polycarbamate, propamocarb, tolprocarb, 3-(difluoromethyl)-N-(7-fluoro-1,1,3,3-tetramethyl-indan-4-yl)-1-methyl-pyrazole-4-carboxamide diclocymet, N-[(5-chloro-2-isopropyl-phenyl)methyl]-N-cyclopropyl-3-(difluoromethyl)-5-fluoro-1-methyl-pyrazole-4-carboxamide N-cyclopropyl-3-(difluoromethyl)-5-fluoro-N-[(2-isopropylphenyl)methyl]-1-methyl-pyrazole-4-carboxamide carpropamid, chlorothalonil, flumorph, oxine-copper, cymoxanil, phenamacril, cyazofamid, flutianil, thicyofen, chlozolinate, iprodione, procymidone, vinclozolin, bupirimate, dinocton, dinopenton, dinobuton, dinocap, meptyldinocap, diphenylamine, phosdiphen, 2,6-dimethyl-[1,4]dithiino[2,3-c:5,6-c]dipyrrole-1,3,5, 7(2H,6H)-tetraone, azithiram, etem, ferbam, mancozeb, maneb, metam, metiram (polyram), metiram-zinc, nabam, propineb, thiram, vapam (metam sodium), zineb, ziram, dithioether, isoprothiolane, ethaboxam, fosetyl, phosetyl-Al (fosetyl-al), methyl bromide, methyl iodide, methyl isothiocyanate, cyclafuramid, fenfuram, validamycin, streptomycin, (2RS)-2-bromo- 2-(bromomethyl)glutaronitrile (bromothalonil), dodine, doguadine, guazatine, iminoctadine, iminoctadine triacetate, 2,4-D, 2,4-DB, kasugamycin, dimethirimol, fenhexamid, hymexazole, hydroxyisoxazole imazalil, imazalil sulphate, oxpoconazole, pefurazoate, prochloraz, triflumizole, fenamidone, Bordeaux mixture, calcium polysulfide, copper acetate, copper carbonate, copper hydroxide, copper naphthenate, copper oleate, copper oxychloride, copper oxyquinolate, copper silicate, copper sulphate, copper tallate, cuprous oxide, sulphur, carbaryl, phthalide (fthalide), dingjunezuo (Jun Si Qi), oxathiapiprolin, fluoroimide, mandipropamid, KSF-1002, benzamorf, dimethomorph, fenpropimorph, tridemorph, dodemorph, diethofencarb, fentin acetate, fentin hydroxide, carboxin, oxycarboxin, drazoxolon, famoxadone, m-phenylphenol, p-phenylphenol, tribromophenol (TBP), 2-[2-[(7,8-difluoro-2-methyl-3-quinolyl)oxy]-6-fluoro-phenyl]propan-2-ol 2-[2-fluoro-6-[(8-fluoro-2-methyl-3-quinolyl)oxy]phenyl]propan-2-ol cyflufenamid, ofurace, oxadixyl, flutolanil, mepronil, isofetamid, fenpiclonil, fludioxonil, pencycuron, edifenphos, iprobenfos, pyrazophos, phosphorus acids, tecloftalam, captafol, captan, ditalimfos, triforine, fenpropidin, piperalin, osthol, 1-methylcyclopropene, 4-CPA, chlormequat, clofencet, dichlorprop, dimethipin, endothal, ethephon, flumetralin, forchlorfenuron, gibberellic acid, gibberellins, hymexazol, maleic hydrazide, mepiquat, naphthalene acetamide, paclobutrazol, prohexadione, prohexadione-calcium, thidiazuron, tribufos (tributyl phosphorotrithioate), trinexapac, uniconazole, α-naphthalene acetic acid, polyoxin D (polyoxrim), BLAD, chitosan, fenoxanil, folpet, 3-(difluoromethyl)-N-methoxy-1-methyl-N-[1-methyl-2-(2,4,6-trichlorophenyl)ethyl]pyrazole-4-carboxamide, bixafen, fluxapyroxad, furametpyr, isopyrazam, penflufen, penthiopyrad, sedaxane, fenpyrazamine, diclomezine, pyrifenox, boscalid, fluopyram, diflumetorim, fenarimol, 5-fluoro-2-(p-tolylmethoxy)pyrimidin-4-amine ferimzone, dimetachlone (dimethaclone), pyroquilon, proquinazid, ethoxyquin, quinoxyfen, 4,4,5-trifluoro-3,3-dimethyl-1-(3-quinolyl)isoquinoline 4,4-difluoro-3,3-dimethyl-1-(3-quinolyl)isoquinoline 5-fluoro-3,3,4,4-tetramethyl-1-(3-quinolyl)isoquinoline 9-fluoro-2,2-dimethyl-5-(3-quinolyl)-3H-1,4-benzoxazepine, tebufloquin, oxolinic acid, chinomethionate (oxythioquinox, quinoxymethionate), spiroxamine, (E)-N-methyl-2-[2-(2,5-dimethylphenoxymethyl) phenyl]-2-methoxy-iminoacetamide, (mandestrobin), azoxystrobin, coumoxystrobin, dimoxystrobin, enestroburin, enoxastrobin fenamistrobin, flufenoxystrobin, fluoxastrobin, kresoximmethyl, mandestrobin, metaminostrobin, metominostrobin, orysastrobin, picoxystrobin, pyraclostrobin, pyrametostrobin, pyraoxystrobin, triclopyricarb, trifloxystrobin, amisulbrom, dichlofluanid, tolylfluanid, but-3-ynyl N-[6-[[(Z)-[(1-methyltetrazol-5-yl)-phenylmethylene]amino]oxymethyl]-2-pyridyl]carbamate, dazomet, isotianil, tiadinil, thifluzamide, benthiazole (TCMTB), silthiofam, zoxamide, anilazine, tricyclazole, (.+-.)-cis-1-(4-chlorophenyl)-2-(1H-1,2,4-triazol-1-yl)-cycloheptanol (huanjunzuo), 1-(5-bromo-2-pyridyl)-2-(2,4-difluorophenyl)-1,1-difluoro-3-(1,2,4-triazol-1-yl)propan-2-ol 2-(1-tert-butyl)-1-(2-chlorophenyl)-3-(1,2,4-triazol-1-yl)-propan-2-ol (TCDP), azaconazole, bitertanol (biloxazol), bromuconazole, climbazole, cyproconazole, difenoconazole, dimetconazole, diniconazole, diniconazole-M, epoxiconazole, etaconazole, fenbuconazole, fluquinconazole, flusilazole, flutriafol, hexaconazole, imibenconazole, ipconazole, metconazole, myclobutanil, penconazole, propiconazole, prothioconazole, Mefentrifluconazole, simeconazole, tebuconazole, tetraconazole, triadimefon, triadimenol, triazoxide, triticonazole, 2-[[(1R,5S)-5-[(4-fluorophenyl)methyl]-1-hydroxy-2,2-dimethyl-cyclopentyl]methyl]-4H-1,2,4-triazole-3-thione 2-[[3-(2-chlorophenyl)-2-(2,4-difluorophenyl)oxiran-2-yl]methyl]-4H-1,2,4-triazole-3-thione, ametoctradin (imidium), iprovalicarb, valifenalate, 2-benzyl-4-chlorophenol (Chlorophene), allyl alcohol, azafenidin, benzalkonium chloride, chloropicrin, cresol, daracide, dichlorophen (dichlorophene), difenzoquat, dipyrithione, N-(2-p-chlorobenzoylethyl)-hexaminium chloride, NNF-0721, octhilinone, oxasulfuron, propamidine and propionic acid; or an insecticides selected from abamectin, acephate, acetamiprid, amidoflumet (S-1955), avermectin, azadirachtin, azinphos-methyl, bifenthrin, bifenazate, buprofezin, carbofuran, cartap, chlorantraniliprole (DPX-E2Y45), chlorfenapyr, chlorfluazuron, chlorpyrifos, chlorpyrifos-methyl, chromafenozide, clothianidin, cyflumetofen, cyfluthrin, beta-cyfluthrin, cyhalothrin, lambda-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim (UR-50701), flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, nitenpyram, nithiazine, novaluron, noviflumuron (XDE-007), oxamyl, parathion, parathion-methyl, permethrin, phorate, phosalone, phosmet, phosphamidon, pirimicarb, profenofos, profluthrin, pymetrozine, pyrafluprole, pyrethrin, pyridalyl, pyrifluquinazon, pyriprole, pyriproxyfen, rotenone, ryanodine, spinetoram, spinosad, spirodiclofen, spiromesifen (BSN 2060), spirotetramat, sulprofos, tebufenozide, teflubenzuron, tefluthrin, terbufos, tetrachlorvinphos, thiacloprid, thiamethoxam, thiodicarb, thiosultap-sodium, tralomethrin, triazamate, trichlorfon and triflumuron; or a bactericides selected from streptomycin; or an acaricide selected from amitraz, chinomethionat, chlorobenzilate, cyenopyrafen, cyhexatin, dicofol, dienochlor, etoxazole, fenazaquin, fenbutatin oxide, fenpropathrin, fenpyroximate, hexythiazox, propargite, pyridaben and tebufenpyrad; or a biological agents selected from *Bacillus thuringiensis*, *Bacillus thuringiensis* delta endotoxin, baculovirus, and entomopathogenic bacteria, virus and fungi.

11. A fungicidal composition according to claim 1 wherein the composition further comprises an agriculturally acceptable carrier and, optionally, a surfactant and/or formulation adjuvants.

12. A fungicidal composition according to claim 1 wherein component (A) is a compound of formula (I) wherein $R^2$ is n-propyl and $R^5$ is methyl.

* * * * *